(12) United States Patent
Fukunaga

(10) Patent No.: US 9,463,844 B2
(45) Date of Patent: Oct. 11, 2016

(54) BICYCLE SPROCKET AND BICYCLE SPROCKET ASSEMBLY

(71) Applicant: SHIMANO INC., Sakai (JP)

(72) Inventor: Yasufumi Fukunaga, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 14/615,349

(22) Filed: Feb. 5, 2015

(65) Prior Publication Data

US 2016/0059931 A1 Mar. 3, 2016

Related U.S. Application Data

(63) Continuation-in-part of application No. 14/474,275, filed on Sep. 1, 2014, now Pat. No. 9,334,014.

(51) Int. Cl.
*F16H 55/12* (2006.01)
*F16H 55/30* (2006.01)
*B62M 9/10* (2006.01)

(52) U.S. Cl.
CPC ..................... B62M 9/10 (2013.01)

(58) Field of Classification Search
CPC ........ B62M 9/10; B62M 9/105; B62M 9/12; F16H 55/303; F16H 55/08
USPC ........................................ 474/160
See application file for complete search history.

(56) References Cited

U.S. PATENT DOCUMENTS

| | | | | |
|---|---|---|---|---|
| 4,198,876 A * | 4/1980 | Nagano | ............... | B62M 9/10 192/64 |
| 4,439,172 A * | 3/1984 | Segawa | ............... | B62M 9/105 474/144 |
| 5,078,653 A * | 1/1992 | Nagano | ............... | B62M 9/10 474/160 |
| 5,085,621 A * | 2/1992 | Nagano | ............... | B62M 9/10 474/160 |
| 5,192,248 A * | 3/1993 | Nagano | ............... | B62M 9/105 474/140 |
| 5,192,249 A * | 3/1993 | Nagano | ............... | B62M 9/10 474/160 |
| 5,273,495 A * | 12/1993 | Nagano | ............... | B62M 9/00 474/144 |
| 5,876,296 A * | 3/1999 | Hsu | ............... | B62M 9/10 474/140 |
| 6,139,456 A * | 10/2000 | Lii | ............... | B62M 9/10 474/152 |

(Continued)

FOREIGN PATENT DOCUMENTS

| | | |
|---|---|---|
| EP | 0047927 | 3/1982 |
| JP | 62-23187 U | 2/1987 |
| JP | 62-65387 U | 4/1987 |

OTHER PUBLICATIONS

Office Action with Form PTO-892 Notice of References Cited issued by the U.S. Patent and Trademark Office for the parent U.S. Appl. No. 14/474,275, Dec. 3, 2015.

*Primary Examiner* — Henry Liu
(74) *Attorney, Agent, or Firm* — Mori & Ward, LLP

(57) ABSTRACT

A bicycle sprocket having a rotational center axis comprises a sprocket body and a chain engagement structure. The sprocket body is rotatable about the rotational center axis. The chain engagement structure includes an upshifting facilitation area configured to facilitate upshifting. The chain engagement structure includes a plurality of chain-engaging teeth configured to engage with a bicycle chain. The plurality of chain-engaging teeth includes at least three upshifting facilitation teeth configured to facilitate upshifting. The at least three upshifting facilitation teeth are adjacent to each other without another tooth between the at least three upshifting facilitation teeth. The at least three upshifting facilitation teeth are provided in the upshifting facilitation area.

35 Claims, 37 Drawing Sheets

(56) References Cited

U.S. PATENT DOCUMENTS

| | | | | |
|---|---|---|---|---|
| 6,340,338 B1* | 1/2002 | Kamada | ........... | B62M 9/122 474/152 |
| 6,572,500 B2* | 6/2003 | Tetsuka | ........... | B62M 9/10 474/160 |
| 6,923,741 B2* | 8/2005 | Wei | ........... | B62M 9/10 474/152 |
| 7,491,143 B2* | 2/2009 | Valle | ........... | B62M 9/105 474/152 |
| D604,346 S * | 11/2009 | Chiang | ........... | D12/123 |
| 8,092,329 B2* | 1/2012 | Wickliffe | ........... | B62M 9/105 474/160 |
| 8,100,795 B2* | 1/2012 | Reiter | ........... | B62M 9/10 474/160 |
| 8,226,511 B2* | 7/2012 | Kamada | ........... | B62M 9/10 474/152 |
| 8,235,850 B2* | 8/2012 | Lin | ........... | B62M 9/105 474/160 |
| 8,506,436 B2* | 8/2013 | Wickiffe | ........... | B62M 9/105 474/160 |
| 8,617,015 B2* | 12/2013 | Wickliffe | ........... | B62M 9/10 474/140 |
| 8,821,329 B2* | 9/2014 | Wickliffe | ........... | B62M 9/105 474/140 |
| 8,978,514 B2* | 3/2015 | Shiraishi | ........... | B62M 9/105 74/594.2 |
| 2004/0043855 A1* | 3/2004 | Wei | ........... | B62M 9/10 474/160 |
| 2005/0014590 A1* | 1/2005 | Wen | ........... | F16H 55/30 474/152 |
| 2005/0119080 A1* | 6/2005 | Wei | ........... | B62M 9/10 474/160 |
| 2005/0282671 A1* | 12/2005 | Emura | ........... | B62M 9/105 474/160 |
| 2006/0128511 A1* | 6/2006 | Oishi | ........... | B62M 9/10 474/160 |
| 2006/0154767 A1* | 7/2006 | Kamada | ........... | B62M 9/10 474/160 |
| 2007/0054768 A1* | 3/2007 | Miyazawa | ........... | F16H 55/30 474/152 |
| 2007/0060428 A1* | 3/2007 | Meggiolan | ........... | B62M 9/10 474/160 |
| 2007/0135250 A1* | 6/2007 | Kamada | ........... | B62M 9/10 474/160 |
| 2009/0111631 A1* | 4/2009 | Wickliffe | ........... | B62M 9/105 474/152 |
| 2010/0004081 A1* | 1/2010 | Braedt | ........... | B62M 9/12 474/160 |
| 2010/0137086 A1* | 6/2010 | Lin | ........... | B62M 9/105 474/160 |
| 2011/0092327 A1* | 4/2011 | Oishi | ........... | B62M 9/10 474/160 |
| 2012/0202633 A1* | 8/2012 | Wickliffe | ........... | B62M 9/105 474/160 |
| 2012/0244977 A1* | 9/2012 | Liao | ........... | B62M 9/10 474/160 |
| 2013/0139642 A1* | 6/2013 | Reiter | ........... | B62M 9/105 74/594.2 |
| 2013/0316863 A1* | 11/2013 | Reiter | ........... | B62M 9/10 474/160 |
| 2013/0331210 A1* | 12/2013 | Wickliffe | ........... | B62M 9/105 474/78 |
| 2014/0113757 A1* | 4/2014 | Wickliffe | ........... | B62M 9/10 474/160 |
| 2014/0371014 A1* | 12/2014 | Wickliffe | ........... | B62M 9/105 474/152 |

* cited by examiner

BICYCLE SPROCKET AND BICYCLE SPROCKET ASSEMBLY

CROSS-REFERENCE TO RELATED APPLICATIONS

The present application is a continuation-in-part application of the U.S. patent application Ser. No. 14/474,275 filed Sep. 1, 2014. The contents of this application are incorporated herein by reference in their entirety.

BACKGROUND OF THE INVENTION

1. Field of the Invention

The present invention relates to a bicycle sprocket and a bicycle sprocket assembly.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is a bicycle sprocket.

Most bicycles have a drive train that uses the bicycle sprocket to transmit the pedaling action from the rider to a bicycle wheel through a bicycle chain. A front sprocket and a rear sprocket have been known as the bicycle sprocket. The bicycle sprocket generally includes a plurality of teeth to engage with the bicycle chain. Such sprockets have been also known in a technical field other than the bicycle field (e.g., Japanese Unexamined Patent Application Publications No. S62-023187 and No. S62-065387).

SUMMARY OF THE INVENTION

In accordance with a first aspect of the present invention, a bicycle sprocket having a rotational center axis comprises a sprocket body and a chain engagement structure. The sprocket body is rotatable about the rotational center axis. The chain engagement structure includes an upshifting facilitation area configured to facilitate upshifting. The chain engagement structure includes a plurality of chain-engaging teeth configured to engage with a bicycle chain. The plurality of chain-engaging teeth includes at least three upshifting facilitation teeth configured to facilitate upshifting. The at least three upshifting facilitation teeth are adjacent to each other without another tooth between the at least three upshifting facilitation teeth. The at least three upshifting facilitation teeth are provided in the upshifting facilitation area.

In accordance with a second aspect of the present invention, the bicycle sprocket according to the first aspect is configured so that the upshifting facilitation area includes an upshifting recessed portion recessed in an axial direction parallel to the rotational center axis.

In accordance with a third aspect of the present invention, the bicycle sprocket according to the second aspect further comprises a first axial side and a second axial side. The first axial side is configured to face in the axial direction. The second axial side is configured to face in the axial direction and is opposite to the first axial side in the axial direction. The upshifting recessed portion is recessed from the first axial side toward the second axial side in the axial direction.

In accordance with a fourth aspect of the present invention, the bicycle sprocket according to the third aspect is configured so the chain engagement structure includes a downshifting facilitation area configured to facilitate downshifting. The downshifting facilitation area includes a downshifting recessed portion recessed in an axial direction parallel to the rotational center axis. The downshifting recessed portion is recessed from the first axial side toward the second axial side in the axial direction.

In accordance with a fifth aspect of the present invention, the bicycle sprocket according to the first aspect is configured so that the at least three upshifting facilitation teeth includes a first upshifting facilitation tooth, a second upshifting facilitation tooth, and a third upshifting facilitation tooth. The first upshifting facilitation tooth has a first tooth width defined in an axial direction parallel to the rotational center axis. The second upshifting facilitation tooth has a second tooth width defined in the axial direction. The third upshifting facilitation tooth has a third tooth width defined in the axial direction. The second upshifting facilitation tooth is positioned between the first upshifting facilitation tooth and the third upshifting facilitation tooth in a circumferential direction with respect to the rotational center axis. The second tooth width is smaller than the first tooth width.

In accordance with a sixth aspect of the present invention, the bicycle sprocket according to the fifth aspect is configured so that the second upshifting facilitation tooth is adjacent to the first upshifting facilitation tooth without another chain-engaging tooth between the first upshifting facilitation tooth and the second upshifting facilitation tooth. The second upshifting facilitation tooth is adjacent to the third upshifting facilitation tooth without another chain-engaging tooth between the second upshifting facilitation tooth and the third upshifting facilitation tooth.

In accordance with a seventh aspect of the present invention, the bicycle sprocket according to the fifth aspect is configured so that the second tooth width is smaller than the third tooth width.

In accordance with an eighth aspect of the present invention, the bicycle sprocket according to the fifth aspect is configured so that the first tooth width is smaller than the third tooth width.

In accordance with a ninth aspect of the present invention, the bicycle sprocket according to the seventh aspect is configured so that the first upshifting facilitation tooth is provided on a rotational downstream side relative to the second upshifting facilitation tooth in a rotational driving direction in which the bicycle sprocket rotates about the rotational center axis during pedaling.

In accordance with a tenth aspect of the present invention, the bicycle sprocket according to the first aspect is configured so that the at least three upshifting facilitation teeth includes a first upshifting facilitation tooth, a second upshifting facilitation tooth, and a third upshifting facilitation tooth. The second upshifting facilitation tooth is positioned between the first upshifting facilitation tooth and the third upshifting facilitation tooth in a circumferential direction with respect to the rotational center axis. The second upshifting facilitation tooth is adjacent to the first upshifting facilitation tooth without another chain-engaging tooth between the first upshifting facilitation tooth and the second upshifting facilitation tooth, The second upshifting facilitation tooth is adjacent to the third upshifting facilitation tooth without another chain-engaging tooth between the second upshifting facilitation tooth and the third upshifting facilitation tooth, The first upshifting facilitation tooth is provided on a rotational downstream side relative to the second upshifting facilitation tooth in a rotational driving direction in which the bicycle sprocket rotates about the rotational center axis during pedaling, The plurality of chain-engaging teeth includes a downstream tooth provided on a rotational downstream side relative to the first upshifting facilitation tooth in the rotational driving direction. The first upshifting facilitation tooth is configured to shift an inner link plate of the bicycle chain toward a neighboring smaller sprocket after the downstream tooth engages with an outer link plate of the bicycle chain during an upshifting operation. The second upshifting facilitation tooth is configured to shift an inner link plate of the bicycle chain toward the neighboring smaller sprocket after the first upshifting facilitation tooth engages with an outer link plate of the bicycle chain during another upshifting operation.

In accordance with an eleventh aspect of the present invention, the bicycle sprocket according to the first aspect is configured so that the chain engagement structure includes a plurality of upshifting facilitation areas configured to facilitate upshifting as the upshifting facilitation area.

In accordance with a twelfth aspect of the present invention, the bicycle sprocket according to the first aspect is configured so that the chain engagement structure includes a downshifting facilitation area configured to facilitate downshifting.

In accordance with a thirteenth aspect of the present invention, the bicycle sprocket according to the twelfth aspect is configured so that the downshifting facilitation area includes a downshifting recessed portion recessed in an axial direction parallel to the rotational center axis.

In accordance with a fourteenth aspect of the present invention, the bicycle sprocket according to the thirteenth aspect further comprises a first axial side and a second axial side. The first axial side is configured to face in the axial direction. The second axial side is configured to face in the axial direction and opposite to the first axial side in the axial direction. The downshifting recessed portion is recessed from the first axial side toward the second axial side in the axial direction.

In accordance with a fifteenth aspect of the present invention, the bicycle sprocket according to the first aspect is configured so that the upshifting facilitation area includes a tooth-free gap from which an additional chain-engaging tooth is free between adjacent two of the plurality of chain-engaging teeth.

In accordance with a sixteenth aspect of the present invention, the bicycle sprocket according to the first aspect further comprises a first axial side and a second axial side. The first axial side is configured to face a neighboring smaller sprocket. The second axial side is opposite to the first axial side in an axial direction parallel to the rotational center axis. Each of the at least three upshifting facilitation teeth has a tooth-top positioned closer to the second axial side than the first axial side in the axial direction.

In accordance with a seventeenth aspect of the present invention, the bicycle sprocket according to the first aspect is configured so that the sprocket body includes a hub engagement portion configured to engage with a bicycle hub assembly.

In accordance with an eighteenth aspect of the present invention, the bicycle sprocket according to the first aspect is configured so that the sprocket body has an axial width defined in an axial direction parallel to the rotational center axis. The plurality of chain-engaging teeth include at least two neighboring chain-engaging teeth each including a chain-engaging portion configured to engage with the bicycle chain. The chain-engaging portion has an axial chain-engaging width defined in the axial direction. The axial chain-engaging width is larger than the axial width of the sprocket body.

In accordance with a nineteenth aspect of the present invention, the bicycle sprocket according to the eighteenth aspect is configured so that the chain-engaging portion is configured to partly engage with a link plate of the bicycle chain in a radial direction of the bicycle sprocket.

In accordance with a twentieth aspect of the present invention, the bicycle sprocket according to the eighteenth aspect is configured so that the axial chain-engaging width is smaller than an axial inner distance defined between opposed inner link plates of the bicycle chain in the axial direction. A difference between the axial chain-engaging width and the axial inner distance is equal to or smaller than 0.2 mm in the axial direction.

In accordance with a twenty-first aspect of the present invention, the bicycle sprocket according to the eighteenth aspect is configured so that the axial chain-engaging width is smaller than an axial inner distance defined between opposed inner link plates of the bicycle chain in the axial direction. A difference between the axial chain-engaging width and the axial inner distance is equal to or larger than 0.1 mm in the axial direction.

In accordance with a twenty-second aspect of the present invention, a bicycle sprocket assembly comprises a plurality of the bicycle sprockets according to the first aspect.

In accordance with a twenty-third aspect of the present invention, the bicycle sprocket according to the twenty-second aspect further comprises a hub engagement structure configured to engage with a bicycle hub assembly.

In accordance with a twenty-fourth aspect of the present invention, a bicycle sprocket having a rotational center axis comprises a sprocket body and a chain engagement structure. The sprocket body is rotatable about the rotational center axis. The chain engagement structure includes an upshifting facilitation area configured to facilitate upshifting. The chain engagement structure includes a plurality of chain-engaging teeth configured to engage with a bicycle chain. The plurality of chain-engaging teeth include at least two upshifting initiation teeth configured to shift the bicycle chain first toward a neighboring smaller sprocket during an upshifting operation. The at least two upshifting initiation teeth are adjacent to each other without another tooth between the at least two upshifting initiation teeth. The at least two upshifting initiation teeth are provided in the upshifting facilitation area.

In accordance with a twenty-fifth aspect of the present invention, the bicycle sprocket according to the twenty-fourth aspect is configured so that the chain engagement structure includes a plurality of upshifting facilitation areas configured to facilitate upshifting as the upshifting facilitation area.

In accordance with a twenty-sixth aspect of the present invention, the bicycle sprocket according to the twenty-fourth aspect is configured so that the upshifting facilitation area includes an upshifting recessed portion recessed in an axial direction parallel to the rotational center axis.

In accordance with a twenty-seventh aspect of the present invention, the bicycle sprocket according to the twenty-sixth aspect further comprises a first axial side and a second axial side. The first axial side is configured to face in the axial direction. The second axial side is configured to face in the axial direction and opposite to the first axial side in the axial direction. The upshifting recessed portion is recessed from the first axial side toward the second axial side in the axial direction.

In accordance with a twenty-eighth aspect of the present invention, the bicycle sprocket according to the twenty-seventh aspect is configured so that the chain engagement structure includes a downshifting facilitation area configured to facilitate downshifting. The downshifting facilitation area includes a downshifting recessed portion recessed in an axial direction parallel to the rotational center axis. The downshifting recessed portion is recessed from the first axial side toward the second axial side in the axial direction.

In accordance with a twenty-ninth aspect of the present invention, the bicycle sprocket according to the twenty-fourth aspect is configured so that the chain engagement structure includes a downshifting facilitation area configured to facilitate downshifting.

In accordance with a thirtieth aspect of the present invention, the bicycle sprocket according to the twenty-ninth aspect is configured so that the downshifting facilitation area includes a downshifting recessed portion recessed in an axial direction parallel to the rotational center axis.

In accordance with a thirty-first aspect of the present invention, the bicycle sprocket according to the thirtieth aspect further comprises a first axial side and a second axial side. The first axial side is configured to face in the axial direction. The second axial side is configured to face in the axial direction and is opposite to the first axial side in the axial direction. The downshifting recessed portion is recessed from the first axial side toward the second axial side in the axial direction.

In accordance with a thirty-second aspect of the present invention, the bicycle sprocket according to the twenty-fourth aspect is configured so that the at least two upshifting initiation teeth includes a first upshifting initiation tooth and a second upshifting initiation tooth adjacent to the first upshifting initiation tooth without another tooth between the first upshifting initiation tooth and the second upshifting initiation tooth. The first upshifting initiation tooth is provided on a rotational downstream side relative to the second upshifting initiation tooth in a rotational driving direction in which the bicycle sprocket rotates about the rotational center axis during pedaling. The plurality of chain-engaging teeth includes a downstream tooth provided on a rotational downstream side relative to the first upshifting initiation tooth in the rotational driving direction. The first upshifting initiation tooth is configured to shift an inner link plate of the bicycle chain toward the neighboring smaller sprocket after the downstream tooth engages with an outer link plate of the bicycle chain during an upshifting operation. The second upshifting initiation tooth is configured to shift an inner link plate of the bicycle chain toward the neighboring smaller sprocket after the first upshifting initiation tooth engages with an outer link plate of the bicycle chain during another upshifting operation.

In accordance with a thirty-third aspect of the present invention, the bicycle sprocket according to the twenty-fourth aspect further comprises a first axial side and a second axial side. The first axial side is configured to face a neighboring smaller sprocket. The second axial side is opposite to the first axial side in an axial direction parallel to the rotational center axis. Each of the at least two upshifting initiation teeth has a tooth-top positioned closer to the second axial side than the first axial side in the axial direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
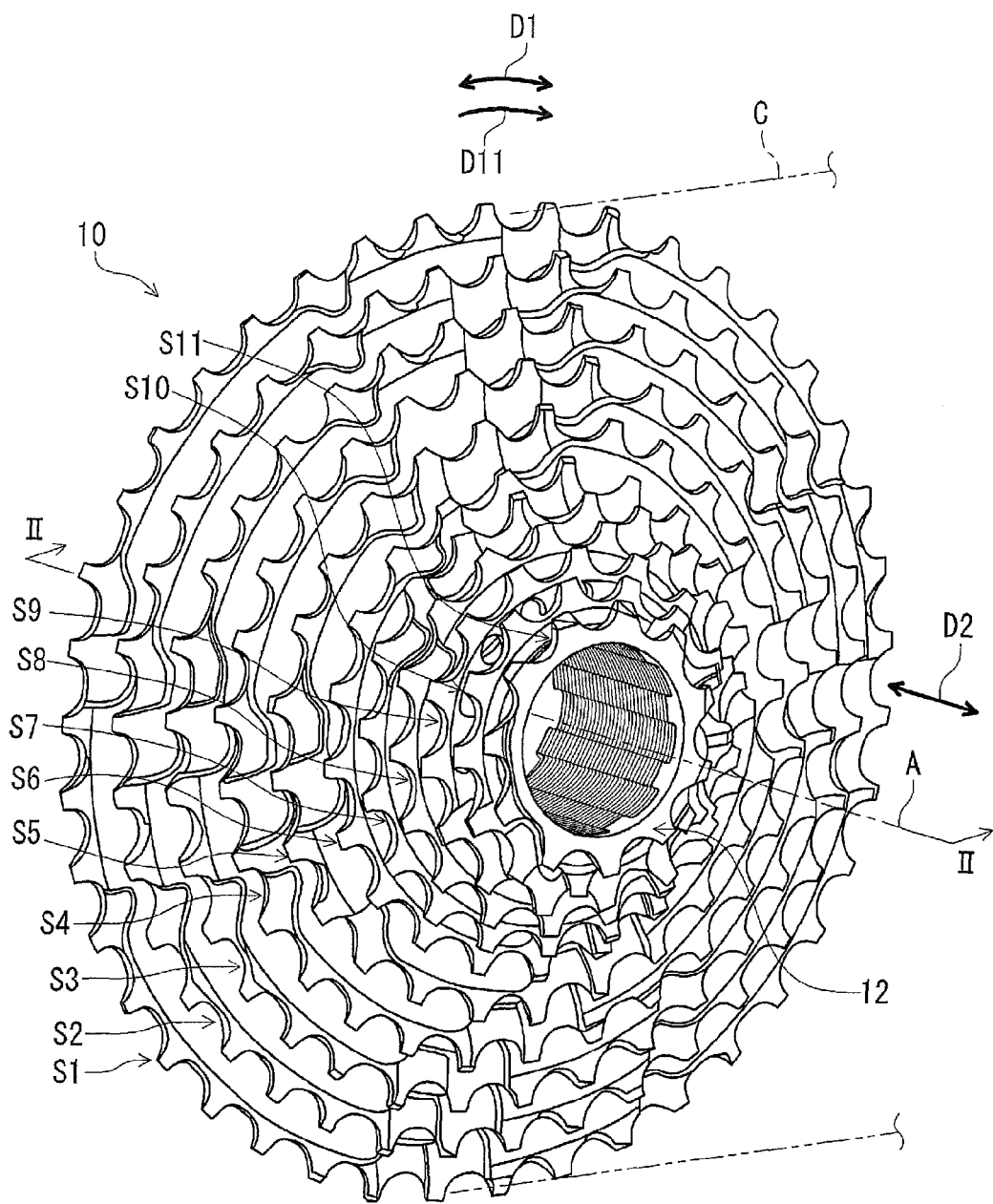
FIG. 1 is a perspective view of a bicycle sprocket assembly in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle sprocket assembly 10 in accordance with a first embodiment comprises a plurality of the bicycle sprockets. The bicycle sprocket assembly 10 is configured to engage with a bicycle chain C. In the illustrated embodiment, the bicycle sprocket assembly 10 comprises eleven bicycle sprockets S1 to S11. The bicycle sprocket assembly 10 has a rotational center axis A. The bicycle sprocket assembly 10 is configured to be rotated about the rotational center axis A in a rotational driving direction D11 during the pedaling. The rotational driving direction D11 is defined along a circumferential direction D1 of the bicycle sprocket assembly 10.

Figure 2:
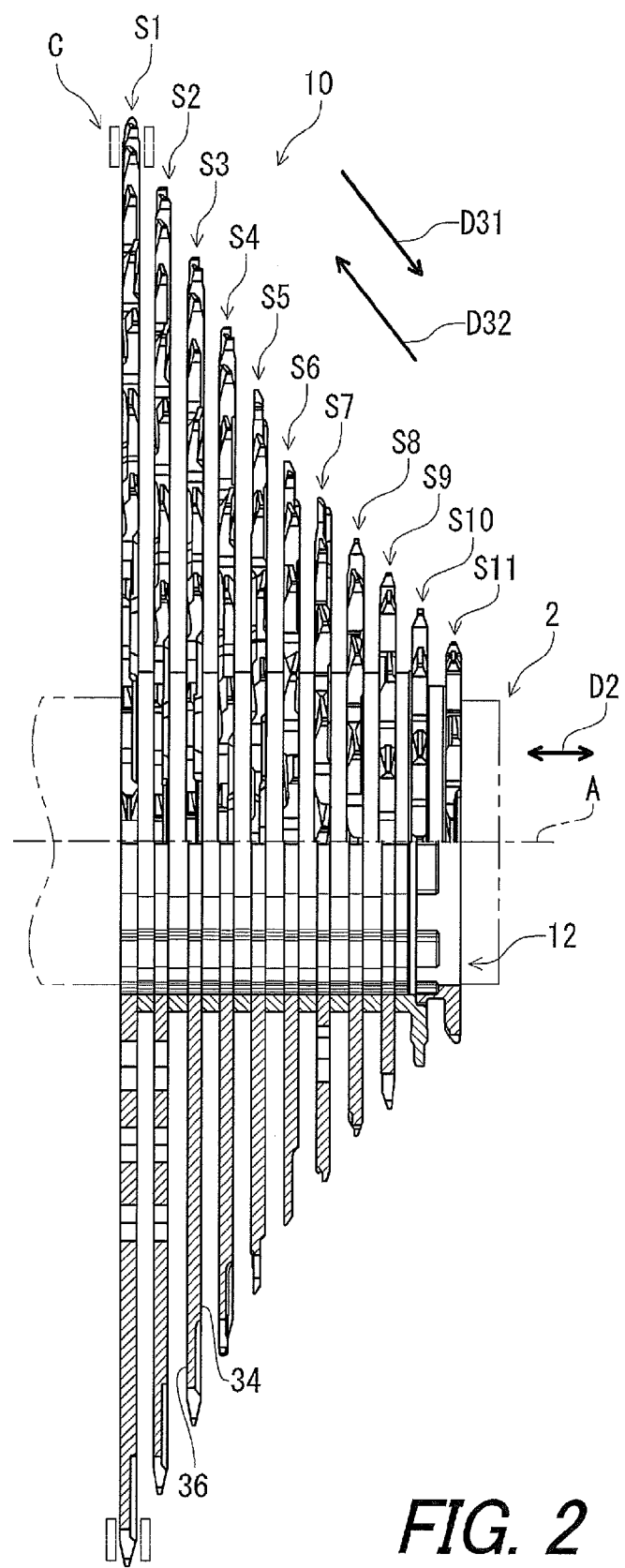
FIG. 2 is a rear elevational view of the bicycle sprocket assembly illustrated in FIG. 1 with a partial cross-sectional view taken along line II-II of FIG. 1.

As seen in FIG. 1, the bicycle sprocket assembly 10 further comprises a hub engagement structure 12 configured to engage with a bicycle hub assembly 2 (FIG. 2). While the bicycle sprocket assembly 10 is a rear sprocket assembly in the illustrated embodiment, structures of the bicycle sprocket assembly 10 can be applied to a front sprocket assembly if needed and/or desired.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket assembly 10 or the bicycle sprockets S1 to S11, should be interpreted relative to the bicycle equipped with the bicycle sprocket assembly 10 or the bicycle sprockets S1 to S11 as used in an upright riding position on a horizontal surface.

As seen in FIG. 2, the bicycle sprockets S1 to S11 are arranged in an axial direction D2 parallel to the rotational center axis A. The bicycle sprockets S1 to S11 are spaced apart from each other in the axial direction D2. Upshifting occurs when the bicycle chain C is shifted by a rear derailleur (not shown) from a larger sprocket to a neighboring smaller sprocket in an upshifting direction D31. Downshifting occurs when the bicycle chain C is shifted by the rear derailleur from a small sprocket to a neighboring larger sprocket in a downshifting direction D32.

Since the bicycle sprockets S1 to S10 have substantially the same structure as each other, the bicycle sprocket S3 will be described and/or illustrated in detail here and other bicycle sprockets will not be described and/or illustrated in detail for the sake of brevity. Structures of the bicycle sprocket S3 can be applied to the bicycle sprocket S11 if needed and/or desired. Structures of the bicycle sprocket S3 can be also applied to a front sprocket if needed and/or desired.

Figure 3:
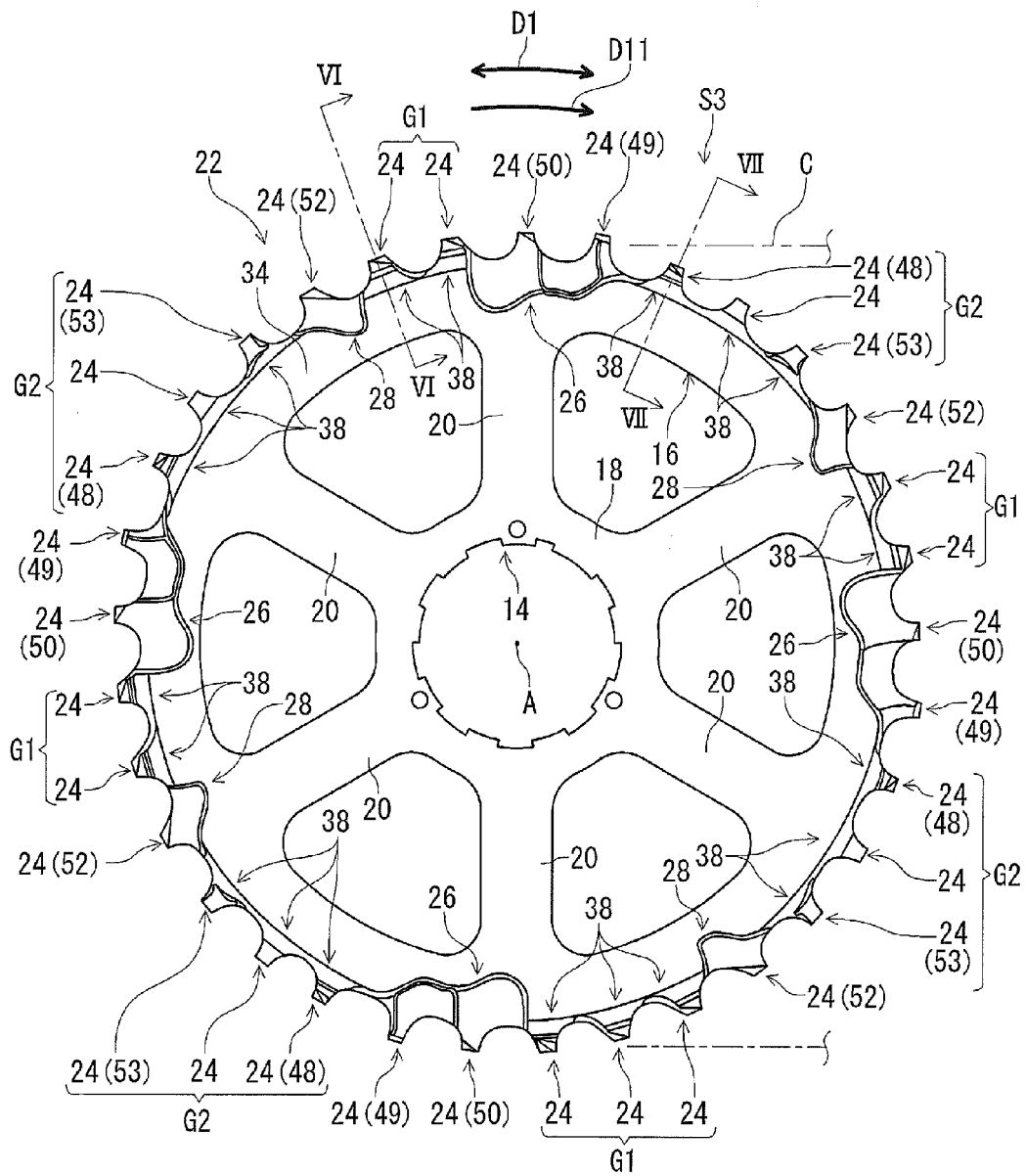
FIG. 3 is a right side elevational view of a bicycle sprocket of the bicycle sprocket assembly illustrated in FIG. 1.

As seen in FIG. 3, the bicycle sprocket S3 has the rotational center axis A. The bicycle sprocket S3 comprises a sprocket body 14. In the illustrated embodiment, the sprocket body 14 includes a base portion 16 having an annular shape. The sprocket body 14 includes a hub engagement portion 18 configured to engage with the bicycle hub assembly 2 (FIG. 2). The hub engagement portion 18 has an annular shape. The hub engagement 18 partially constitutes the hub engagement structure 12 (FIG. 2) of the bicycle sprocket assembly 10. The sprocket body 14 further includes arm portions 20 each connecting the base portion 16 with the hub engagement portion 18 in the illustrated embodiment. The arm portions 20 radially extend between the base portion 16 and the hub engagement portion 18. The sprocket body can also have a disk-like shape without including arm portions 20 and openings that are each positioned between neighboring arm portions.

The bicycle sprocket S3 comprises a chain engagement structure 22 arranged on a radially outer periphery of the sprocket body 14. In the illustrated embodiment, the chain engagement structure 22 is arranged on a radially outer periphery of the base portion 16. The chain engagement structure 22 includes a plurality of chain-engaging teeth 24. The plurality of chain-engaging teeth 24 are each configured to engage with the bicycle chain C and are arranged in the circumferential direction D1.

The chain engagement structure 22 includes at least one shifting facilitation area 26 and/or 28. The at least one shifting facilitation area 26 and/or 28 is configured to facilitate changing gears. The chain engagement structure 22 includes at least one upshifting facilitation area 26 and at least one downshifting facilitation area 28 as the at least one shifting facilitation area. In the illustrated embodiment, the chain engagement structure 22 includes upshifting facilitation areas 26 and downshifting facilitation areas 28 as the at least one shifting facilitation area. The upshifting facilitation area 26 is configured to facilitate shifting the bicycle chain C from the bicycle sprocket S3 toward a neighboring smaller sprocket. The downshifting facilitation area 28 is configured to facilitate shifting the bicycle chain C toward the bicycle sprocket S3 from the neighboring smaller sprocket. The bicycle sprocket S4 can be also referred to as the neighboring smaller sprocket S4.

Each of the upshifting facilitation areas 26 is configured to facilitate upshifting from the bicycle sprocket S3 to the bicycle sprocket S4. Each of the downshifting facilitation areas 28 is configured to facilitate downshifting from the bicycle sprocket S4 to the bicycle sprocket S3. In the illustrated embodiment, the upshifting facilitation areas 26 and the downshifting facilitation areas 28 are alternatively arranged in the circumferential direction D1. Each of the upshifting facilitation areas 26 are provided between adjacent two of the downshifting facilitation areas 28.

Figure 4:
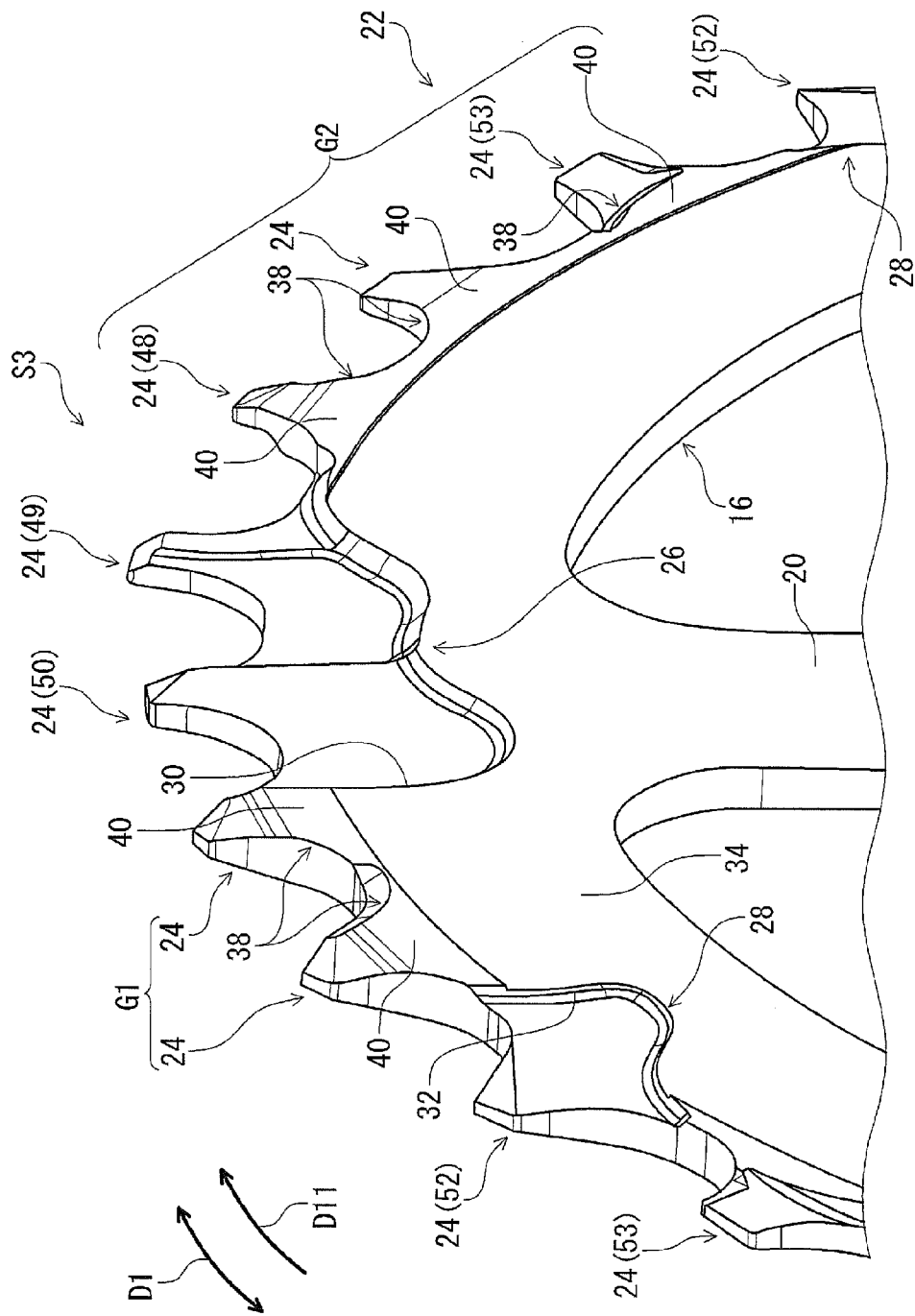
FIG. 4 is a partial perspective view of the bicycle sprocket illustrated in FIG. 3.

As seen in FIG. 4, the at least one shifting facilitation area 26 and/or 28 includes an axially recessed portion. In the illustrated embodiment, each of the upshifting facilitation areas 26 includes an upshifting recessed portion 30 as the axially recessed portion. Each of the downshifting facilitation areas 28 includes a downshifting recessed portion 32 as the axially recessed portion. The upshifting recessed portion 30 is configured to reduce interference between the bicycle chain C and the bicycle sprocket S3 during upshifting from the bicycle sprocket S3 to the bicycle sprocket S4 (FIG. 2). The downshifting recessed portion 32 is configured to reduce interference between the bicycle chain C and the bicycle sprocket S3 during downshifting from the bicycle sprocket S4 (FIG. 2) to the bicycle sprocket S3.

As seen in FIG. 2, the bicycle sprocket S3 includes a first axial side 34 and a second axial side 36 opposite to the first axial side 34 in the axial direction D2. The first axial side 34 is configured to face the bicycle sprocket S4 in the bicycle sprocket assembly 10. The second axial side 36 is configured to face the bicycle sprocket S2 in the bicycle sprocket assembly 10.

As seen in FIG. 4, each of the upshifting recessed portions 30 is provided on the first axial side 34. Each of the downshifting recessed portions 32 is provided on the first axial side 34. More specifically, each of the upshifting recessed portions 30 is at least partially provided on the base portion 16 of the sprocket body 14. Each of the downshifting recessed portions 32 is at least partially provided on the base portion 16 of the sprocket body 14.

Figure 5:
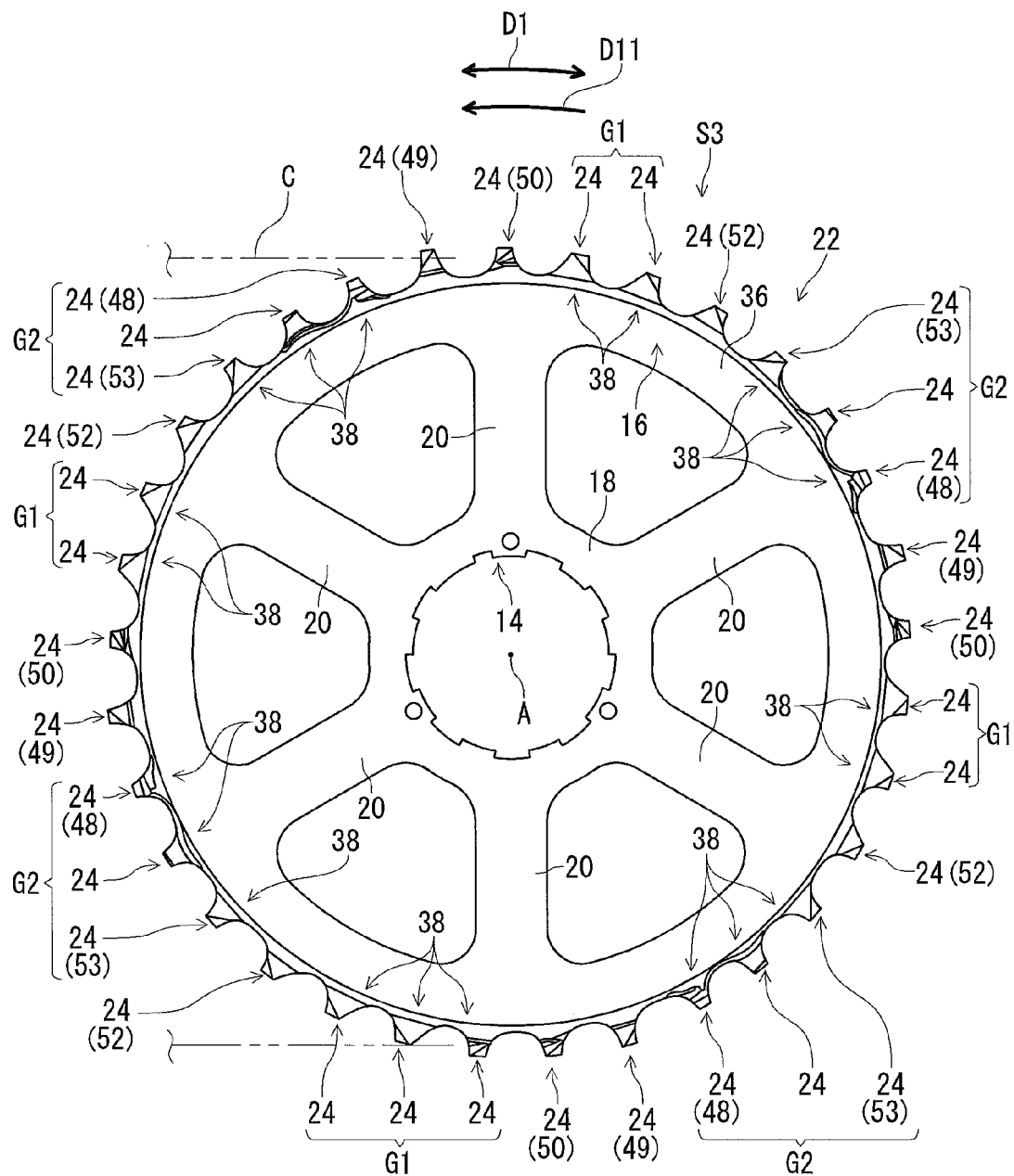
FIG. 5 is a left side elevational view of the bicycle sprocket illustrated in FIG. 3.

As seen in FIG. 5, each of the upshifting recessed portions 30 is not provided on the second axial side 36. Each of the downshifting recessed portions 32 is not provided on the second axial side 36.

As seen in FIG. 3, the plurality of chain-engaging teeth 24 includes at least two neighboring chain-engaging teeth 24 each including a chain-engaging portion 38 configured to engage with the bicycle chain C. In the illustrated embodiment, the plurality of chain-engaging teeth 24 include first chain-engaging groups G1 and second chain-engaging groups G2. Each of the first chain-engaging groups G1 includes neighboring chain-engaging teeth 24 each including the chain-engaging portion 38. Each of the second chain-engaging groups G2 includes neighboring chain-engaging teeth 24 each including the chain-engaging portion 38.

Figure 6:
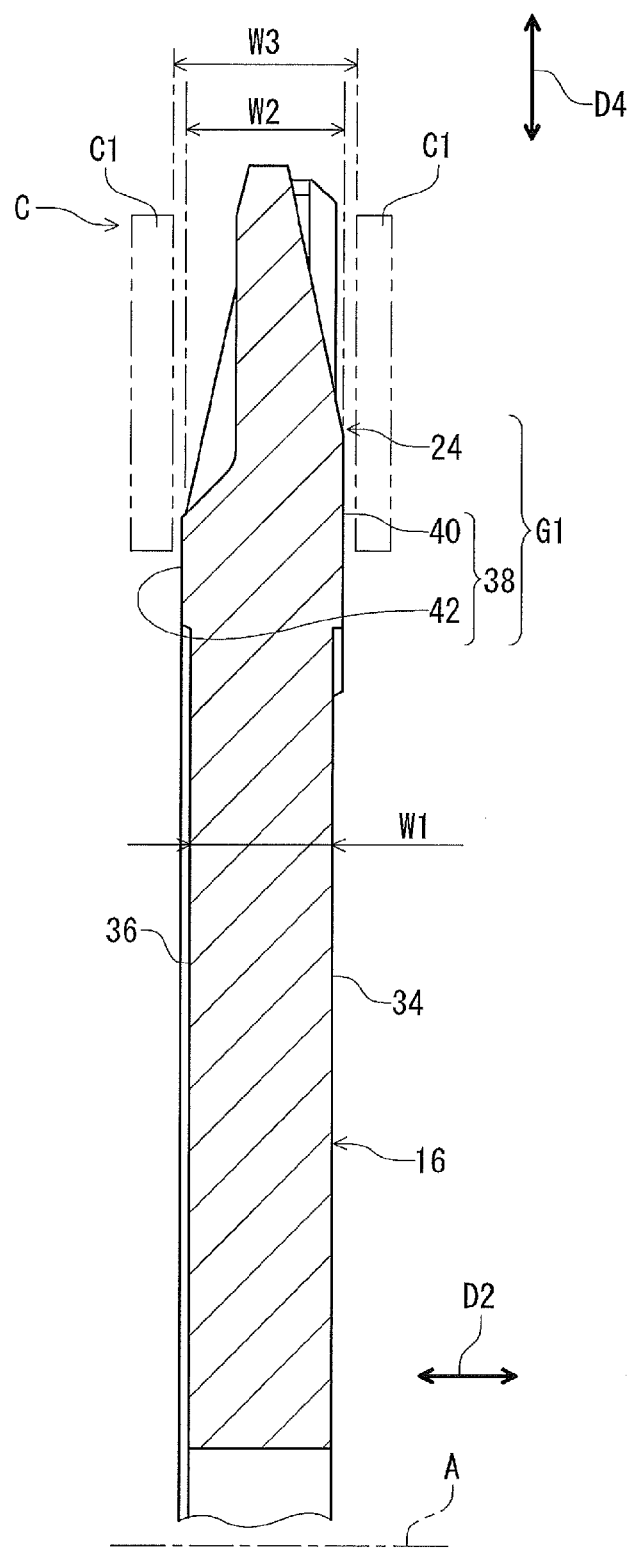
FIG. 6 is a partial cross-sectional view of the bicycle sprocket taken along line VI-VI of FIG. 3.
Figure 7:
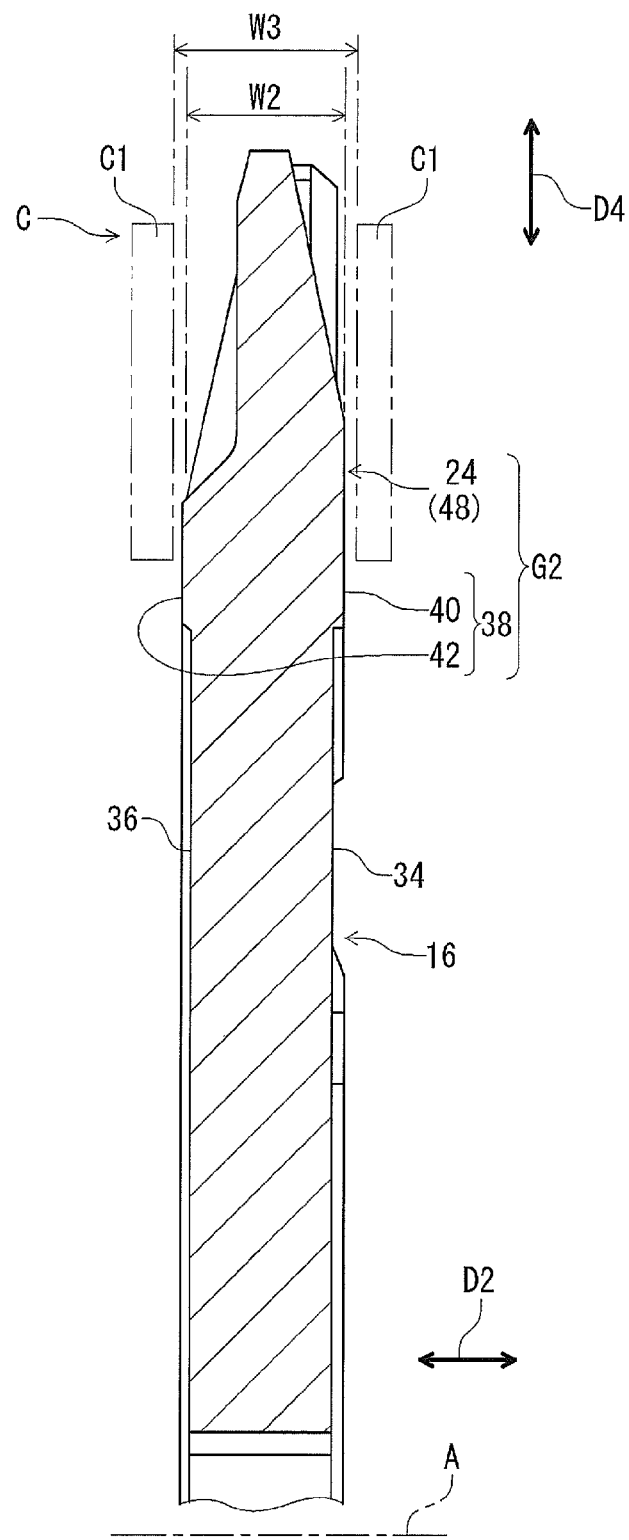
FIG. 7 is a partial cross-sectional view of the bicycle sprocket taken along line VII-VII of FIG. 3.

As seen in FIGS. 6 and 7, in each of the first and second chain-engaging groups G1 and G2, the chain-engaging portion 38 includes a first chain-engaging surface 40 and a second chain-engaging surface 42. In the illustrated embodiment, each of the first chain-engaging surface 40 and the second chain-engaging surface 42 is a flat surface. Each of the first chain-engaging surface 40 and the second chain-engaging surface 42 is configured to face in the axial direction D2. Each of the first chain-engaging surface 40 and the second chain-engaging surface 42 extends substantially perpendicularly relative to the axial direction D2.

The chain-engaging portion 38 is configured to partly engage with a link plate C1 of the bicycle chain C in a radial direction D4 of the bicycle sprocket S3. In the illustrated embodiment, the chain-engaging portion 38 is contactable with the link plate C1 (an inner link plate in FIGS. 6 and 7) of the bicycle chain C. The chain-engaging portion 38 is configured to face the link plate C1 in the axial direction D2.

As seen in FIG. 4, the first chain-engaging surfaces 40 are provided on the first axial side 34. In each of the first and second chain-engaging groups G1 and G2, the first chain-engaging surfaces 40 are connected with each other to provide one flat surface in the illustrated embodiment. The first chain-engagement surfaces 40 may also be divided into a plurality of flat surfaces.

Figure 8:
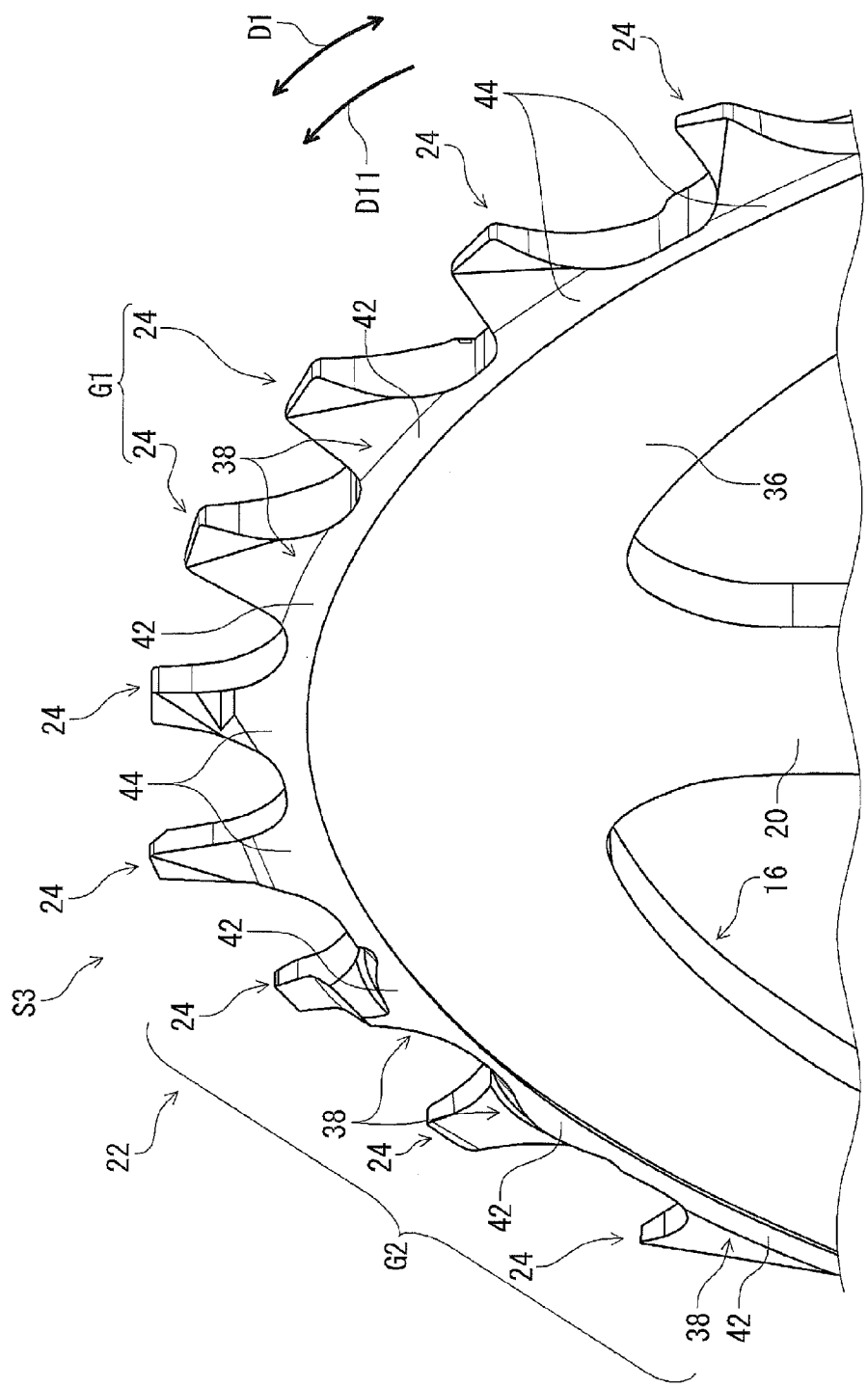
FIG. 8 is a partial perspective view of the bicycle sprocket illustrated in FIG. 3.

As seen in FIG. 8, the second chain-engaging surfaces 42 are provided on the second axial side 36. In each of the first and second chain-engaging groups G1 and G2, the second chain-engaging surfaces 42 are connected with each other to provide one flat surface. The second chain-engagement surfaces 42 may also be divided into a plurality of flat surfaces. The chain-engaging teeth 24 other than the first and second chain-engaging groups G1 and G2 each include a slidable surface 44. The second chain-engaging surfaces 42 and the slidable surfaces 44 are connected with each other to provide one annular flat surface in the illustrated embodiment (FIG. 5 and FIG. 8). The second chain-engaging surfaces 42 and the slidable surfaces 44 may also be divided into a plurality of flat surfaces.

Figure 9:
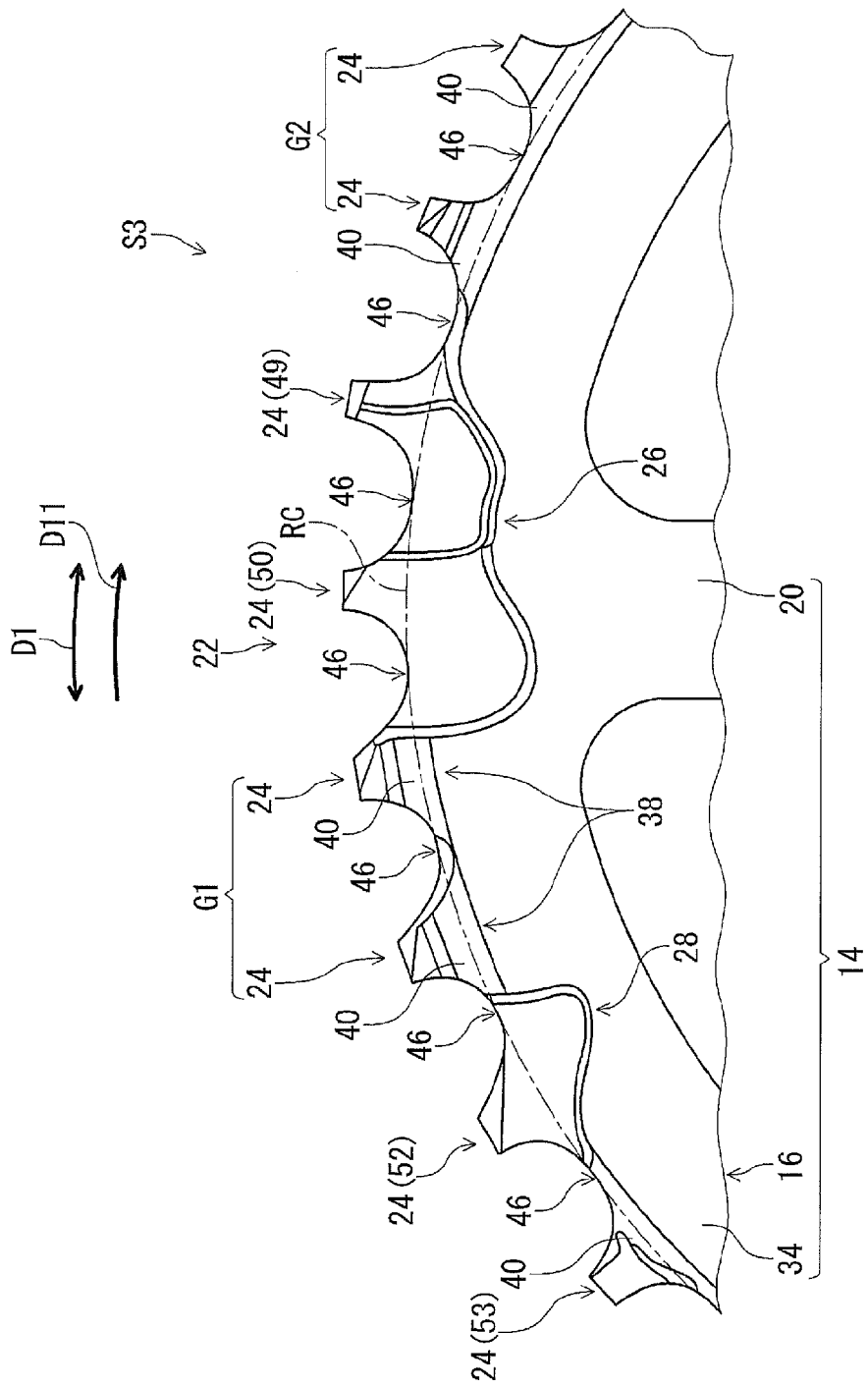
FIG. 9 is a right side partial elevational view of the bicycle sprocket illustrated in FIG. 3.

As seen in FIG. 9, the sprocket teeth 24 include tooth bottoms 46 defining a root circle RC. The radially outer periphery of the sprocket body 14 (the radially outer periphery of the base portion 16) corresponds to the root circle RC. The root circle RC is disposed on each of the first chain-engaging surfaces 40 when viewed from the axial direction D2 (a direction perpendicular to a paper surface of FIG. 9).

Figure 10:
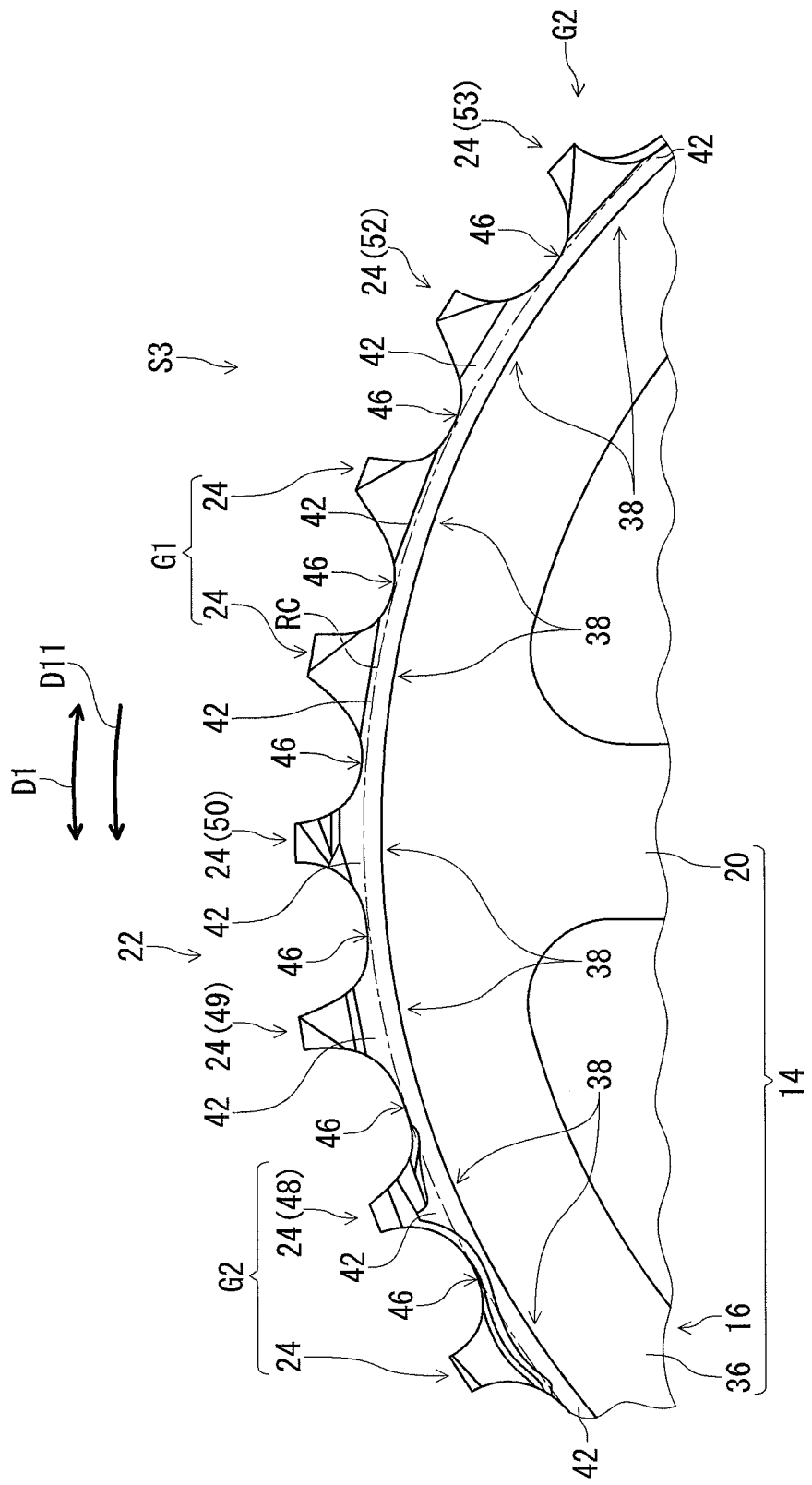
FIG. 10 is a left side partial elevational view of the bicycle sprocket illustrated in FIG. 3.

As seen in FIG. 10, the root circle RC is disposed on each of the second chain-engaging surfaces 42 when viewed from the axial direction D2 (a direction perpendicular to a paper surface of FIG. 10).

As seen in FIG. 3, the plurality of chain-engaging teeth 24 include at least one upshifting facilitation tooth configured to facilitate shifting the bicycle chain C from the bicycle sprocket S3 toward a neighboring smaller sprocket. The bicycle sprocket S4 can be also referred to as the neighboring smaller sprocket S4. In the illustrated embodiment, the plurality of chain-engaging teeth 24 include upshifting facilitation teeth 49 and 50 as the at least one upshifting tooth. Each of the upshifting facilitation teeth 49 and 50 is configured to facilitate shifting the bicycle chain C from the bicycle sprocket S3 to the neighboring smaller sprocket S4 (FIG. 2).

The plurality of chain-engaging teeth 24 include at least one downshifting facilitation tooth configured to facilitate shifting the bicycle chain C toward the bicycle sprocket S3 from the neighboring smaller sprocket. In the illustrated embodiment, the plurality of chain-engaging teeth 24 includes downshifting facilitation teeth 52 as the at least one downshifting facilitation tooth. Each of the downshifting facilitation teeth 52 is configured to facilitate shifting the bicycle chain C toward the bicycle sprocket S3 from the neighboring smaller sprocket S4 (FIG. 2).

As seen in FIGS. 1 and 2, the neighboring smaller sprocket S4 is adjacent to the bicycle sprocket S3 without another sprocket and has a total number of teeth less than a total number of the plurality of chain-engaging teeth 24.

Figure 11:
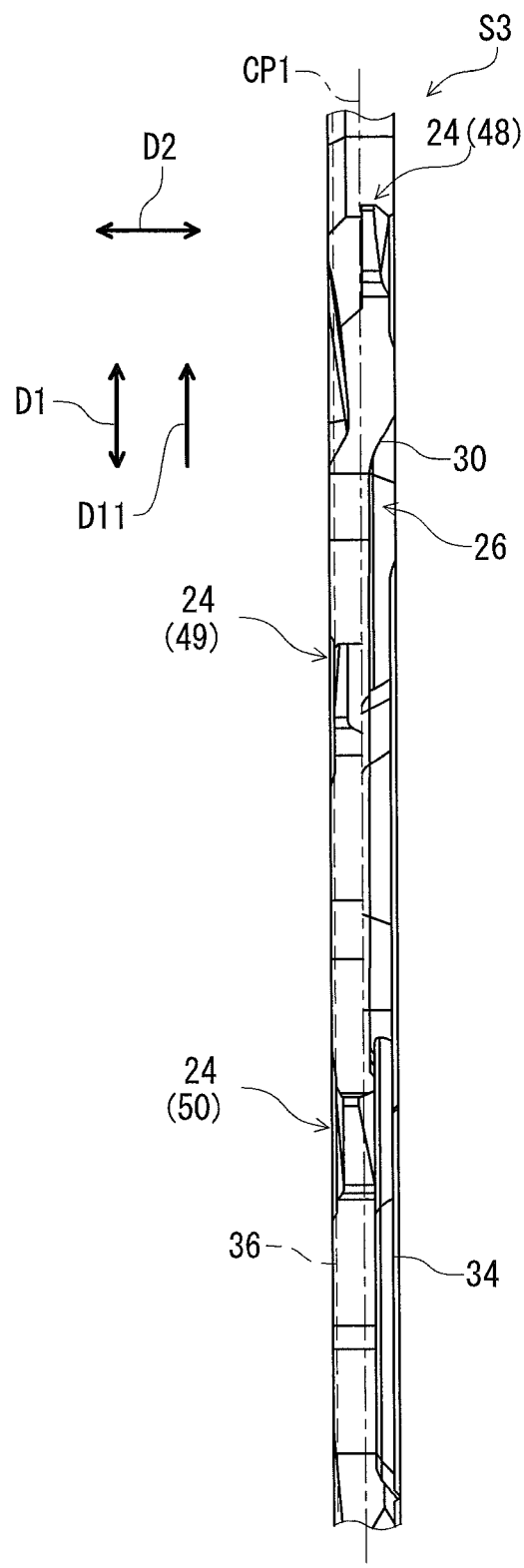
FIG. 11 is a partial edge elevational view of the bicycle sprocket illustrated in FIG. 3.

As seen in FIG. 3, the plurality of chain-engaging teeth 24 includes teeth 48. As seen in FIG. 11, the tooth 48 is preferably offset with respect to an axial center plane CP1 of the bicycle sprocket S3 toward the first axial side 34. The upshifting facilitation teeth 49 and 50 are offset with respect to the axial center plane CP1 toward the second axial side 36. The upshifting recessed portion 30 causes the upshifting facilitation teeth 49 and 50 to be offset with respect to the axial center plane CP1 toward the second axial side 36. As seen in FIG. 3, the tooth 48 is adjacent to the upshifting facilitation area 26. The upshifting facilitation teeth 49 and 50 are provided in the upshifting facilitation area 26.

The offset arrangement of the tooth 48 allows the bicycle chain C to be offset with respect to the axial center plane CP1 toward the neighboring smaller sprocket S4 (FIG. 2) in the axial direction D2. The upshifting facilitation teeth 49 and 50 are arranged to catch the bicycle chain C (FIG. 1) in a state where the bicycle chain C is positioned closer to the second axial side 36 without engaging with the bicycle sprocket S3. The upshifting facilitation teeth 49 and 50 are also arranged to facilitate disengagement of the bicycle chain C (FIG. 1) from the bicycle sprocket S3 in a state where the bicycle chain C engaging with the bicycle sprocket S3 is offset toward the neighboring smaller sprocket S4 in the axial direction D2.

Figure 12:
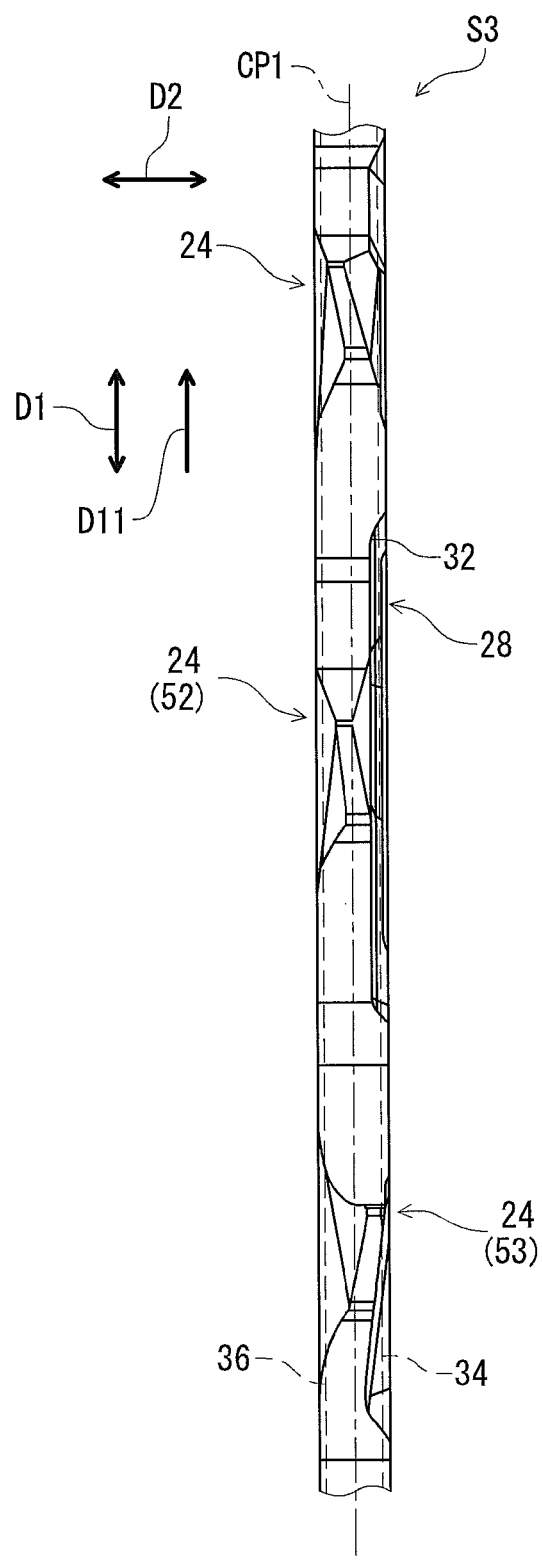
FIG. 12 is a partial edge elevational view of the bicycle sprocket illustrated in FIG. 3.

As seen in FIG. 12, the downshifting facilitation tooth 52 is offset with respect to the axial center plane CP1 of the bicycle sprocket S3 toward the second axial side 36. The tooth 53 is preferably offset with respect to the axial center plane CP1 toward the first axial side 34. The downshifting recessed portion 32 causes the downshifting facilitation tooth 52 to be offset with respect to the axial center plane CP1 toward the second axial side 36. As seen in FIG. 3, the downshifting facilitation tooth 52 is provided in the downshifting facilitation area 28. The tooth 53 is adjacent to the downshifting facilitation area 28.

The offset arrangement of the downshifting facilitation tooth 52 allows, during downshifting to the bicycle sprocket S3, the bicycle chain C to be positioned closer to the second axial side 36 of the bicycle sprocket S3 in the axial direction D2 with reducing interference between the bicycle chain C and the bicycle sprocket S3. The tooth 53 is arranged to catch the bicycle chain C in a state where the bicycle chain C is positioned closer to the bicycle sprocket S3 without engaging with the bicycle sprocket S3.

As seen in FIGS. 6 and 7, the sprocket body 14 has an axial width W1 defined in the axial direction D2 parallel to the rotational center axis A. The chain-engaging portion 38 has an axial chain-engaging width W2 defined in the axial direction D2. The axial chain-engaging width W2 is larger than the axial width W1 of the sprocket body 14.

The axial width W1 is defined between the first axial side 34 and the second axial side 36 in the axial direction D2. Namely, in the illustrated embodiment, the axial width W1 of the sprocket body 14 is defined as a thickness of the base portion 16. In each of the first and second chain-engaging groups G1 and G2, the axial chain-engaging width W2 is defined between the first chain-engaging surface 40 and the second chain-engaging surface 42 in the axial direction D2.

As seen in FIGS. 6 and 7, the axial chain-engaging width W2 is smaller than an axial inner distance W3 defined between opposed inner link plates of the bicycle chain C in the axial direction D2. A difference between the axial chain-engaging width W2 and the inner distance W3 is preferably equal to or smaller than 0.2 mm in the axial direction D2. The difference between the axial chain-engaging width W2 and the axial inner distance W3 is preferably equal to or larger than 0.1 mm in the axial direction D2. The difference between the axial chain-engaging width W2 and the axial inner distance W3 can be equal to or smaller than approximately 0.2 mm in the axial direction D2. The difference between the axial chain-engaging width W2 and the axial inner distance W3 can be equal to or larger than approximately 0.1 mm in the axial direction D2.

With the bicycle sprocket S3, the at least one shifting facilitation area 26 and/or 28 is configured to facilitate shifting the bicycle chain C for changing gears. Furthermore, since the axial chain-engaging width W2 of the chain-engaging portion 38 is larger than the axial width W1 of the sprocket body 14, it is possible to reduce a clearance between the chain-engaging portion 38 and the link plates C1 of the bicycle chain C with saving weight of the bicycle sprocket S3. The reducing of the clearance can prevent the bicycle chain C from unintentionally disengaging from the bicycle sprocket S3. Namely, it is possible to prevent the bicycle chain C from unintentionally disengaging from the bicycle sprocket S3 with saving weight of the bicycle sprocket S3.

Since other bicycle sprockets S1, S2 and S4 to S10 each have substantially the same structure as that of the bicycle sprocket S3, the bicycle sprockets S1, S2 and S4 to S10 each enable the same advantageous effect as that of the bicycle sprocket S3.

Similarly, since the structure of the bicycle sprocket S3 is applied to the bicycle sprocket assembly 10, it is possible to prevent the bicycle chain C from unintentionally disengaging from the bicycle sprocket assembly 10 with saving weight of the bicycle sprocket S3.

In addition to the above structures of the bicycle sprockets, the bicycle sprocket assembly 10 has features described below. The features of the bicycle sprocket assembly 10 will be described in detail below referring to FIGS. 1 and 13 to 17. Elements having substantially the same function as those in the bicycle sprocket S3 described above will be numbered the same here, and will not be described again in detail here for the sake of brevity.

In the illustrated embodiment, the bicycle sprocket S1 can be referred to as a first sprocket S1. The bicycle sprocket S10 can be referred to as a second sprocket S10. The bicycle sprocket S2 can be referred to as a third sprocket S2. The bicycle sprocket S9 can be referred to as a fourth sprocket S9. Other bicycle sprockets can be respectively referred to as the first to fourth bicycle sprockets. For example, the bicycle sprockets S10 and S11 can be referred to as third and fourth sprockets, respectively.

As seen in FIG. 1, the bicycle sprocket assembly 10 comprises the first sprocket S1, the second sprocket S10, the third sprocket S2, and the fourth sprocket S9. The third sprocket S2 is positioned between the first sprocket S1 and the second sprocket S10 in the axial direction D2 and adjacent to the first sprocket S1 without another sprocket. The fourth sprocket S9 is positioned between the second sprocket S10 and the third sprocket S2 in the axial direction D2 and adjacent to the second sprocket S10 without another sprocket.

Figure 13:
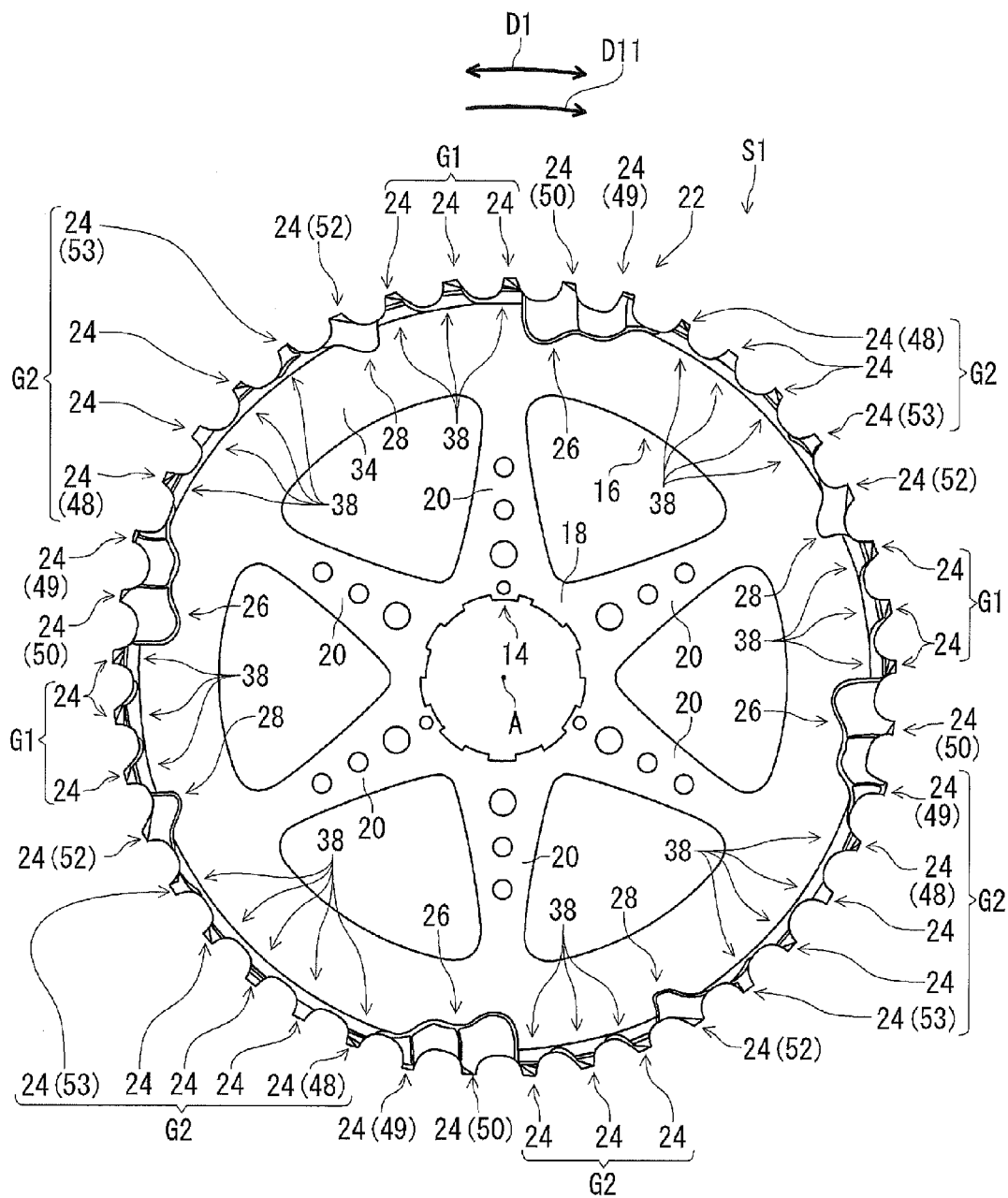
FIG. 13 is a right side elevational view of a bicycle sprocket of the bicycle sprocket assembly illustrated in FIG. 1.

As seen in FIG. 13, the first sprocket S1 includes a first sprocket body 14 and a first chain engagement structure 22. The first chain engagement structure 22 is arranged on a radially outer periphery of the first sprocket body 14. The first chain engagement structure 22 includes at least one first shifting facilitation area 26 and/or 28 and a plurality of first chain-engaging teeth 24.

The at least one first shifting facilitation area 26 and/or 28 is configured to facilitate changing gears. At least one of the plurality of first chain-engaging teeth 24 includes a first chain-engaging portion 38 configured to engage with the bicycle chain C. In the illustrated embodiment, each of at least two neighboring first chain-engaging teeth 24 includes the first chain-engaging portion 38.

Figure 14:
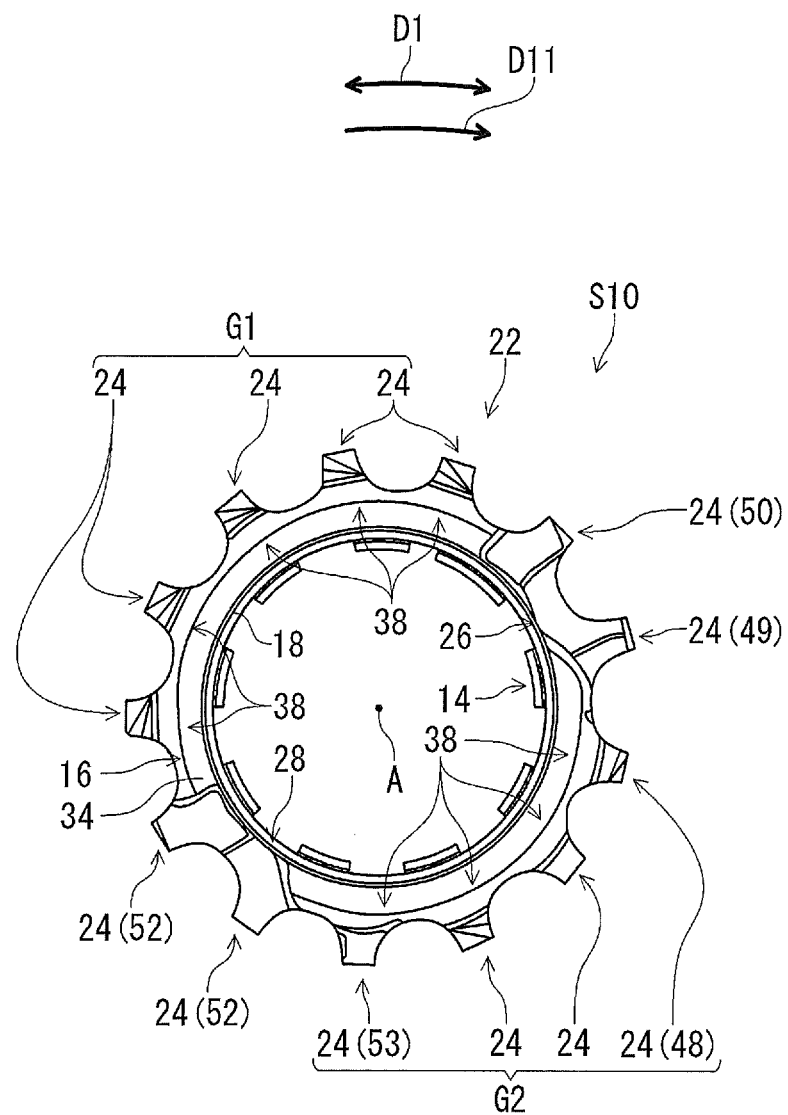
FIG. 14 is a right side elevational view of a bicycle sprocket of the bicycle sprocket assembly illustrated in FIG. 1.

As seen in FIG. 14, the second sprocket S10 includes a second sprocket body 14 and a second chain engagement structure 22. The second chain engagement structure 22 is arranged on a radially outer periphery of the second sprocket body 14. The second chain engagement structure 22 includes at least one second shifting facilitation area 26 and/or 28 and a plurality of second chain-engaging teeth 24.

The at least one second shifting facilitation area 26 and/or 28 is configured to facilitate changing gears. At least one of the plurality of second chain-engaging teeth 24 includes a second chain-engaging portion 38 configured to engage with the bicycle chain C. In the illustrated embodiment, each of at least two neighboring second chain-engaging teeth 24 includes the second chain-engaging portion 38.

As seen in FIGS. 13 and 14, a total number of the plurality of second chain-engaging teeth 24 is smaller than a total number of the plurality of first chain-engaging teeth 24.

Figure 15:
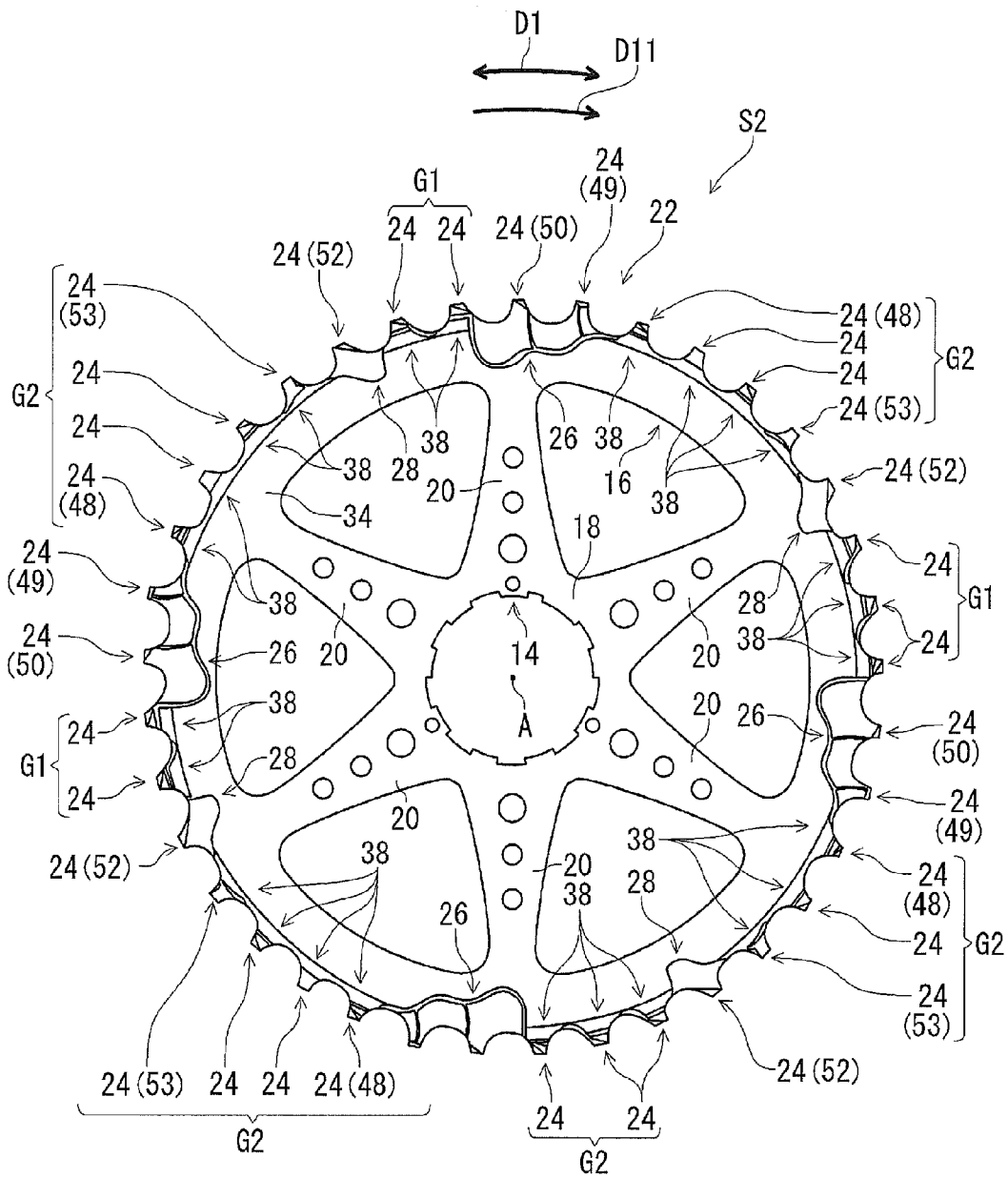
FIG. 15 is a right side elevational view of a bicycle sprocket of the bicycle sprocket assembly illustrated in FIG. 1.

As seen in FIG. 15, the third sprocket S2 includes a third sprocket body 14 and a third chain engagement structure 22. The third chain engagement structure 22 is arranged on a radially outer periphery of the third sprocket body 14. The third chain engagement structure 22 includes at least one third shifting facilitation area 26 and/or 28 and a plurality of third chain-engaging teeth 24.

The at least one third shifting facilitation area 26 and/or 28 is configured to facilitate changing gears. At least one of the plurality of third chain-engaging teeth 24 includes a third chain-engaging portion 38 configured to engage with the bicycle chain C. In the illustrated embodiment, each of at least two neighboring third chain-engaging teeth 24 includes the third chain-engaging portion 38.

As seen in FIGS. 13 to 15, a total number of the plurality of third chain-engaging teeth is smaller than the total number of the plurality of first chain-engaging teeth 24 and larger than the total number of the plurality of second chain-engaging teeth 24.

Figure 16:
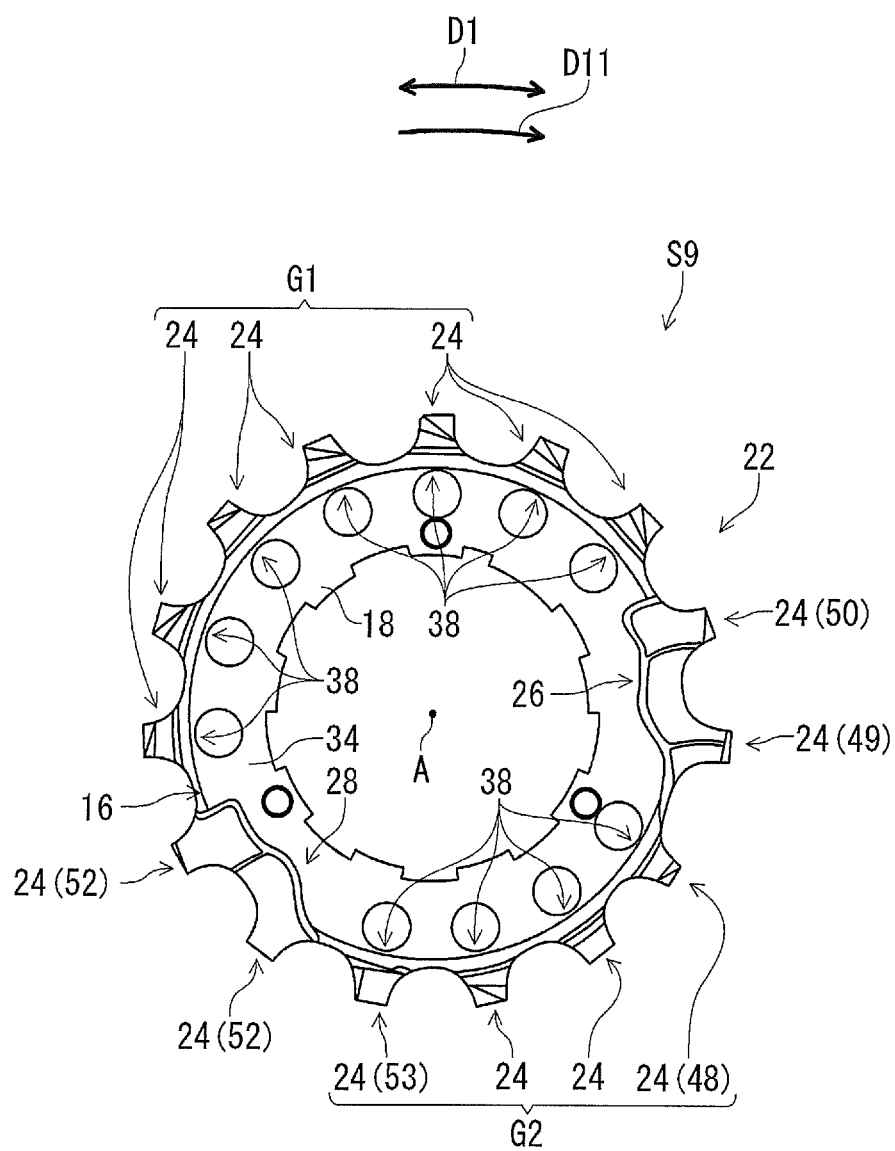
FIG. 16 is a right side elevational view of a bicycle sprocket of the bicycle sprocket assembly illustrated in FIG. 1.

As seen in FIG. 16, the fourth sprocket S9 includes a fourth sprocket body 14 and a fourth chain engagement structure 22. The fourth chain engagement structure 22 is arranged on a radially outer periphery of the fourth sprocket body 14. The fourth chain engagement structure 22 includes at least one fourth shifting facilitation area 26 and/or 28 and a plurality of fourth chain-engaging teeth 24.

The at least one fourth shifting facilitation area 26 and/or 28 is configured to facilitate changing gears. At least one of the plurality of fourth chain-engaging teeth 24 includes a fourth chain-engaging portion 38 configured to engage with the bicycle chain C. In the illustrated embodiment, each of at least two neighboring fourth chain-engaging teeth 24 includes the fourth chain-engaging portion 38.

As seen in FIGS. 14 to 16, a total number of the plurality of fourth chain-engaging teeth 24 is smaller than the total number of the plurality of third chain-engaging teeth 24 and larger than the total number of the plurality of second chain-engaging teeth 24.

Figure 17:
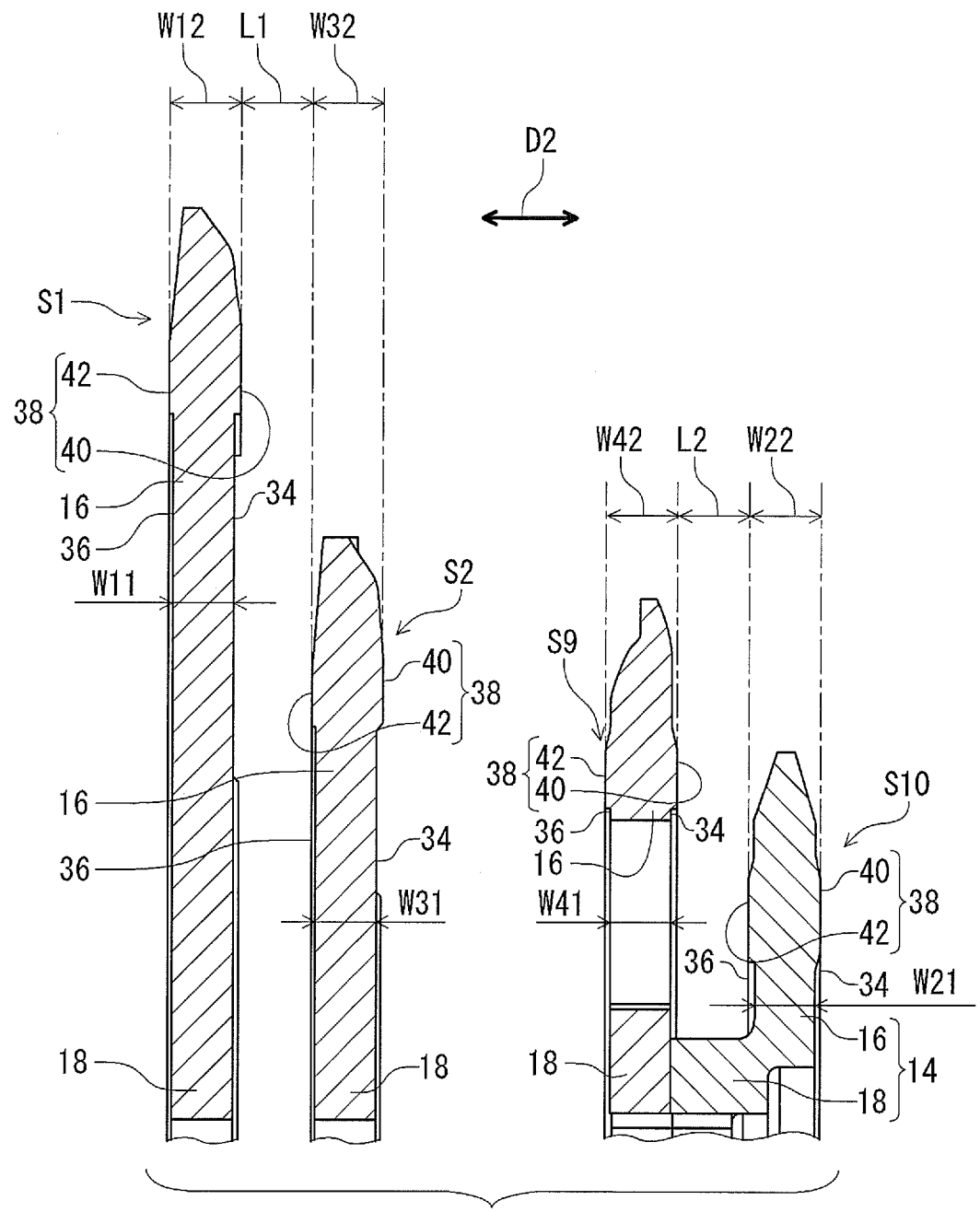
FIG. 17 is a partial cross-sectional view of the bicycle sprockets illustrated in FIGS. 13 to 16.

As seen in FIG. 17, in the first sprocket S1, the first sprocket body 14 has a first axial width W11 defined in the axial direction D2. The first chain-engaging portion 38 has a first axial chain-engaging width W12 defined in the axial direction D2 parallel to the rotational center axis A. The first axial chain-engaging width W12 is larger than the first axial width W11 of the first sprocket body 14. In the illustrated embodiment, the first axial width W11 is defined between the first axial side 34 and the second axial side 36 in the first sprocket S1. The first axial chain-engaging width W12 is defined between the first chain-engaging surface 40 and the second chain-engaging surface 42 in the first sprocket S1.

In the second sprocket S10, the second sprocket body 14 has a second axial width W21 defined in the axial direction D2. The second chain-engaging portion 38 has a second axial chain-engaging width W22 defined in the axial direction D2. The second axial chain-engaging width W22 is larger than the second axial width W21 of the second sprocket body 14. In the illustrated embodiment, the second axial width W21 is defined between the first axial side 34 and the second axial side 36 in the second sprocket S10. The second axial chain-engaging width W22 is defined between the first chain-engaging surface 40 and the second chain-engaging surface 42 in the second sprocket S10.

The first axial chain-engaging width W12 is different from the second axial chain-engaging width W22. The second axial chain-engaging width W22 is larger than the first axial chain-engaging width W12. In the illustrated embodiment, for example, the first axial chain-engaging width W12 is 1.84 mm, and the second axial chain-engaging width W22 is 2.1 mm.

Preferable axial chain-engaging widths are different in accordance with a sprocket specification such as a total number of the plurality of chain-engaging teeth or an outer diameter. With the bicycle sprocket assembly 10, since the first axial chain-engaging width W12 is different from the second axial chain-engaging width W21, it is possible to change axial chain-engaging widths in accordance with a sprocket specification of the bicycle sprocket. This can prevent the bicycle chain C from unintentionally disengaging from the bicycle sprocket S1 or S10. Especially, a smaller sprocket tends to unintentionally disengage from a bicycle sprocket more than a larger sprocket. Therefore, it is preferable to widen the axial chain-engaging width of a smaller sprocket more than the axial chain-engaging sprocket of a larger sprocket.

As seen in FIG. 17, in the third sprocket S2, the third sprocket body 14 has a third axial width W31 defined in the axial direction D2. The third chain-engaging portion 38 has a third axial chain-engaging width W32 defined in the axial direction A1. The third axial chain-engaging width W32 is larger than the third axial width W31 of the third sprocket body 14. In the illustrated embodiment, the third axial width W31 is defined between the first axial side 34 and the second axial side 36 in the third sprocket S2. The third axial chain-engaging width W32 is defined between the first chain-engaging surface 40 and the second chain-engaging surface 42 in the third sprocket S2.

In the fourth sprocket S9, the fourth sprocket body 14 has a fourth axial width W41 defined in the axial direction D2. The fourth chain-engaging portion 38 has a fourth axial chain-engaging width W42 defined in the axial direction A1. The fourth axial chain-engaging width W42 is larger than the fourth axial width W41 of the fourth sprocket body 14. In the illustrated embodiment, the fourth axial width W41 is defined between the first axial side 34 and the second axial side 36 in the fourth sprocket S9. The fourth axial chain-engaging width W42 is defined between the first chain-engaging surface 40 and the second chain-engaging surface 42 in the fourth sprocket S9.

As seen in FIG. 17, the first chain-engaging portion 38 of the first chain-engaging tooth 24 is apart from the third chain-engaging portion 38 of the third chain-engaging tooth 24 by a first axial distance L1 defined in the axial direction D2. The second chain-engaging portion 38 of the second chain-engaging tooth 24 is apart from the fourth chain-engaging portion 38 of the fourth chain-engaging tooth 24 by a second axial distance L2 defined in the axial direction D2. The first axial distance L1 is different from the second axial distance L2. The second axial distance L2 is larger than the first axial distance L1.

In the illustrated embodiment, the first axial distance L1 is defined between the first chain-engaging surface 40 of the first sprocket S1 and the second chain-engaging surface 42 of the third sprocket S2 in the axial direction D2. The second axial distance L2 is defined between the first chain-engaging surface 40 of the fourth sprocket S9 and the second chain-engaging surface 42 of the second sprocket S10 in the axial direction D2.

Preferable axial distances between adjacent sprockets are different in accordance with a sprocket specification such as a total number of the plurality of chain-engaging teeth or an outer diameter. For example, the first axial distance L1 has a preferable value for the smooth upshifting and/or downshifting between the first sprocket S1 and the third sprocket S2 in accordance with the total number of the sprocket teeth 24 of each of the first sprocket S1 and the third sprocket S2. Similarly, the second axial distance L2 has a preferable value for the smooth upshifting and/or downshifting between the fourth sprocket S9 and the second sprocket S10 in accordance with the total number of the sprocket teeth 24 of each of the fourth sprocket S9 and the second sprocket S10. Especially, it is preferable to design an axial distance between neighboring smaller sprockets to be larger than an axial distance between neighboring larger sprockets so as to prevent a bicycle chain from being excessively inflected between the neighboring smaller sprockets due to the smaller diameter of each of the neighboring smaller sprockets.

With the bicycle sprocket assembly 10, since the first axial distance L1 is different from the second axial distance L2, it is possible to change axial distances in accordance with specifications of the bicycle sprockets. This can prevent the bicycle chain C from unintentionally disengaging from the bicycle sprocket S1, S2, S9 or S10.

Second Embodiment

A bicycle sprocket S23 in accordance with a second embodiment will be described below referring to FIG. 18. The bicycle sprocket S23 has the same configuration as the bicycle sprocket S3 except for the shifting facilitation areas 26 and 28. Elements having substantially the same function as those in the first embodiment will be numbered the same here, and will not be described again in detail here for the sake of brevity.

Figure 18:
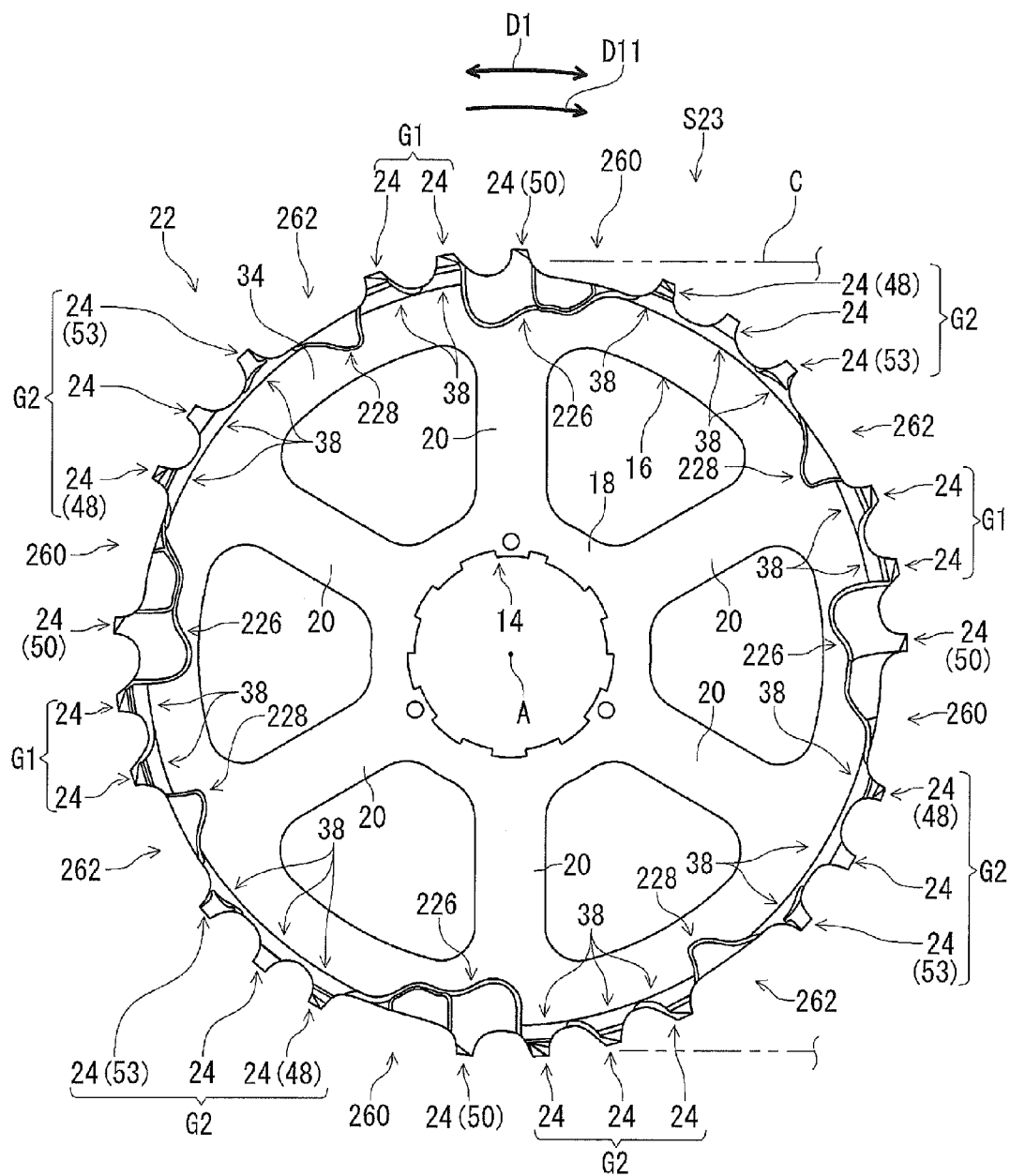
FIG. 18 is a right-side elevational view of a bicycle sprocket in accordance with a second embodiment.

As seen in FIG. 18, the chain engagement structure 22 of the bicycle sprocket S23 includes at least one shifting facilitation area 226 and/or 228 configured to facilitate changing gears. Unlike the shifting facilitation areas 26 and 28 in accordance with the first embodiment, the at least one shifting facilitation area 226 and/or 228 includes a tooth-free gap from which an additional chain-engaging tooth is free between adjacent two of the plurality of chain-engaging teeth 24. In the illustrated embodiment, the upshifting facilitation area 226 includes a tooth-free gap 260 from which an additional chain-engaging tooth is free between adjacent two of the plurality of chain-engaging teeth 24. The downshifting facilitation area 228 includes a tooth-free gap 262 from which an additional chain-engaging tooth is free between adjacent two of the plurality of chain-engaging teeth 24.

In the illustrated embodiment, the upshifting facilitation tooth 49 is omitted from each of the upshifting facilitation areas 226 to provide the tooth-free gap 260 between adjacent two of the plurality of chain-engaging teeth 24. The downshifting facilitation tooth 52 is omitted from each of the downshifting facilitation areas 228 to provide the tooth-free gap 262 between adjacent two of the plurality of chain-engaging teeth 24.

The tooth-free gap 260 is arranged to facilitate disengagement of the bicycle chain C from the bicycle sprocket S23 in the state where the bicycle chain C is offset toward the neighboring smaller sprocket S4 (FIG. 2) in the axial direction D2. The tooth-free gap 262 is arranged to facilitate catching the bicycle chain C by the chain-engaging tooth 24 in a state where the bicycle chain C is positioned closer to the bicycle sprocket S3 without engaging with the bicycle sprocket S3.

With the bicycle sprocket S23, since the at least one shifting facilitation area 226 and/or 228 includes the tooth-free gap 260 or 262, it is possible to facilitate changing gears in addition to the advantageous effect obtained by the bicycle sprocket S3 in accordance with the first embodiment.

While the upshifting facilitation tooth 49 and the downshifting facilitation tooth 52 are omitted from the shifting facilitation areas 226 and 228, one of the upshifting facilitation tooth 49 and the downshifting facilitation tooth 52 can be provided in the shifting facilitation area if needed and/or desired. Furthermore, the upshifting facilitation tooth 50 can be omitted from the upshifting facilitation area 226 instead of or in addition to the upshifting facilitation tooth 49 if needed and/or desired.

Third Embodiment

A bicycle sprocket assembly 310 in accordance with a third embodiment will be described below referring to FIGS. 19 to 37. The bicycle sprocket assembly 310 has substantially the same configuration as the bicycle sprocket assembly 10 except for the shifting facilitation areas 26 and 28. Elements having substantially the same function as those in the above embodiments will be numbered the same here, and will not be described again in detail here for the sake of brevity.

Figure 19:
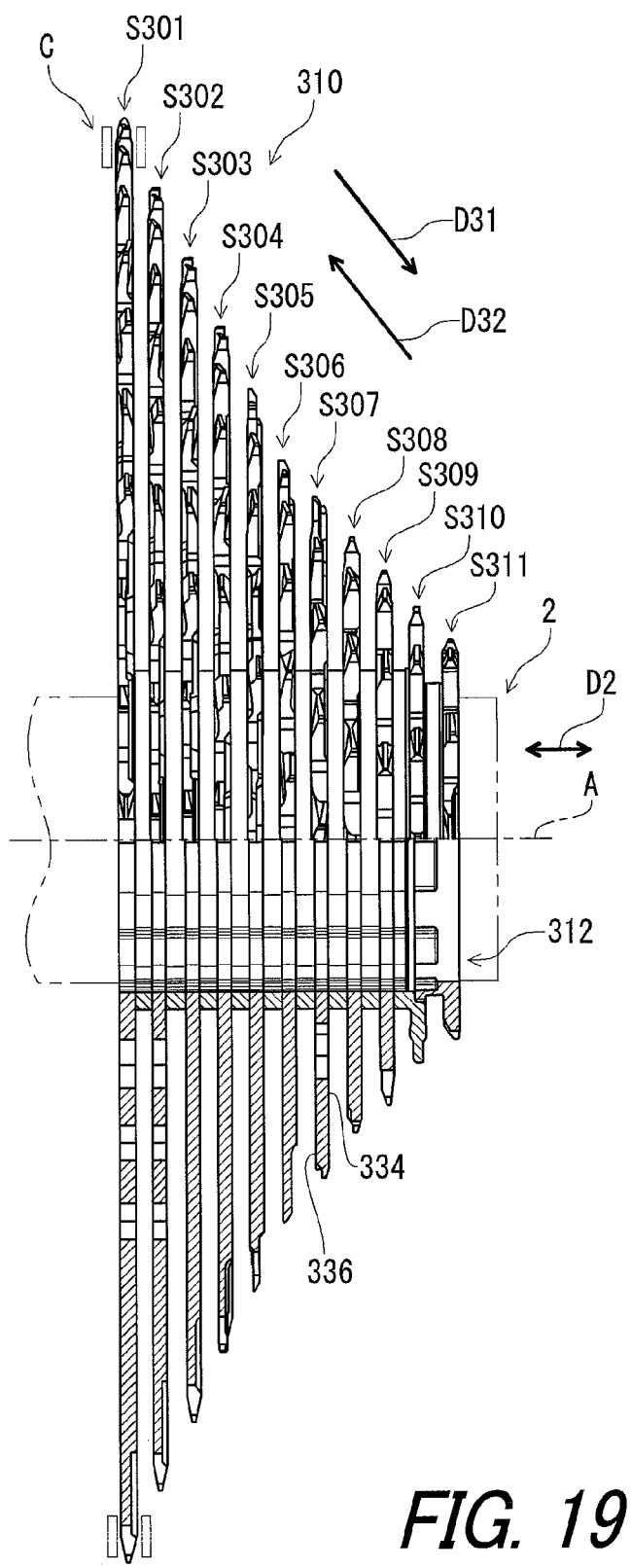
FIG. 19 is a rear elevational view of a bicycle sprocket assembly in accordance with a third embodiment with a partial cross-sectional view of the bicycle sprocket assembly.

As seen in FIG. 19, the bicycle sprocket assembly 310 is configured to engage with the bicycle chain C. The bicycle sprocket assembly 310 comprises a plurality of the bicycle sprockets. In the illustrated embodiment, the bicycle sprocket assembly 310 comprises eleven bicycle sprockets S301 to S311. The bicycle sprocket assembly 310 has the rotational center axis A.

The bicycle sprocket assembly 310 further comprises a hub engagement structure 312 configured to engage with the bicycle hub assembly 2. While the bicycle sprocket assembly 310 is a rear sprocket assembly in the illustrated embodiment, structures of the bicycle sprocket assembly 310 can be applied to a front sprocket assembly if needed and/or desired.

As seen in FIG. 19, the bicycle sprockets S301 to S311 are arranged in the axial direction D2 parallel to the rotational center axis A. The bicycle sprockets S301 to S311 are spaced apart from each other in the axial direction D2.

Since the bicycle sprockets S301 to S310 have substantially the same structure as each other, the bicycle sprocket S307 will be described and/or illustrated in detail here and other bicycle sprockets will not be described and/or illustrated in detail for the sake of brevity. Structures of the bicycle sprocket S307 can be applied to the bicycle sprocket S311 if needed and/or desired. Structures of the bicycle sprocket S307 can be also applied to a front sprocket if needed and/or desired.

Figure 20:
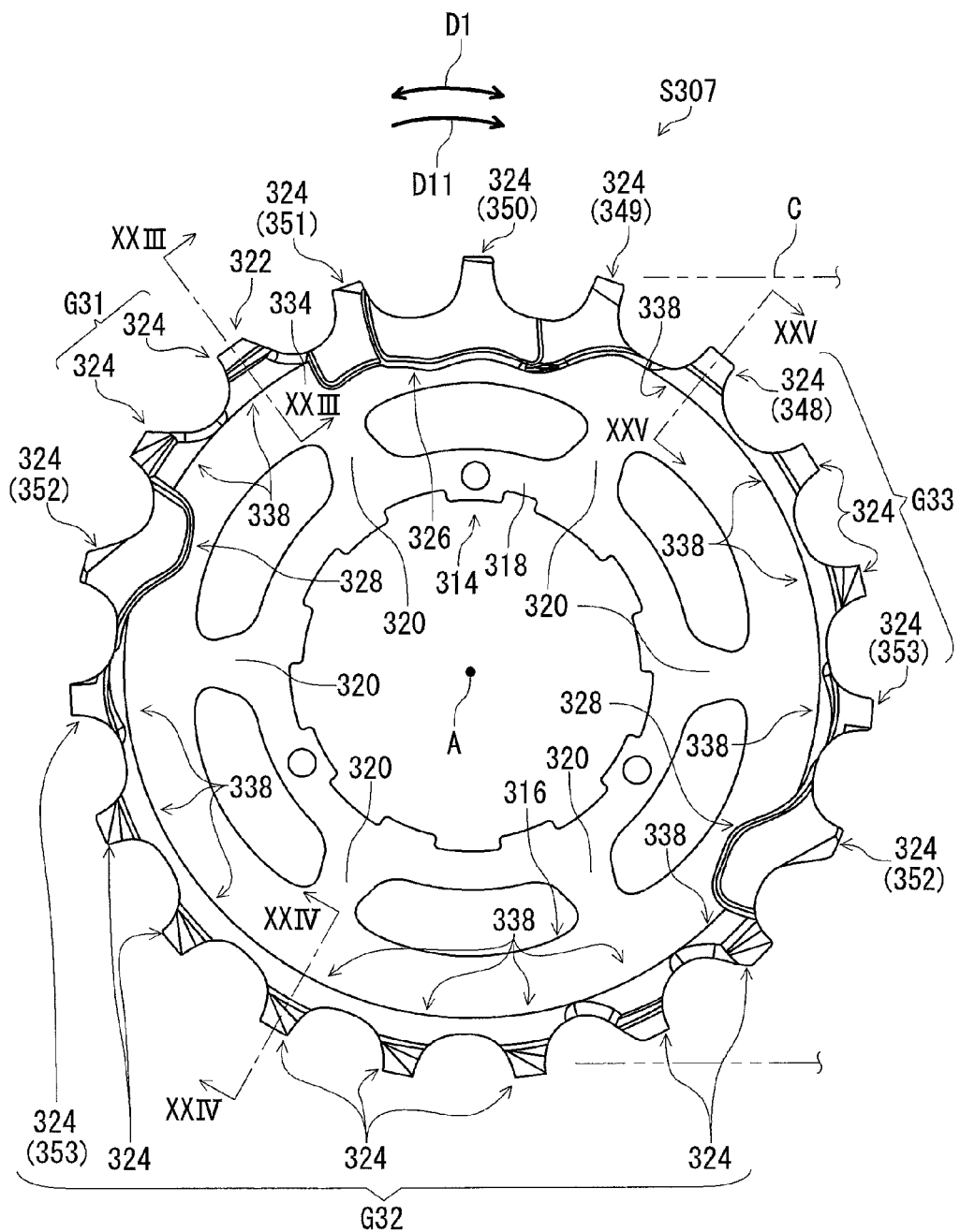
FIG. 20 is a right side elevational view of a bicycle sprocket of the bicycle sprocket assembly illustrated in FIG. 19.

As seen in FIG. 20, the bicycle sprocket S307 has the rotational center axis A. The bicycle sprocket S307 comprises a sprocket body 314 rotatable about the rotational center axis A. In the illustrated embodiment, the sprocket body 314 includes a base portion 316 having an annular shape. The sprocket body 314 includes a hub engagement portion 318 configured to engage with the bicycle hub assembly 2 (FIG. 19). The hub engagement portion 318 has an annular shape. The hub engagement portion 318 partially constitutes the hub engagement structure 312 (FIG. 19) of the bicycle sprocket assembly 310. The sprocket body 314 further includes arm portions 320 each connecting the base portion 316 with the hub engagement portion 318 in the illustrated embodiment. The arm portions 320 radially extend between the base portion 316 and the hub engagement portion 318. The sprocket body 314 can also have a disk-like shape without including arm portions 320 and openings that are each positioned between neighboring arm portions.

The bicycle sprocket S307 comprises a chain engagement structure 322 arranged on a radially outer periphery of the sprocket body 314. In the illustrated embodiment, the chain engagement structure 322 is arranged on a radially outer periphery of the base portion 316. The chain engagement structure 322 includes a plurality of chain-engaging teeth 324. The plurality of chain-engaging teeth 324 are each configured to engage with the bicycle chain C and are arranged in the circumferential direction D1.

As seen in FIG. 20, the chain engagement structure 322 includes at least one shifting facilitation area 326 and/or 328. The at least one shifting facilitation area 326 and/or 328 is configured to facilitate changing gears. The chain engagement structure 322 includes an upshifting facilitation area 326 configured to facilitate upshifting. The chain engagement structure 322 includes a downshifting facilitation area 328 configured to facilitate downshifting. In the illustrated embodiment, the chain engagement structure 322 includes two downshifting facilitation areas 328 configured to facilitate downshifting as the downshift facilitation area. The upshifting facilitation area 326 is configured to facilitate shifting the bicycle chain C from the bicycle sprocket S307 to a neighboring smaller sprocket S308 (FIG. 19). The downshifting facilitation area 328 is configured to facilitate shifting the bicycle chain C to the bicycle sprocket S307 from the neighboring smaller sprocket S308 (FIG. 19). The bicycle sprocket S308 can be also referred to as the neighboring smaller sprocket S308 (FIG. 19). The upshifting facilitation area 326 is provided between adjacent two of the downshifting facilitation areas 328 in the illustrated embodiment.

As seen in FIG. 19, the neighboring smaller sprocket S308 is adjacent to the bicycle sprocket S307 without another sprocket and has a total number of teeth less than a total number of the plurality of chain-engaging teeth 324.

Figure 21:
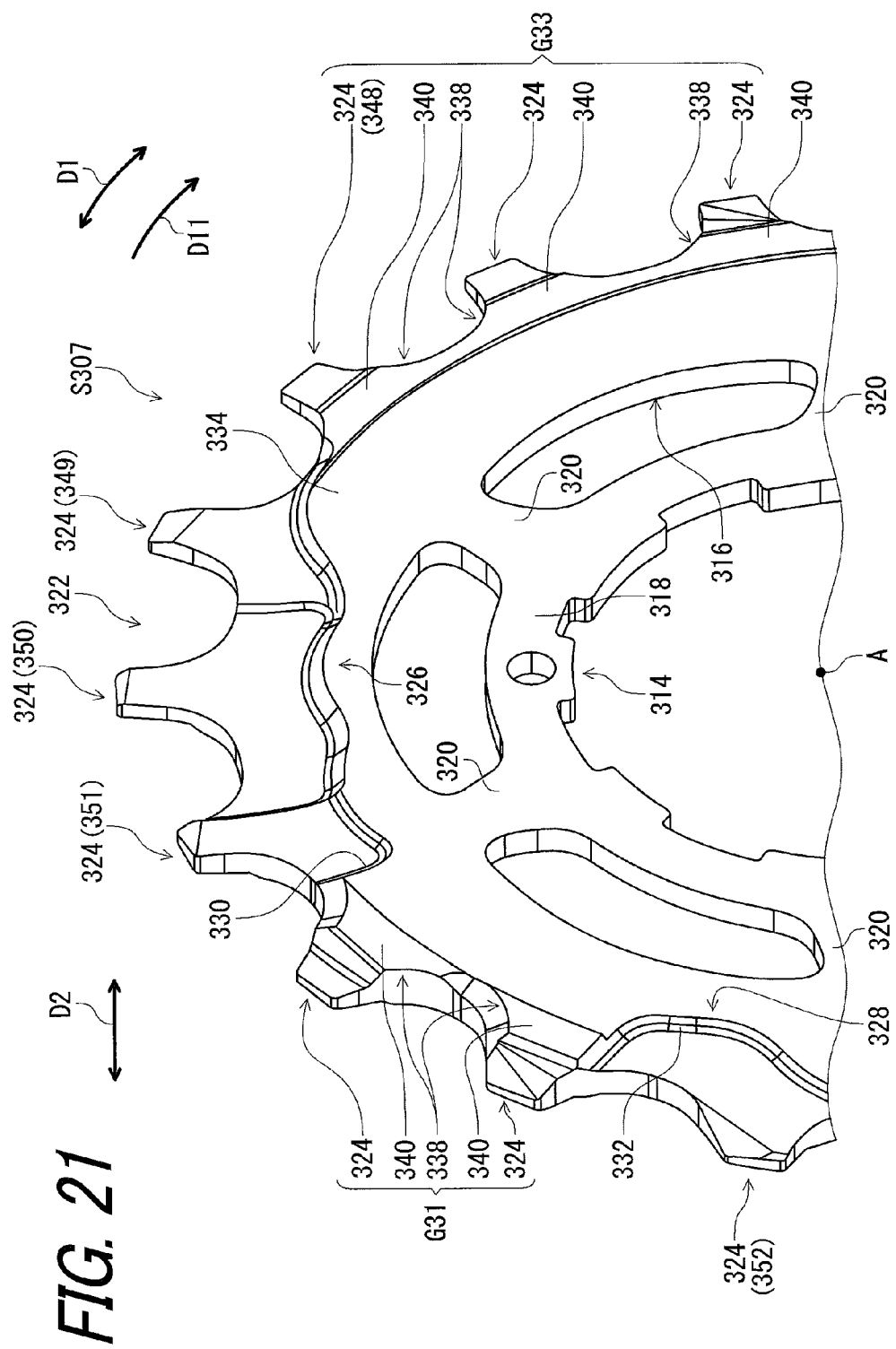
FIG. 21 is a partial perspective view of the bicycle sprocket illustrated in FIG. 20.

As seen in FIG. 21, the upshifting facilitation area 326 includes an upshifting recessed portion 330 recessed in the axial direction D2 parallel to the rotational center axis A. The downshifting facilitation area 328 includes a downshifting recessed portion 332 recessed in the axial direction D2 parallel to the rotational center axis A. The upshifting recessed portion 330 is configured to reduce interference between the bicycle chain C (FIG. 20) and the bicycle sprocket S307 during upshifting from the bicycle sprocket S307 to the bicycle sprocket S308 (FIG. 19). The downshifting recessed portion 332 is configured to reduce interference between the bicycle chain C (FIG. 20) and the bicycle sprocket S307 during downshifting from the bicycle sprocket S308 (FIG. 19) to the bicycle sprocket S307.

As seen in FIG. 19, the bicycle sprocket S307 further comprises a first axial side 334 and a second axial side 336 opposite to the first axial side 334 in the axial direction D2.

The first axial side 334 is configured to face in the axial direction D2. The second axial side 336 is configured to face in the axial direction D2. The first axial side 334 is configured to face the neighboring smaller sprocket S308 in the bicycle sprocket assembly 310. The second axial side 336 is configured to face the bicycle sprocket 5306 in the bicycle sprocket assembly 310.

As seen in FIGS. 20 and 21, the upshifting recessed portion 330 is provided on the first axial side 334. Each of the downshifting recessed portions 332 is provided on the first axial side 334. More specifically, the upshifting recessed portion 330 is at least partially provided on the base portion 316 of the sprocket body 314. Each of the downshifting recessed portions 332 is at least partially provided on the base portion 316 of the sprocket body 314.

Figure 22:
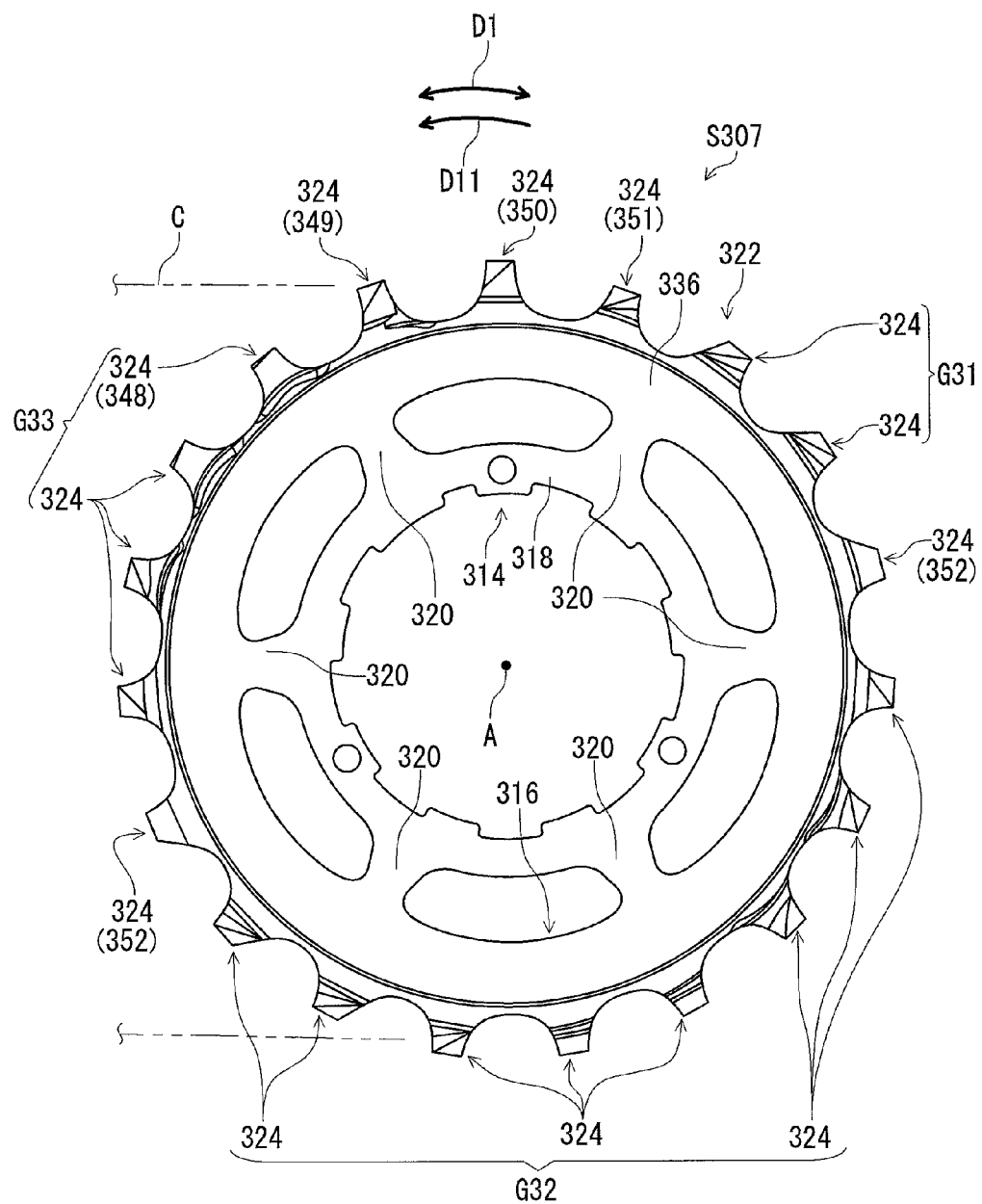
FIG. 22 is a left side elevational view of the bicycle sprocket illustrated in FIG. 20.

In the illustrated embodiment, as seen in FIG. 22, the upshifting recessed portion 330 is not provided on the second axial side 336. Each of the downshifting recessed portions 332 is not provided on the second axial side 336.

As seen in FIG. 20, the plurality of chain-engaging teeth 324 includes at least two neighboring chain-engaging teeth 324 each including a chain-engaging portion 338 configured to engage with the bicycle chain C. In the illustrated embodiment, the plurality of chain-engaging teeth 324 include a first chain-engaging group G31, a second chain-engaging group G32, and a third chain-engaging group G33. The first chain-engaging group G31 includes neighboring two chain-engaging teeth 324 each including the chain-engaging portion 338. The second chain-engaging group G32 includes neighboring eight chain-engaging teeth 324 each including the chain-engaging portion 338. The third chain-engaging group G33 includes neighboring four chain-engaging teeth 324 each including the chain-engaging portion 338.

Figure 23:
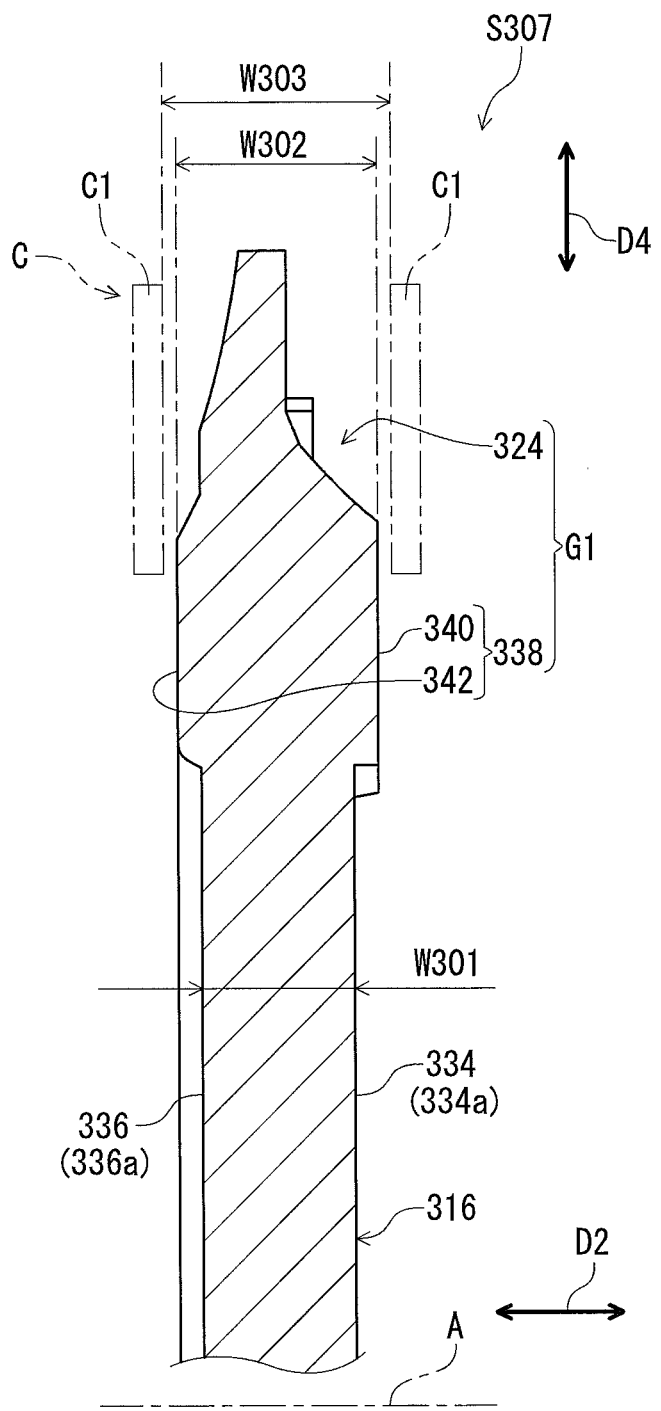
FIG. 23 is a partial cross-sectional view of the bicycle sprocket taken along line XXIII-XXIII of FIG. 20.
Figure 24:
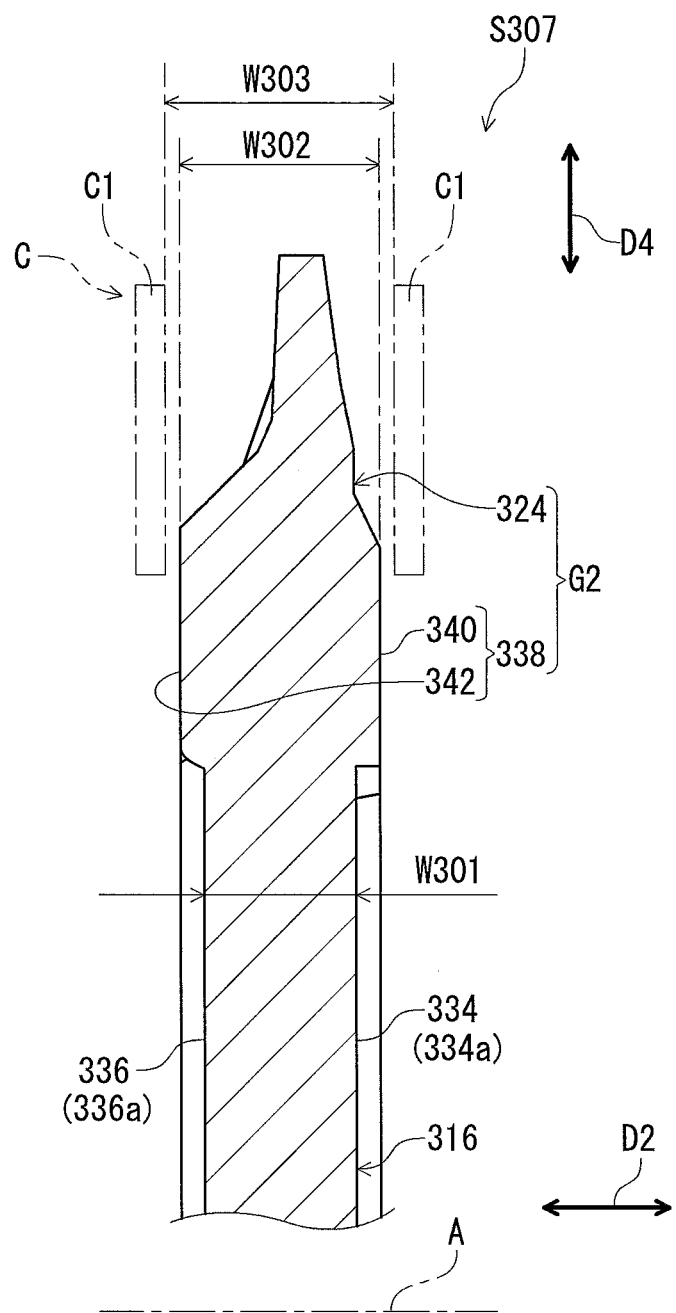
FIG. 24 is a partial cross-sectional view of the bicycle sprocket taken along line XXIV-XXIV of FIG. 20.
Figure 25:
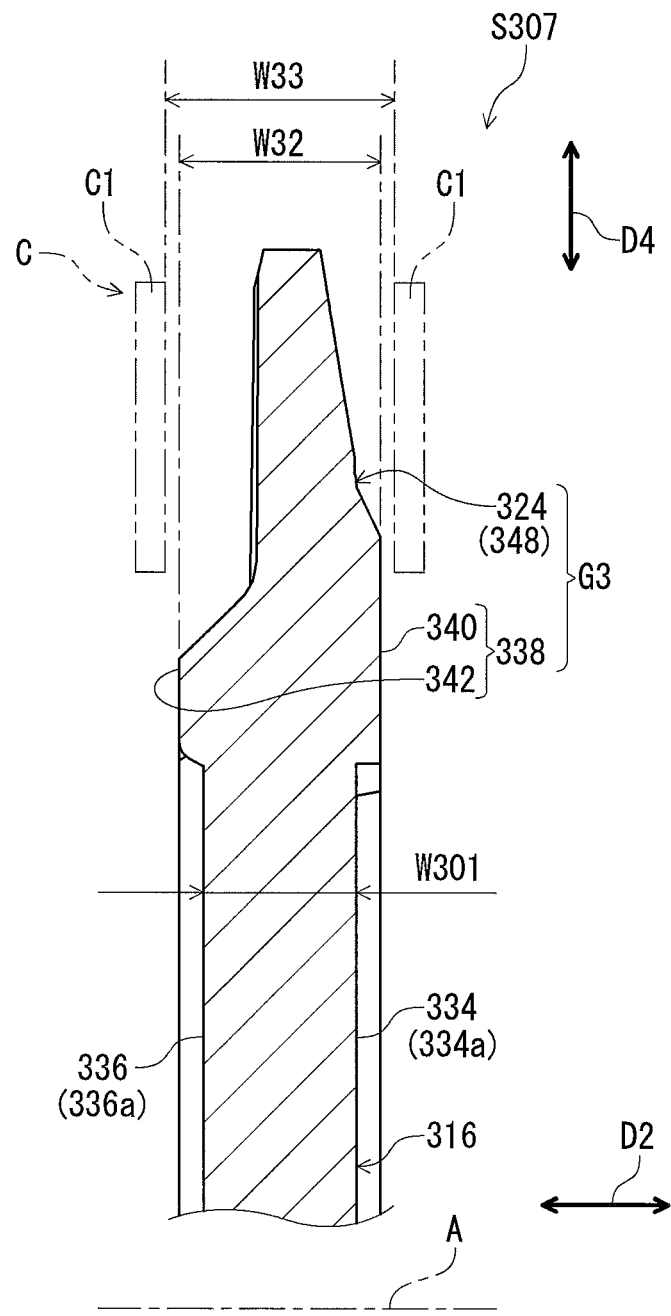
FIG. 25 is a partial cross-sectional view of the bicycle sprocket taken along line XXV-XXV of FIG. 20.

As seen in FIGS. 23 to 25, in each of the first, second and third chain-engaging groups G31, G32 and G33, the chain-engaging portion 338 includes a first chain-engaging surface 340 and a second chain-engaging surface 342. In the illustrated embodiment, each of the first chain-engaging surface 340 and the second chain-engaging surface 342 is a flat surface. Each of the first chain-engaging surface 340 and the second chain-engaging surface 342 is configured to face in the axial direction D2. Each of the first chain-engaging surface 340 and the second chain-engaging surface 342 extends substantially perpendicularly relative to the axial direction D2.

The chain-engaging portion 338 is configured to partly engage with a link plate C1 of the bicycle chain C in a radial direction D4 of the bicycle sprocket S307. In the illustrated embodiment, the chain-engaging portion 338 is contactable with the link plate C1 (an inner link plate in FIGS. 23 to 25) of the bicycle chain C. The chain-engaging portion 338 is configured to face the link plate C1 in the axial direction D2.

As seen in FIGS. 23 to 25, the sprocket body 314 has an axial width W301 defined in the axial direction D2 parallel to the rotational center axis A. The chain-engaging portion 338 has an axial chain-engaging width W302 defined in the axial direction D2. The axial chain-engaging width W302 is larger than the axial width W301 of the sprocket body 314.

The axial width W301 is defined between the first axial side 334 and the second axial side 336 in the axial direction D2. Namely, in the illustrated embodiment, the axial width W301 of the sprocket body 314 is defined as a thickness of the base portion 316. In each of the first and second chain-engaging groups G31 and G32, the axial chain-engaging width W302 is defined between the first chain-engaging surface 340 and the second chain-engaging surface 342 in the axial direction D2. One of the first chain-engaging surface 340 and the second chain-engaging surface 342 may be flush with a first base surface 334a disposed on the first axial side 334 or a second base surface 336a disposed on the second axial side 336 of the base portion 316 so that the axial chain-engaging width W302 is larger than the axial width W301 of the sprocket body 314.

As seen in FIGS. 23 to 25, the axial chain-engaging width W302 is smaller than an axial inner distance W303 defined between opposed inner link plates C1 of the bicycle chain C in the axial direction D2. A difference between the axial chain-engaging width W302 and the axial inner distance W303 is preferably equal to or smaller than 0.2 mm in the axial direction D2. The difference between the axial chain-engaging width W302 and the axial inner distance W303 is preferably equal to or larger than 0.1 mm in the axial direction D2. The difference between the axial chain-engaging width W302 and the axial inner distance W303 can be equal to or smaller than approximately 0.2 mm in the axial direction D2. The difference between the axial chain-engaging width W302 and the axial inner distance W303 can be equal to or larger than approximately 0.1 mm in the axial direction D2.

As seen in FIG. 21, the first chain-engaging surfaces 340 are provided on the first axial side 334. In each of the first, second and third chain-engaging groups G31, G32 and G33, the first chain-engaging surfaces 340 are connected with each other to provide one flat surface in the illustrated embodiment. The first chain-engagement surfaces 340 may also be divided into a plurality of flat surfaces.

Figure 26:
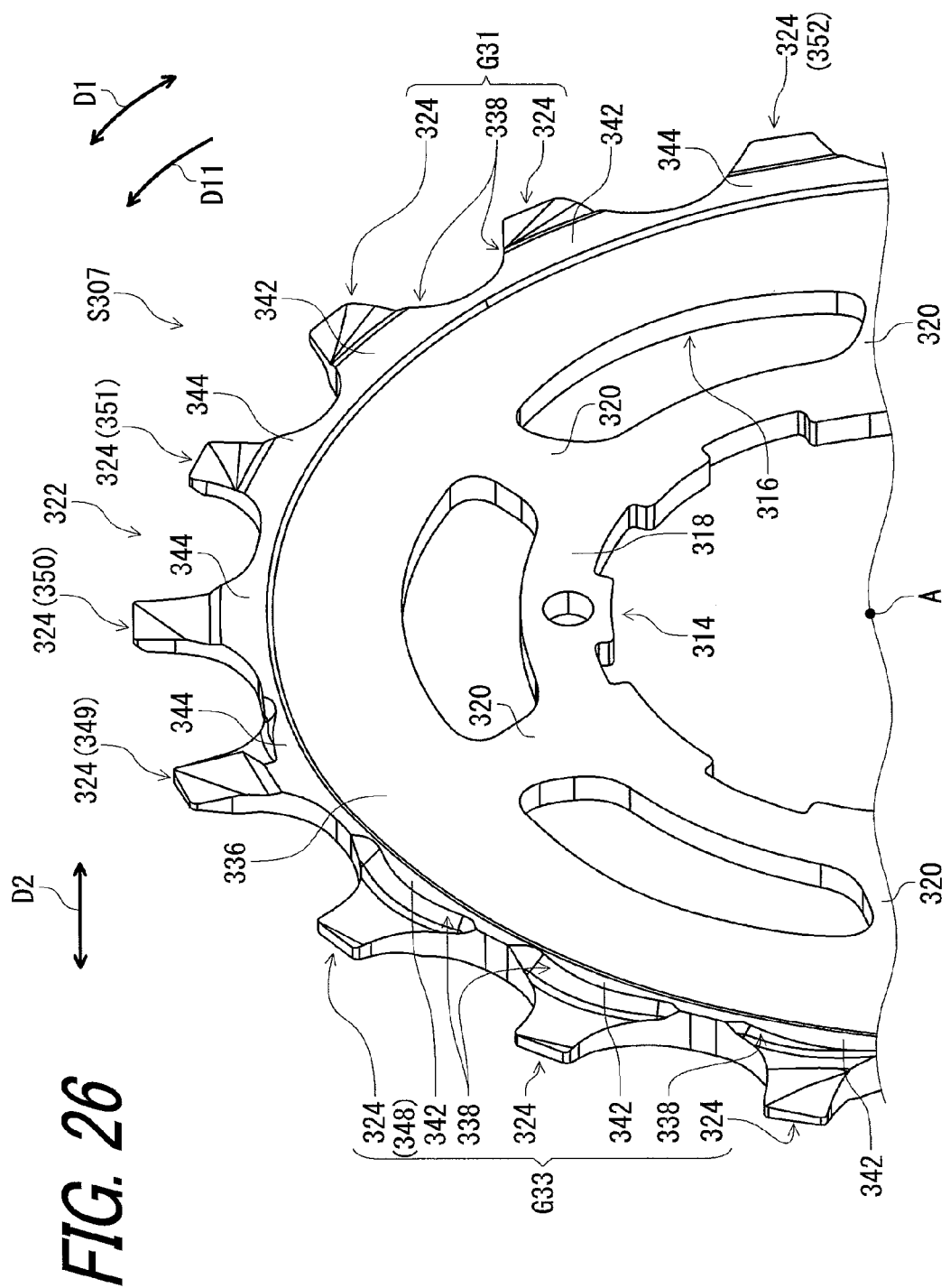
FIG. 26 is a partial perspective view of the bicycle sprocket illustrated in FIG. 20.

As seen in FIG. 26, the second chain-engaging surfaces 342 are provided on the second axial side 336. In each of the first, second and third chain-engaging groups G31, G32 and G33, the second chain-engaging surfaces 342 are connected with each other to provide one flat surface. The second chain-engagement surfaces 342 may also be divided into a plurality of flat surfaces. Each of the chain-engaging teeth 324 other than the first, second and third chain-engaging groups G31, G32 and G33 includes a slidable surface 344. The second chain-engaging surfaces 342 and the slidable surfaces 344 are connected with each other to provide one annular flat surface in the illustrated embodiment (FIGS. 22 and 26). The second chain-engaging surfaces 342 and the slidable surfaces 344 may also be divided into a plurality of flat surfaces.

Figure 27:
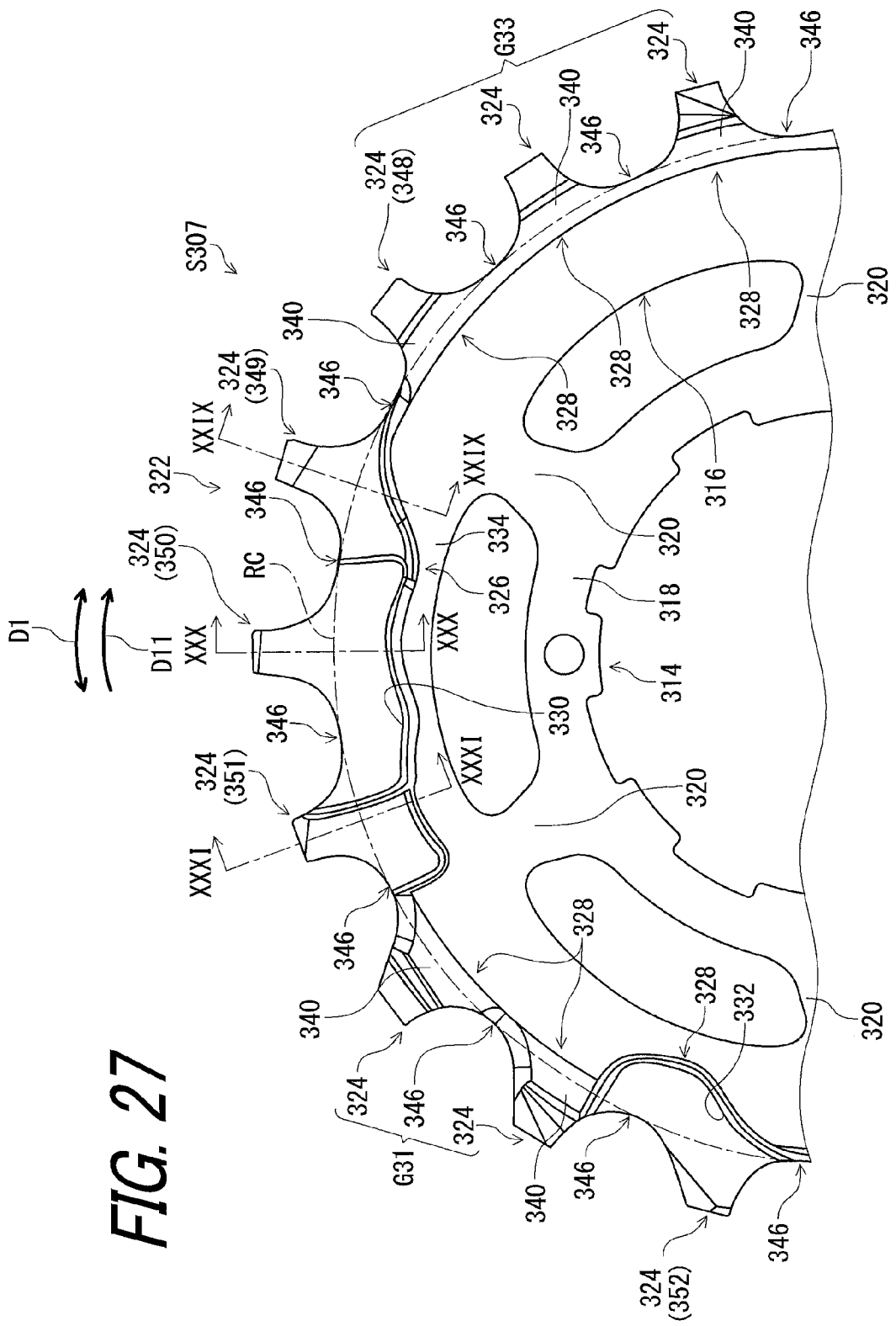
FIG. 27 is a right side partial elevational view of the bicycle sprocket illustrated in FIG. 20.

As seen in FIG. 27, the sprocket teeth 324 include tooth bottoms 346 defining a root circle RC. The radially outer periphery of the sprocket body 314 (the radially outer periphery of the base portion 316) corresponds to the root circle RC. The root circle RC is disposed on each of the first chain-engaging surfaces 340 when viewed from the axial direction D2 (a direction perpendicular to a paper surface of FIG. 27).

Figure 28:
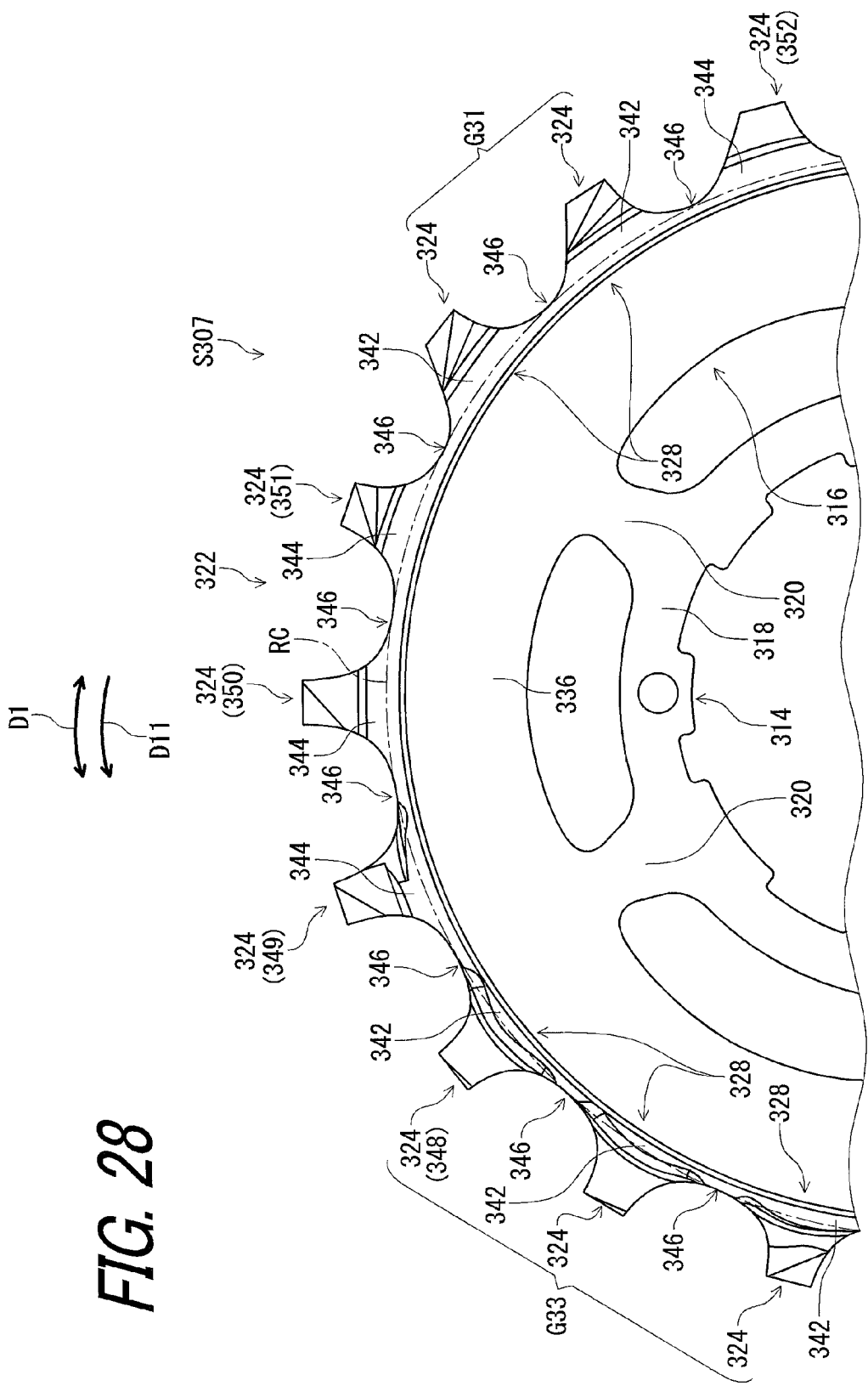
FIG. 28 is a left side partial elevational view of the bicycle sprocket illustrated in FIG. 20.

As seen in FIG. 28, the root circle RC is disposed on each of the second chain-engaging surfaces 342 when viewed from the axial direction D2 (a direction perpendicular to a paper surface of FIG. 28).

As seen in FIG. 20, the plurality of chain-engaging teeth 324 includes at least three upshifting facilitation teeth configured to facilitate upshifting. The at least three upshifting facilitation teeth are adjacent to each other without another tooth between the at least three upshifting facilitation teeth. The at least three upshifting facilitation teeth are provided in the upshifting facilitation area 326.

In the illustrated embodiment, the at least three upshifting facilitation teeth includes a first upshifting facilitation tooth 349, a second upshifting facilitation tooth 350, and a third upshifting facilitation tooth 351. The second upshifting facilitation tooth 350 is positioned between the first upshifting facilitation tooth 349 and the third upshifting facilitation tooth 351 in the circumferential direction D1 with respect to the rotational center axis A. The first, second and third upshifting facilitation teeth 349, 350 and 351 are provided in the upshifting facilitation area 326.

The second upshifting facilitation tooth 350 is adjacent to the first upshifting facilitation tooth 349 without another chain-engaging tooth between the first upshifting facilitation tooth 349 and the second upshifting facilitation tooth 350. The second upshifting facilitation tooth 350 is adjacent to the third upshifting facilitation tooth 351 without another chain-engaging tooth between the second upshifting facilitation tooth 350 and the third upshifting facilitation tooth 351. The first upshifting facilitation tooth 349 is provided on a rotational downstream side relative to the second upshifting facilitation tooth 350 in the rotational driving direction D11 in which the bicycle sprocket S307 rotates about the rotational center axis A during pedaling.

Figure 29:
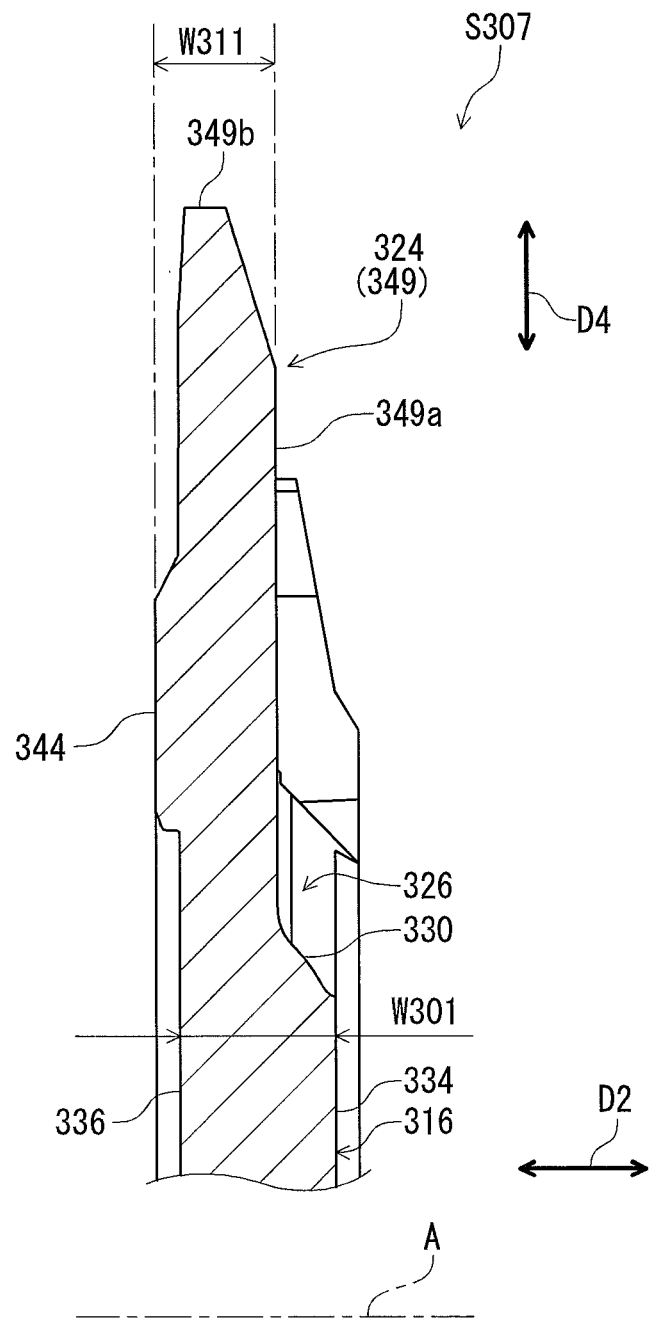
FIG. 29 is a partial cross-sectional view of the bicycle sprocket taken along line XXIX-XXIX of FIG. 27.

As seen in FIG. 29, the first upshifting facilitation tooth 349 has a first tooth width W311 defined in the axial direction D2 parallel to the rotational center axis A. The first upshifting facilitation tooth 349 includes a first surface 349a configured to face in the axial direction D2. The first surface 349a is provided between the first axial side 334 and the second axial side 336 in the axial direction D2. The first surface 349a is opposite to the slidable surface 344 in the axial direction D2 and is closer to the first axial side 334 than to the second axial side 336 in the axial direction D2. The first tooth width W311 is defined between the slidable surface 344 and the first surface 349a in the axial direction D2.

Figure 30:
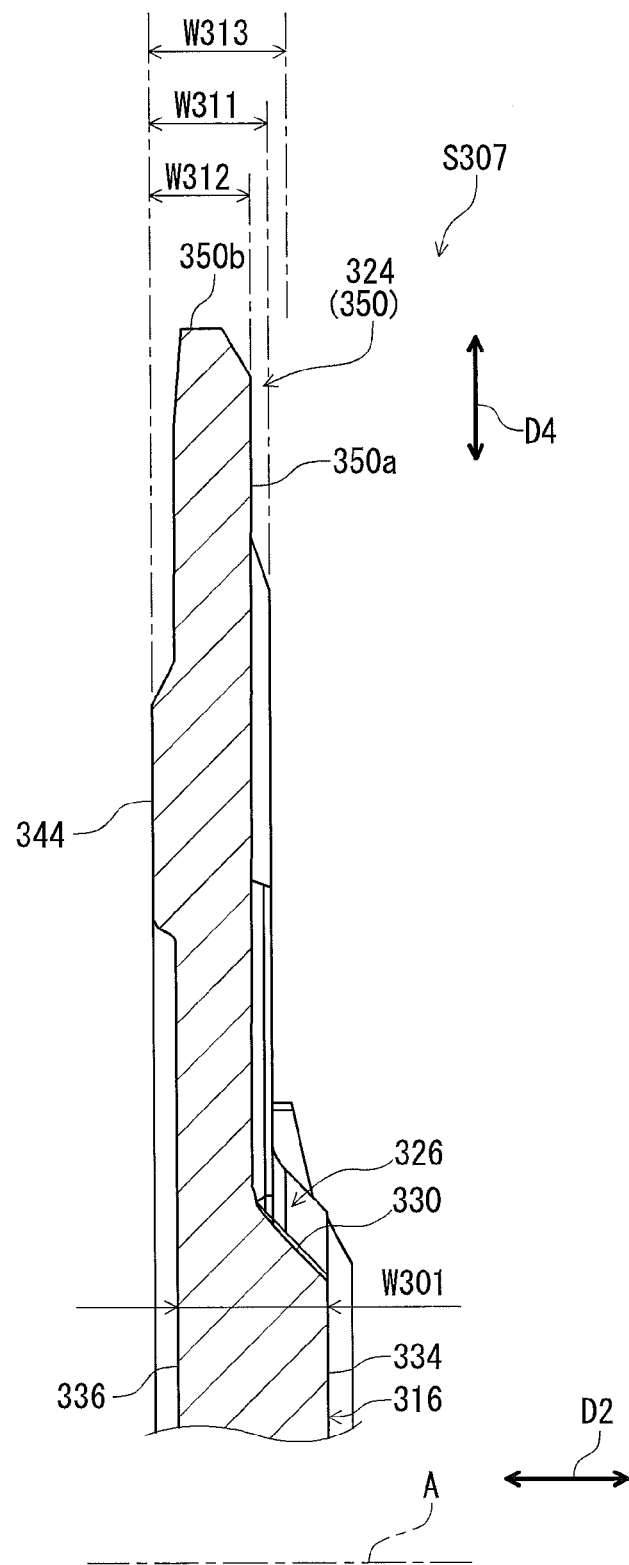
FIG. 30 is a partial cross-sectional view of the bicycle sprocket taken along line XXX-XXX of FIG. 27.

As seen in FIG. 30, the second upshifting facilitation tooth 350 has a second tooth width W312 defined in the axial direction D2. The second upshifting facilitation tooth 350 includes a second surface 350a configured to face in the axial direction D2. The second surface 350a is provided between the first axial side 334 and the second axial side 336 in the axial direction D2. The second surface 350a is opposite to the slidable surface 344 in the axial direction D2 and is closer to the second axial side 336 than to the first axial side 334 in the axial direction D2. The second tooth width W312 is defined between the slidable surface 344 and the second surface 350a in the axial direction D2.

Figure 31:
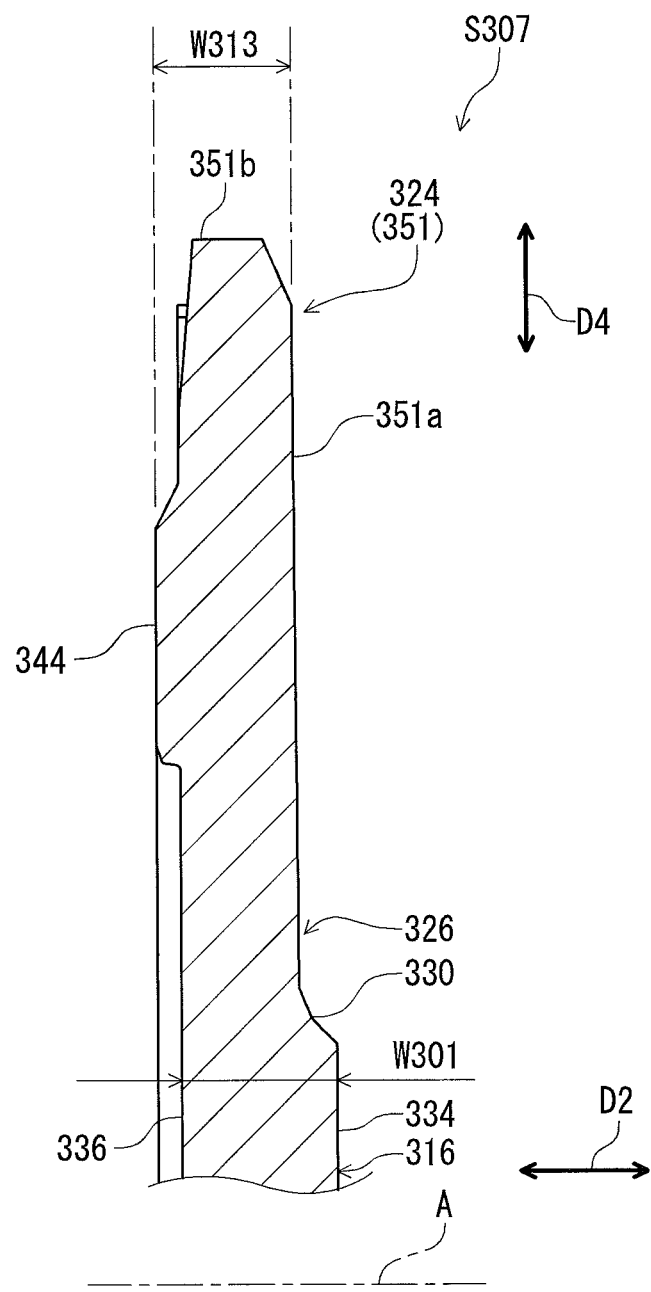
FIG. 31 is a partial cross-sectional view of the bicycle sprocket taken along line XXXI-XXXI of FIG. 27.

As seen in FIG. 31, the third upshifting facilitation tooth 351 has a third tooth width W313 defined in the axial direction D2. The third upshifting facilitation tooth 351 includes a third surface 351a configured to face in the axial direction D2. The third surface 351a is provided between the first axial side 334 and the second axial side 336 in the axial direction D2. The third surface 351a is opposite to the slidable surface 344 in the axial direction D2 and is closer to the first axial side 334 than to the second axial side 336 in the axial direction D2. The third tooth width W313 is defined between the slidable surface 344 and the third surface 351a in the axial direction D2.

As seen in FIGS. 29 to 31, the second tooth width W312 is smaller than the first tooth width W311. The second tooth width W312 is smaller than the third tooth width W313. The first tooth width W311 is smaller than the third tooth width W313. Each of the first, second and third tooth widths W311, W312 and W313 is smaller than the axial width W301 of the sprocket body 314. Namely, each of the first, second and third tooth widths W311, W312 and W313 is smaller than the axial chain-engaging width W302 (FIGS. 23 to 25). The magnitude relationship between the first, second and third tooth widths W311, W312 and W313 is not limited to the illustrated embodiment.

As seen in FIG. 20, the plurality of chain-engaging teeth 324 includes a downstream tooth 348 provided on a rotational downstream side relative to the first upshifting facilitation tooth 349 in the rotational driving direction D11. The downstream tooth 348 is provided outside of the upshifting facilitation area 326. The downstream tooth 348 is adjacent to the upshifting facilitation area 326 without another chain-engaging tooth between the downstream tooth 348 and the upshifting facilitation area 326. The downstream tooth 348 is adjacent to the first upshifting facilitation tooth 349 without another chain-engaging tooth between the downstream tooth 348 and the first upshifting facilitation tooth 349.

The first upshifting facilitation tooth 349 is configured to shift an inner link plate C1 of the bicycle chain C toward the neighboring smaller sprocket S308 after the downstream tooth 348 engages with an outer link plate C2 of the bicycle chain C during an upshifting operation. The second upshifting facilitation tooth 350 is configured to shift an inner link plate C1 of the bicycle chain C toward the neighboring smaller sprocket S308 after the first upshifting facilitation tooth 349 engages with an outer link plate C2 of the bicycle chain C during another upshifting operation.

In other words, the plurality of chain-engaging teeth 324 includes at least two upshifting initiation teeth configured to shift the bicycle chain C first toward the neighboring smaller sprocket S308 during an upshifting operation. The at least two upshifting initiation teeth are adjacent to each other without another tooth between the at least two upshifting initiation teeth. The at least two upshifting initiation teeth are provided in the upshifting facilitation area 326.

In the illustrated embodiment, as seen in FIG. 20, the at least two upshifting initiation teeth includes a first upshifting initiation tooth 349 and a second upshifting initiation tooth 350. Namely, the first upshifting facilitation tooth 349 can also be referred to as the first upshifting initiation tooth 349. The second upshifting facilitation tooth 350 can also be referred to as the second upshifting initiation tooth 350. The second upshifting initiation tooth 350 is adjacent to the first upshifting initiation tooth 349 without another tooth between the first upshifting initiation tooth 349 and the second upshifting initiation tooth 350. The first upshifting initiation tooth 349 is provided on a rotational downstream side relative to the second upshifting initiation tooth 350 in the rotational driving direction D11 in which the bicycle sprocket S307 rotates about the rotational center axis A during pedaling.

The plurality of chain-engaging teeth 324 includes the downstream tooth 348 provided on a rotational downstream side relative to the first upshifting initiation tooth 349 in the rotational driving direction D11. The first upshifting initiation tooth 349 is configured to shift the inner link plate C1 of the bicycle chain C toward the neighboring smaller sprocket S308 after the downstream tooth 348 engages with the outer link plate C2 of the bicycle chain C during an upshifting operation. The second upshifting initiation tooth 350 is configured to shift an inner link plate C1 of the bicycle chain C toward the neighboring smaller sprocket S308 after the first upshifting initiation tooth 349 engages with an outer link plate C2 of the bicycle chain C during another upshifting operation.

The plurality of chain-engaging teeth 324 include at least one downshifting facilitation tooth configured to facilitate shifting the bicycle chain C toward the bicycle sprocket S307 from the neighboring smaller sprocket S308. In the illustrated embodiment, the plurality of chain-engaging teeth 324 includes downshifting facilitation teeth 352 as the at least one downshifting facilitation tooth. Each of the downshifting facilitation teeth 352 is configured to facilitate shifting the bicycle chain C toward the bicycle sprocket S307 from the neighboring smaller sprocket S308 (FIG. 19). The downshifting facilitation tooth 352 is provided in the downshifting facilitation area 328. Instead of the downshifting facilitation tooth 352, a tooth-free gap may be formed at the location of the downshifting facilitation tooth 352 as a part of the downshifting facilitation area 328.

As seen in FIG. 20, the plurality of chain-engaging teeth 324 includes upstream teeth 353 respectively provided on a rotational upstream side relative to the downshifting facilitation teeth 352 in the rotational driving direction D11. The upstream tooth 353 is adjacent to the downshifting facilitation area 328.

Figure 32:
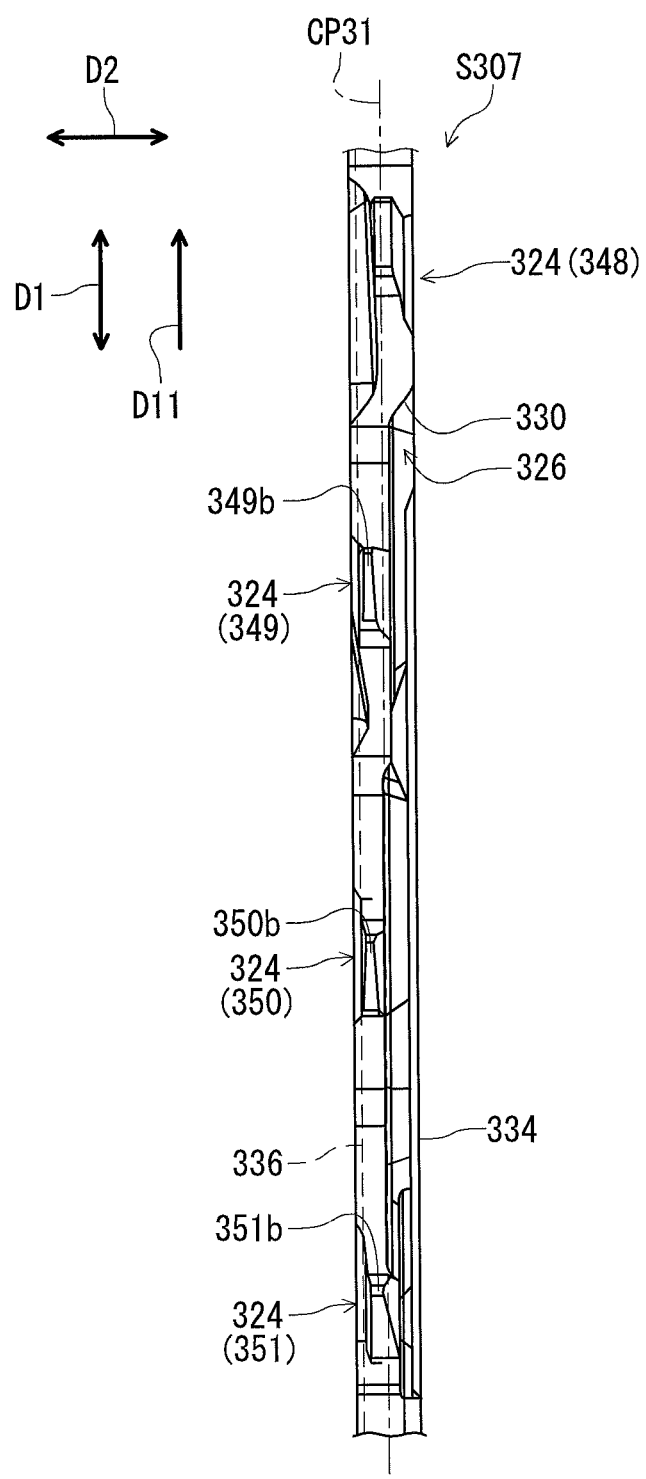
FIG. 32 is a partial edge elevational view of the bicycle sprocket illustrated in FIG. 20.

As seen in FIG. 32, the downstream tooth 348 is preferably offset with respect to an axial center plane CP31 of the bicycle sprocket S307 toward the first axial side 334. The upshifting recessed portion 330 is recessed from the first axial side 334 toward the second axial side 336 in the axial direction D2. The first, second and third upshifting facilitation teeth 349, 350 and 351 are offset with respect to the axial center plane CP31 toward the second axial side 336. The upshifting recessed portion 330 causes the first, second and third upshifting facilitation teeth 349, 350 and 351 to be offset with respect to the axial center plane CP31 toward the second axial side 336.

Each of the at least three upshifting facilitation teeth has a tooth-top positioned closer to the second axial side 336 than the first axial side 334 in the axial direction D2. In the illustrated embodiment, the first upshifting facilitation tooth 349 has a tooth-top 349b positioned closer to the second axial side 336 than the first axial side 334 in the axial direction D2. The second upshifting facilitation tooth 350 has a tooth-top 350b positioned closer to the second axial side 336 than the first axial side 334 in the axial direction D2. The third upshifting facilitation tooth 351 has a tooth-top 351b positioned closer to the second axial side 336 than the first axial side 334 in the axial direction D2.

In other words, each of the at least two upshifting initiation teeth has a tooth-top positioned closer to the second axial side than the first axial side in the axial direction. In the illustrated embodiment, the first upshifting initiation tooth 349 has the tooth-top 349b positioned closer to the second axial side 336 than the first axial side 334 in the axial direction D2. The second upshifting initiation tooth 350 has the tooth-top 350b positioned closer to the second axial side 336 than the first axial side 334 in the axial direction D2.

In the illustrated embodiment, as seen in FIG. 29, the tooth-top 349b is disposed at an outermost end of the first upshifting facilitation tooth 349 in the radial direction D4 relative to the rotational center axis A. As seen in FIG. 30, the tooth-top 350b is disposed at an outermost end of the second upshifting facilitation tooth 350 in the radial direction D4 relative to the rotational center axis A. As seen in FIG. 31, the tooth-top 351b is disposed at an outermost end of the third upshifting facilitation tooth 351 in the radial direction D4 relative to the rotational center axis A.

The offset arrangement of the downstream tooth 348 allows the bicycle chain C to be offset with respect to the axial center plane CP31 toward the neighboring smaller sprocket S308 (FIG. 19) in the axial direction D2. The first, second and third upshifting facilitation teeth 349, 350 and 351 are arranged to facilitate disengagement of the bicycle chain C from the bicycle sprocket S307 in a state where the bicycle chain C engaging with the bicycle sprocket S307 is offset toward the neighboring smaller sprocket S308 in the axial direction D2.

Figure 33:
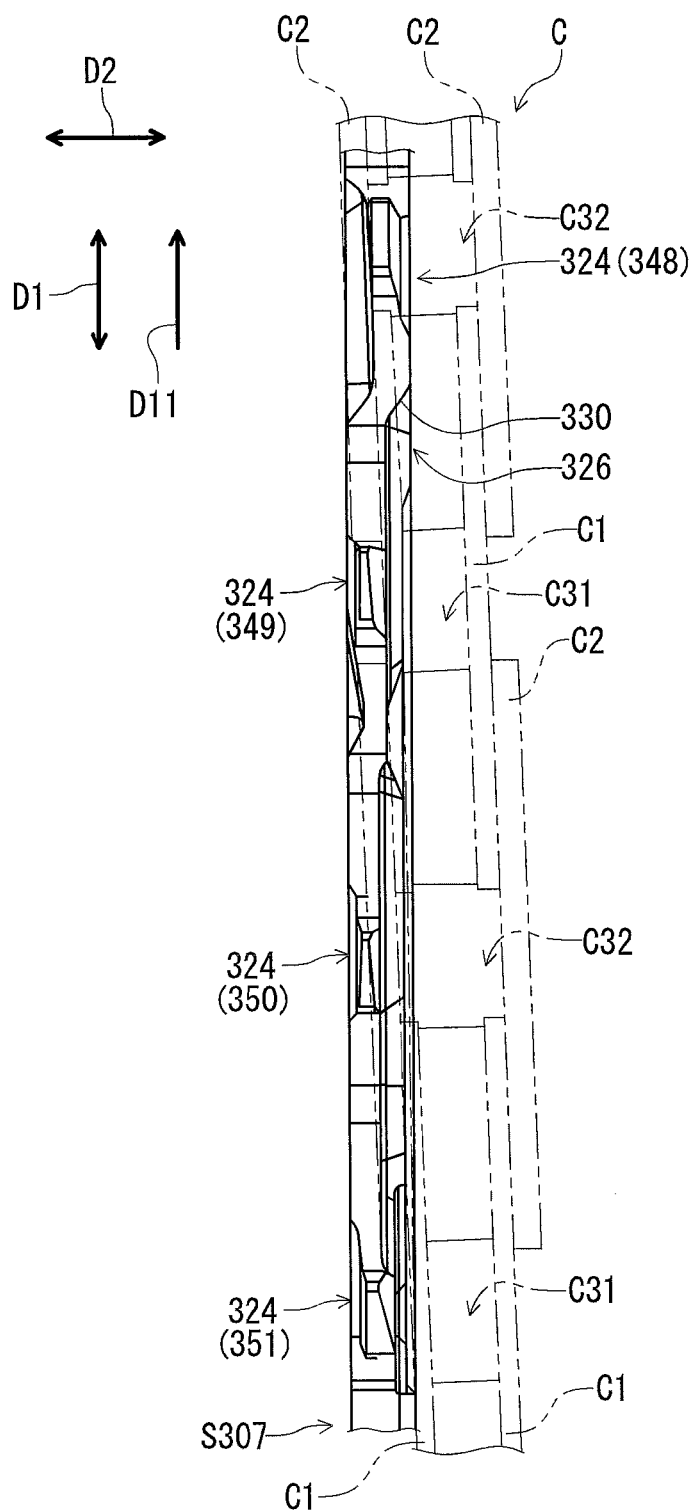
FIG. 33 is a partial edge elevational view of the bicycle sprocket illustrated in FIG. 20 for showing positional relationship between the bicycle sprocket and a bicycle chain.

As seen in FIG. 33, for example, the first upshifting facilitation tooth 349 shifts the inner link plate C1 of the bicycle chain C toward the neighboring smaller sprocket S308 after the downstream tooth 348 engages with the outer link plate C2 of the bicycle chain C during the upshifting operation. More specifically, the bicycle chain C includes inner engagement spaces C31 and outer engagement spaces C32. The inner engagement space C31 is defined between the opposed inner link plates C1. The outer engagement space C32 is defined between the opposed outer link plates C2. The first upshifting facilitation tooth 349 shifts the inner link plate C1 of the bicycle chain C toward the neighboring smaller sprocket S308 without entering the inner engagement space C31 after the downstream tooth 348 enters the outer engagement space C32 during the upshifting operation.

Figure 34:
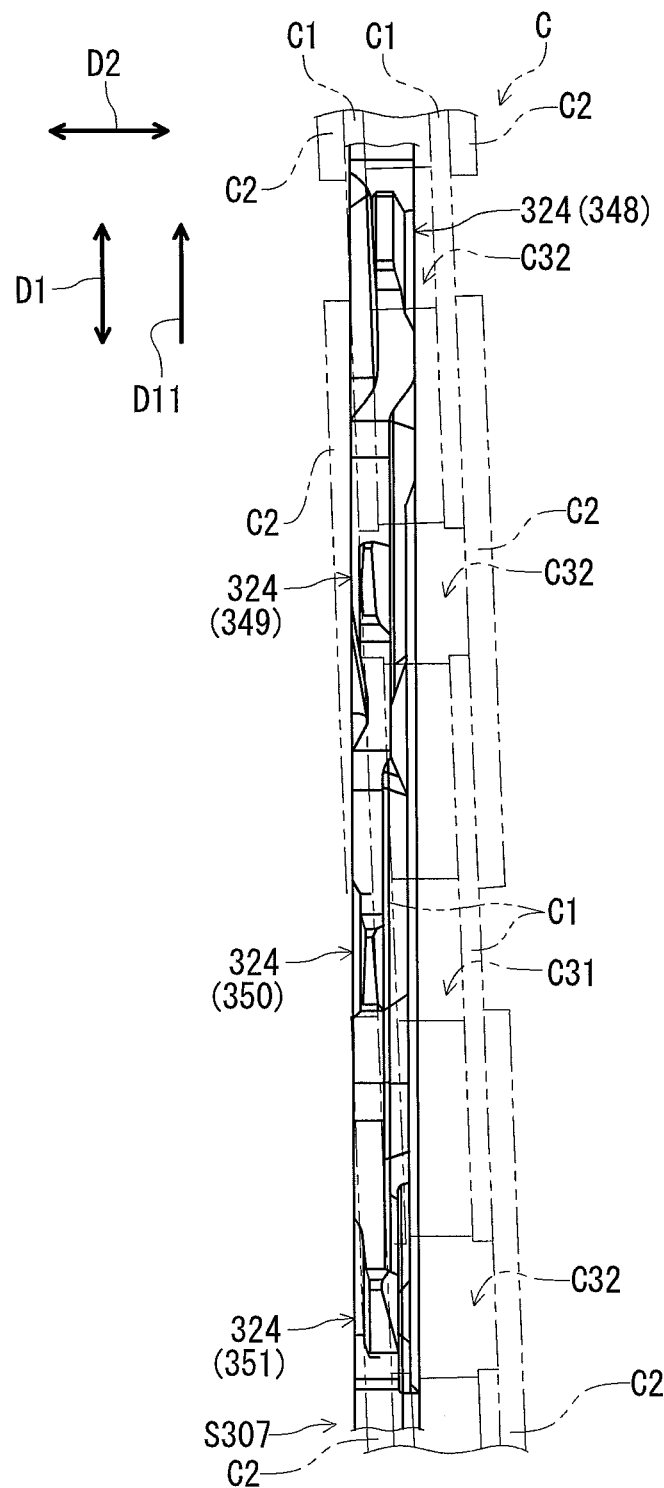
FIG. 34 is a partial edge elevational view of the bicycle sprocket illustrated in FIG. 20 for showing positional relationship between the bicycle sprocket and a bicycle chain.

As seen in FIG. 34, the second upshifting facilitation tooth 350 shifts the inner link plate C1 of the bicycle chain C toward the neighboring smaller sprocket S308 after the first upshifting facilitation tooth 349 engages with the outer link plate C2 of the bicycle chain C during another upshifting operation. More specifically, the second upshifting facilitation tooth 350 shifts the inner link plate C1 of the bicycle chain C toward the neighboring smaller sprocket S308 without entering the inner engagement space C31 after the first upshifting facilitation tooth 349 enters the outer engagement space C32 during another upshifting operation.

Figure 35:
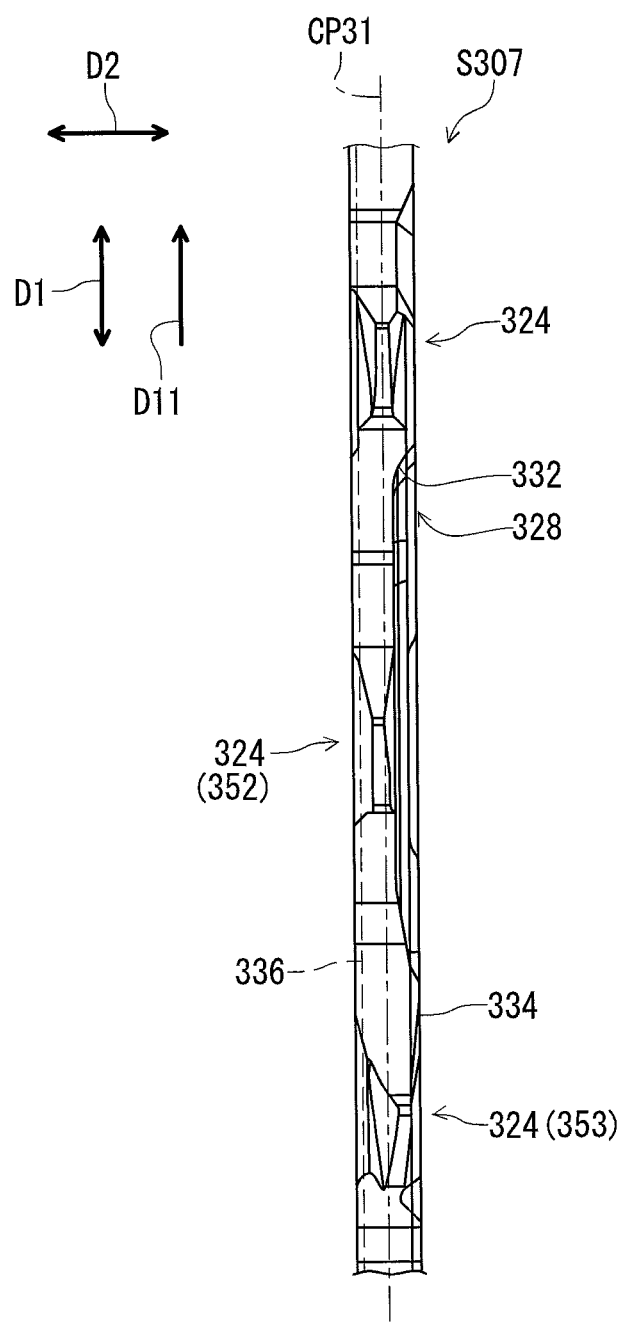
FIG. 35 is a partial edge elevational view of the bicycle sprocket illustrated in FIG. 20.

As seen in FIG. 35, the upstream tooth 353 is preferably offset with respect to the axial center plane CP31 of the bicycle sprocket S307 toward the first axial side 334. The downshifting recessed portion 332 is recessed from the first axial side 334 toward the second axial side 336 in the axial direction D2. The downshifting facilitation tooth 352 is offset with respect to the axial center plane CP31 of the bicycle sprocket S307 toward the second axial side 336. The upstream tooth 353 is preferably offset with respect to the axial center plane CP31 toward the first axial side 334. The downshifting recessed portion 332 causes the downshifting facilitation tooth 352 to be offset with respect to the axial center plane CP31 toward the second axial side 336.

The offset arrangement of the downshifting facilitation tooth 352 allows, during downshifting to the bicycle sprocket S307, the bicycle chain C to be positioned closer to the second axial side 336 of the bicycle sprocket S307 in the axial direction D2 with reducing interference between the bicycle chain C and the bicycle sprocket S307. The upstream tooth 353 is arranged to catch the bicycle chain C in a state where the bicycle chain C is positioned closer to the bicycle sprocket S307 without engaging with the bicycle sprocket S307.

With the bicycle sprocket assembly 310, the plurality of chain-engaging teeth 324 include at least three upshifting facilitation teeth configured to facilitate upshifting and provided in the upshifting facilitation area 326. Accordingly, it is possible to make the upshifting operation of the bicycle chain C smoother regardless of the relative position between the at least three upshifting facilitation teeth and the bicycle chain C.

Figure 36:
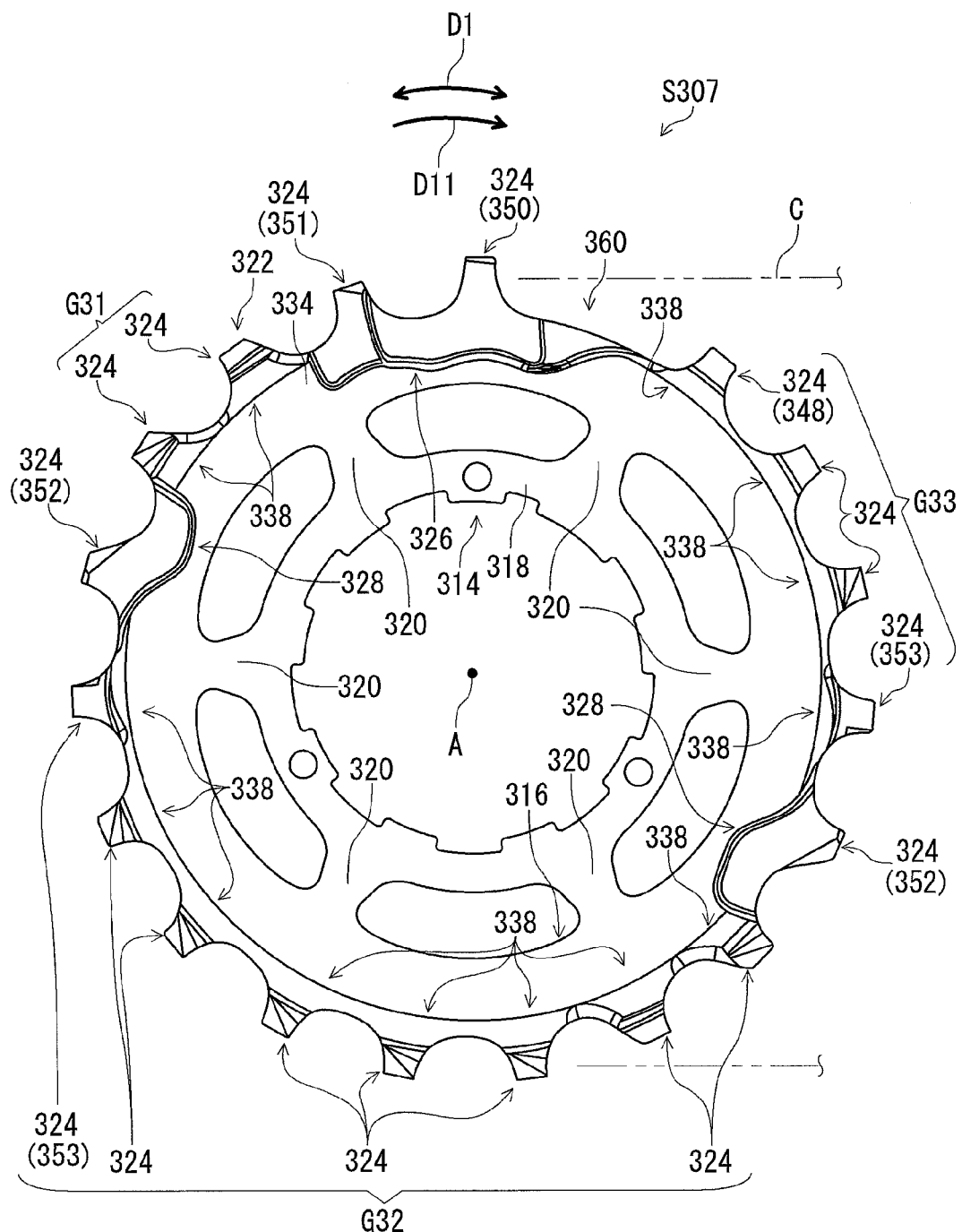
FIG. 36 is a right side elevational view of a bicycle sprocket of a bicycle sprocket assembly in accordance with a modification of the third embodiment.

As seen in FIG. 36, the upshifting facilitation area 326 can include a tooth-free gap 360 from which an additional chain-engaging tooth is free between adjacent two of the plurality of chain-engaging teeth 324. The tooth-free gap 360 is disposed at a position of the first upshifting facilitation tooth 349. Namely, the first upshifting facilitation tooth 349 is omitted from the bicycle sprocket S307 illustrated in FIG. 33. However, at least one of the first upshifting facilitation tooth 349, the second upshifting facilitation tooth 350, and the third upshifting facilitation tooth 351 can be omitted from the upshifting facilitation area 326 if needed and/or desired.

Figure 37:
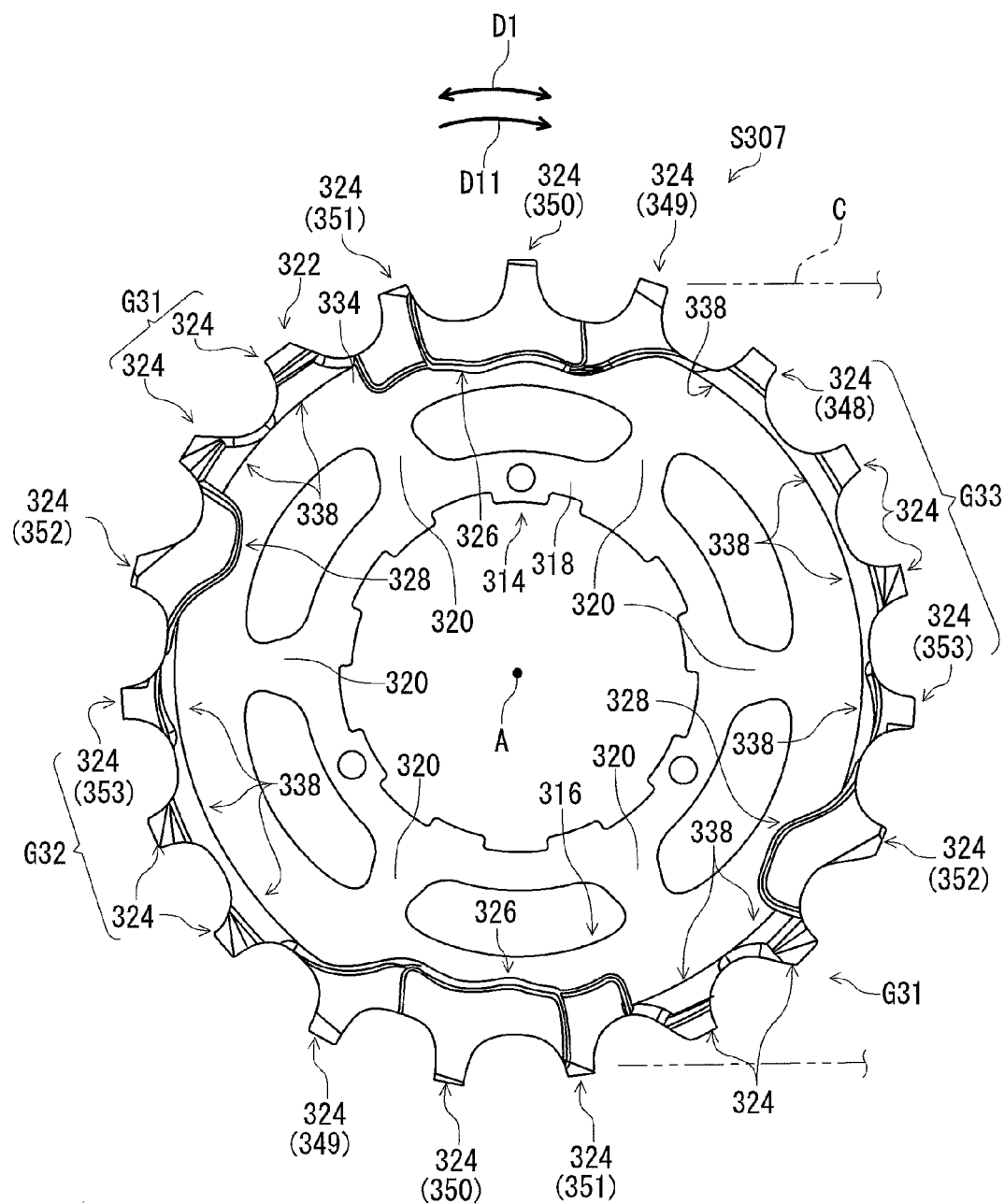
FIG. 37 is a right side elevational view of a bicycle sprocket of a bicycle sprocket assembly in accordance with another modification of the third embodiment.

Furthermore, as seen in FIG. 37, the chain engagement structure 322 can include a plurality of upshifting facilitation areas 326 configured to facilitate upshifting as the upshift facilitation area. Since each of the upshifting facilitation areas 326 has the same structure as each other, they will not be described and/or illustrated in detail here for the sake of brevity.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers such as the terms "first" or "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:
1. A bicycle sprocket having a rotational center axis, the bicycle sprocket comprising:
    a sprocket body rotatable about the rotational center axis; and
    a chain engagement structure including an upshifting facilitation area configured to facilitate upshifting, the chain engagement structure including a plurality of chain-engaging teeth configured to engage with a bicycle chain, the plurality of chain-engaging teeth including at least three upshifting facilitation teeth configured to facilitate upshifting, the at least three upshifting facilitation teeth being adjacent to each other without another tooth between the at least three upshifting facilitation teeth, the upshifting facilitation area including an upshifting recessed portion recessed in an axial direction parallel to the rotational center axis, the at least three upshifting facilitation teeth being provided in a circumferential single area defined by the upshifting recessed portion.

2. The bicycle sprocket according to claim 1, further comprising:
a first axial side configured to face in the axial direction; and
a second axial side configured to face in the axial direction and opposite to the first axial side in the axial direction, wherein
the upshifting recessed portion is recessed from the first axial side toward the second axial side in the axial direction.

3. The bicycle sprocket according to claim 2, wherein
the chain engagement structure includes a downshifting facilitation area configured to facilitate downshifting,
the downshifting facilitation area includes a downshifting recessed portion recessed in an axial direction parallel to the rotational center axis, and
the downshifting recessed portion is recessed from the first axial side toward the second axial side in the axial direction.

4. The bicycle sprocket according to claim 1, wherein
the at least three upshifting facilitation teeth includes
a first upshifting facilitation tooth having a first tooth width defined in an axial direction parallel to the rotational center axis,
a second upshifting facilitation tooth having a second tooth width defined in the axial direction, and
a third upshifting facilitation tooth having a third tooth width defined in the axial direction, the second upshifting facilitation tooth being positioned between the first upshifting facilitation tooth and the third upshifting facilitation tooth in a circumferential direction with respect to the rotational center axis, and
the second tooth width is smaller than the first tooth width.

5. The bicycle sprocket according to claim 4, wherein
the second upshifting facilitation tooth is adjacent to the first upshifting facilitation tooth without another chain-engaging tooth between the first upshifting facilitation tooth and the second upshifting facilitation tooth, and
the second upshifting facilitation tooth is adjacent to the third upshifting facilitation tooth without another chain-engaging tooth between the second upshifting facilitation tooth and the third upshifting facilitation tooth.

6. The bicycle sprocket according to claim 4, wherein
the second tooth width is smaller than the third tooth width.

7. The bicycle sprocket according to claim 6, wherein
the first upshifting facilitation tooth is provided on a rotational downstream side relative to the second upshifting facilitation tooth in a rotational driving direction in which the bicycle sprocket rotates about the rotational center axis during pedaling.

8. The bicycle sprocket according to claim 1, wherein
the at least three upshifting facilitation teeth includes a first upshifting facilitation tooth, a second upshifting facilitation tooth, and a third upshifting facilitation tooth,
the second upshifting facilitation tooth is positioned between the first upshifting facilitation tooth and the third upshifting facilitation tooth in a circumferential direction with respect to the rotational center axis,
the second upshifting facilitation tooth is adjacent to the first upshifting facilitation tooth without another chain-engaging tooth between the first upshifting facilitation tooth and the second upshifting facilitation tooth,
the second upshifting facilitation tooth is adjacent to the third upshifting facilitation tooth without another chain-engaging tooth between the second upshifting facilitation tooth and the third upshifting facilitation tooth,
the first upshifting facilitation tooth is provided on a rotational downstream side relative to the second upshifting facilitation tooth in a rotational driving direction in which the bicycle sprocket rotates about the rotational center axis during pedaling,
the plurality of chain-engaging teeth includes a downstream tooth provided on a rotational downstream side relative to the first upshifting facilitation tooth in the rotational driving direction,
the first upshifting facilitation tooth is configured to shift an inner link plate of the bicycle chain toward a neighboring smaller sprocket after the downstream tooth engages with an outer link plate of the bicycle chain during an upshifting operation, and
the second upshifting facilitation tooth is configured to shift an inner link plate of the bicycle chain toward the neighboring smaller sprocket after the first upshifting facilitation tooth engages with an outer link plate of the bicycle chain during another upshifting operation.

9. The bicycle sprocket according to claim 1, wherein
the chain engagement structure includes a plurality of upshifting facilitation areas configured to facilitate upshifting as the upshifting facilitation area.

10. The bicycle sprocket according to claim 1, wherein
the chain engagement structure includes a downshifting facilitation area configured to facilitate downshifting.

11. The bicycle sprocket according to claim 10, wherein
the downshifting facilitation area includes a downshifting recessed portion recessed in an axial direction parallel to the rotational center axis.

12. The bicycle sprocket according to claim 11, further comprising:
a first axial side configured to face in the axial direction; and
a second axial side configured to face in the axial direction and opposite to the first axial side in the axial direction, wherein
the downshifting recessed portion is recessed from the first axial side toward the second axial side in the axial direction.

13. The bicycle sprocket according to claim 1, wherein
the upshifting facilitation area includes a tooth-free gap from which an additional chain-engaging tooth is free between adjacent two of the plurality of chain-engaging teeth.

14. The bicycle sprocket according to claim 1, wherein
the sprocket body includes a hub engagement portion configured to engage with a bicycle hub assembly.

15. The bicycle sprocket according to claim 1, wherein
the at least three upshifting facilitation teeth includes a first upshifting facilitation tooth, a second upshifting facilitation tooth, and a third upshifting facilitation tooth,
the second upshifting facilitation tooth is positioned between the first upshifting facilitation tooth and the third upshifting facilitation tooth in a circumferential direction with respect to the rotational center axis, and
the upshifting recessed portion extends from the first upshifting facilitation tooth to the third upshifting facilitation tooth through the second upshifting facilitation tooth in the circumferential direction.

16. The bicycle sprocket according to claim 1, wherein the at least three upshifting facilitation teeth are provided radially outward of the upshifting recessed portion.

17. A bicycle sprocket having a rotational center axis, the bicycle sprocket comprising:
- a sprocket body rotatable about the rotational center axis; and
- a chain engagement structure including an upshifting facilitation area configured to facilitate upshifting, the chain engagement structure including a plurality of chain-engaging teeth configured to engage with a bicycle chain, the plurality of chain-engaging teeth including at least three upshifting facilitation teeth configured to facilitate upshifting, the at least three upshifting facilitation teeth being adjacent to each other without another tooth between the at least three upshifting facilitation teeth, the at least three upshifting facilitation teeth being provided in the upshifting facilitation area,
- the at least three upshifting facilitation teeth including
    - a first upshifting facilitation tooth having a first tooth width defined in an axial direction parallel to the rotational center axis,
    - a second upshifting facilitation tooth having a second tooth width defined in the axial direction, and
    - a third upshifting facilitation tooth having a third tooth width defined in the axial direction, the second upshifting facilitation tooth being positioned between the first upshifting facilitation tooth and the third upshifting facilitation tooth in a circumferential direction with respect to the rotational center axis,
- the second tooth width being smaller than the first tooth width, and
- the first tooth width being smaller than the third tooth width.

18. A bicycle sprocket having a rotational center axis, the bicycle sprocket comprising:
- a sprocket body rotatable about the rotational center axis;
- a chain engagement structure including an upshifting facilitation area configured to facilitate upshifting, the chain engagement structure including a plurality of chain-engaging teeth configured to engage with a bicycle chain, the plurality of chain-engaging teeth including at least three upshifting facilitation teeth configured to facilitate upshifting, the at least three upshifting facilitation teeth being adjacent to each other without another tooth between the at least three upshifting facilitation teeth, the at least three upshifting facilitation teeth being provided in the upshifting facilitation area
- a first axial side configured to face a neighboring smaller sprocket; and
- a second axial side opposite to the first axial side in an axial direction parallel to the rotational center axis,
- each of the at least three upshifting facilitation teeth having a tooth-top positioned closer to the second axial side than the first axial side in the axial direction.

19. A bicycle sprocket having a rotational center axis, the bicycle sprocket comprising:
- a sprocket body rotatable about the rotational center axis; and
- a chain engagement structure including an upshifting facilitation area configured to facilitate upshifting, the chain engagement structure including a plurality of chain-engaging teeth configured to engage with a bicycle chain, the plurality of chain-engaging teeth including at least three upshifting facilitation teeth configured to facilitate upshifting, the at least three upshifting facilitation teeth being adjacent to each other without another tooth between the at least three upshifting facilitation teeth, the at least three upshifting facilitation teeth being provided in the upshifting facilitation area,
- the sprocket body having an axial width defined in an axial direction parallel to the rotational center axis,
- the plurality of chain-engaging teeth including at least two neighboring chain-engaging teeth each including a chain-engaging portion configured to engage with the bicycle chain,
- the chain-engaging portion having an axial chain-engaging width defined in the axial direction, and
- the axial chain-engaging width being larger than the axial width of the sprocket body.

20. The bicycle sprocket according to claim 19, wherein the chain-engaging portion is configured to partly engage with a link plate of the bicycle chain in a radial direction of the bicycle sprocket.

21. The bicycle sprocket according to claim 19, wherein the axial chain-engaging width is smaller than an axial inner distance defined between opposed inner link plates of the bicycle chain in the axial direction, and a difference between the axial chain-engaging width and the axial inner distance is equal to or smaller than 0.2 mm in the axial direction.

22. The bicycle sprocket according to claim 19, wherein the axial chain-engaging width is smaller than an axial inner distance defined between opposed inner link plates of the bicycle chain in the axial direction, and a difference between the axial chain-engaging width and the axial inner distance is equal to or larger than 0.1 mm in the axial direction.

23. A bicycle sprocket assembly comprising:
a plurality of the bicycle sprockets according to claim 1.

24. The bicycle sprocket assembly according to claim 23, further comprising:
a hub engagement structure configured to engage with a bicycle hub assembly.

25. A bicycle sprocket having a rotational center axis, the bicycle sprocket comprising:
- a sprocket body rotatable about the rotational center axis; and
- a chain engagement structure including an upshifting facilitation area configured to facilitate upshifting, the chain engagement structure including a plurality of chain-engaging teeth configured to engage with a bicycle chain, the plurality of chain-engaging teeth including at least two upshifting initiation teeth configured to shift the bicycle chain first toward a neighboring smaller sprocket during an upshifting operation, the at least two upshifting initiation teeth being adjacent to each other without another tooth between the at least two upshifting initiation teeth, the upshifting facilitation area including an upshifting recessed portion recessed in an axial direction parallel to the rotational center axis, the at least two upshifting initiation teeth being provided in a circumferential single area defined by the upshifting recessed portion.

26. The bicycle sprocket according to claim 25, wherein the chain engagement structure includes a plurality of upshifting facilitation areas configured to facilitate upshifting as the upshifting facilitation area.

27. The bicycle sprocket according to claim 25, further comprising:

a first axial side configured to face in the axial direction; and a second axial side configured to face in the axial direction and opposite to the first axial side in the axial direction, wherein the upshifting recessed portion is recessed from the first axial side toward the second axial side in the axial direction.

28. The bicycle sprocket according to claim 27, wherein the chain engagement structure includes a downshifting facilitation area configured to facilitate downshifting, the downshifting facilitation area includes a downshifting recessed portion recessed in an axial direction parallel to the rotational center axis, and the downshifting recessed portion is recessed from the first axial side toward the second axial side in the axial direction.

29. The bicycle sprocket according to claim 25, wherein the chain engagement structure includes a downshifting facilitation area configured to facilitate downshifting.

30. The bicycle sprocket according to claim 29, wherein the downshifting facilitation area includes a downshifting recessed portion recessed in an axial direction parallel to the rotational center axis.

31. The bicycle sprocket according to claim 30, further comprising:

a first axial side configured to face in the axial direction; and a second axial side configured to face in the axial direction and opposite to the first axial side in the axial direction, wherein the downshifting recessed portion is recessed from the first axial side toward the second axial side in the axial direction.

32. The bicycle sprocket according to claim 25, wherein the at least two upshifting initiation teeth includes a first upshifting initiation tooth and a second upshifting initiation tooth adjacent to the first upshifting initiation tooth without another tooth between the first upshifting initiation tooth and the second upshifting initiation tooth, the first upshifting initiation tooth is provided on a rotational downstream side relative to the second upshifting initiation tooth in a rotational driving direction in which the bicycle sprocket rotates about the rotational center axis during pedaling, the plurality of chain-engaging teeth includes a downstream tooth provided on a rotational downstream side relative to the first upshifting initiation tooth in the rotational driving direction, the first upshifting initiation tooth is configured to shift an inner link plate of the bicycle chain toward the neighboring smaller sprocket after the downstream tooth engages with an outer link plate of the bicycle chain during an upshifting operation, and the second upshifting initiation tooth is configured to shift an inner link plate of the bicycle chain toward the neighboring smaller sprocket after the first upshifting initiation tooth engages with an outer link plate of the bicycle chain during another upshifting operation.

33. The bicycle sprocket according to claim 25, wherein the at least two upshifting initiation teeth includes a first upshifting initiation tooth and a second upshifting initiation tooth, the second upshifting initiation tooth is adjacent to the first upshifting initiation tooth without another tooth between the first upshifting initiation tooth and the second upshifting initiation tooth in a circumferential direction with respect to the rotational center axis, and the upshifting recessed portion extends from the first upshifting initiation tooth to the third upshifting initiation tooth in the circumferential direction.

34. The bicycle sprocket according to claim 25, wherein the at least two upshifting initiation teeth are provided radially outward of the upshifting recessed portion.

35. A bicycle sprocket having a rotational center axis, the bicycle sprocket comprising:

a sprocket body rotatable about the rotational center axis;

a chain engagement structure including an upshifting facilitation area configured to facilitate upshifting, the chain engagement structure including a plurality of chain-engaging teeth configured to engage with a bicycle chain, the plurality of chain-engaging teeth including at least two upshifting initiation teeth configured to shift the bicycle chain first toward a neighboring smaller sprocket during an upshifting operation, the at least two upshifting initiation teeth being adjacent to each other without another tooth between the at least two upshifting initiation teeth, the at least two upshifting initiation teeth being provided in the upshifting facilitation area;

a first axial side configured to face a neighboring smaller sprocket; and a second axial side opposite to the first axial side in an axial direction parallel to the rotational center axis, each of the at least two upshifting initiation teeth having a tooth-top positioned closer to the second axial side than the first axial side in the axial direction.

* * * * *